US012662648B2

(12) United States Patent
Featherstone et al.

(10) Patent No.: US 12,662,648 B2
(45) Date of Patent: *Jun. 23, 2026

(54) LUBRICANT COMPOSITIONS CONTAINING SILICON FOR REDUCED PRE-IGNITION IN HYDROGEN FUELED ENGINES

(71) Applicant: INFINEUM INTERNATIONAL LIMITED, Abingdon (GB)

(72) Inventors: Thomas M. Featherstone, Bristol (GB); Ellis Mutter, Swindon (GB); Roxana Chirita, Juvisy-sur-Orge (FR); Adam P. Marsh, Wantage (GB); Mark P. Driver, Didcot (GB); Andrew J.D. Ritchie, Chatham, NJ (US)

(73) Assignee: INFINEUM INTERNATIONAL LIMITED, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,649

(22) Filed: Dec. 3, 2024

(65) Prior Publication Data

US 2025/0197763 A1 Jun. 19, 2025

Related U.S. Application Data

(60) Provisional application No. 63/609,985, filed on Dec. 14, 2023.

(51) Int. Cl.

*C10M 169/04* (2006.01)
*C10N 20/02* (2006.01)

(Continued)

(52) U.S. Cl.

CPC ..... *C10M 169/045* (2013.01); *F02D 41/1475* (2013.01); *F02D 41/22* (2013.01);

(Continued)

(58) Field of Classification Search

CPC ........ C10M 169/045; C10M 2203/003; C10M 2203/1025; C10M 2207/262;

(Continued)

(56) References Cited

U.S. PATENT DOCUMENTS

| | | | |
|---|---|---|---|
| 4,311,628 | A | 1/1982 | Abdou-Sabet et al. |
| 5,429,758 | A | 7/1995 | Hayashi et al. |

(Continued)

FOREIGN PATENT DOCUMENTS

| | | | |
|---|---|---|---|
| CA | 2645513 | A1 | 6/2009 |
| EP | 1360265 | B1 | 5/2009 |

(Continued)

OTHER PUBLICATIONS

Matsubara, Naoyoshi et al., "A study of abnormal ignition in a hydrogen combustion engine", 10th International Engine Congress, 2023, Carbon Neutral Development Division, Toyota Motor Corporation.

(Continued)

*Primary Examiner* — James C Goloboy
(74) *Attorney, Agent, or Firm* — Robert A. Migliorini

(57) ABSTRACT

This invention relates to a method of reducing abnormal combustion events in a hydrogen fueled internal combustion engine (HICE) during operation of the engine. The method includes the steps of: a) providing to the HICE a lubricating oil composition including or resulting from the admixing of: i) a base oil having a KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal (Continued)

and between 0.15 wt. % to 8.0 wt. % of total soap to the composition; iii) at least one silicon containing compound included at a treat level to deliver between 50 to 900 ppm by weight of total silicon to the composition; and iv) the lubricating oil composition having a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; b) providing a fuel comprising hydrogen to the HICE; and c) combusting the fuel in the HICE. Also provided are a lubricating oil composition and a concentrate for use in a HICE to reduce the propensity for abnormal combustion events.

42 Claims, 2 Drawing Sheets

(51) Int. Cl.

| | |
|---|---|
| ***C10N 30/00*** | (2006.01) |
| ***C10N 30/02*** | (2006.01) |
| ***C10N 30/04*** | (2006.01) |
| ***C10N 30/12*** | (2006.01) |
| ***C10N 40/25*** | (2006.01) |
| ***C10N 70/00*** | (2006.01) |
| ***F02D 41/14*** | (2006.01) |
| ***F02D 41/22*** | (2006.01) |

(52) U.S. Cl.

CPC ................ *C10M 2203/003* (2013.01); *C10M 2203/1025* (2013.01); *C10M 2207/262* (2013.01); *C10M 2217/028* (2013.01); *C10M 2219/046* (2013.01); *C10M 2223/045* (2013.01); *C10M 2227/04* (2013.01); *C10M 2229/041* (2013.01); *C10N 2020/02* (2013.01); *C10N 2030/02* (2013.01); *C10N 2030/04* (2013.01); *C10N 2030/12* (2013.01); *C10N 2030/45* (2020.05); *C10N 2030/52* (2020.05); *C10N 2040/25* (2013.01); *C10N 2070/02* (2020.05)

(58) Field of Classification Search

CPC ........ C10M 217/028; C10M 2219/046; C10M 2223/045; C10M 2227/04; C10M 2229/041; C10N 2020/02; C10N 2030/02; C10N 2030/04; C10N 2030/12; C10N 2030/45; C10N 2030/52; C10N 2040/25; C10N 2070/02; F02D 41/1475; F02D 41/22

See application file for complete search history.

(56) References Cited

U.S. PATENT DOCUMENTS

| | | | |
|---|---|---|---|
| 5,663,126 | A | 9/1997 | Boden et al. |
| 5,874,389 | A | 2/1999 | Boden et al. |
| 6,187,721 | B1 | 2/2001 | Goldblatt et al. |
| 6,300,289 | B1 | 10/2001 | Boden et al. |
| 6,686,321 | B2 | 2/2004 | Boden et al. |
| 8,163,681 | B2 | 4/2012 | Bardasz et al. |
| 8,669,386 | B2 | 3/2014 | Boudreau, Sr. |
| 10,214,703 | B2 | 2/2019 | Fletcher et al. |
| 10,519,394 | B2 | 12/2019 | Dance et al. |
| 10,584,300 | B2 | 3/2020 | Hartley et al. |
| 10,604,720 | B2 | 3/2020 | Gao et al. |
| 10,669,505 | B2 | 6/2020 | Mosier et al. |
| 11,034,910 | B2 | 6/2021 | Mosier et al. |
| 11,034,912 | B2 | 6/2021 | Ritchie et al. |
| 11,142,719 | B2 | 10/2021 | Cant et al. |
| 11,155,764 | B2 | 10/2021 | Yang et al. |
| 11,214,756 | B2 | 1/2022 | Mosier et al. |
| 2002/0019320 | A1 | 2/2002 | Nakazato et al. |
| 2002/0183456 | A1 | 12/2002 | Goldblatt et al. |
| 2004/0043909 | A1 | 3/2004 | Goldblatt et al. |
| 2006/0014653 | A1 | 1/2006 | Busse et al. |
| 2008/0139423 | A1 | 6/2008 | Goldblatt et al. |
| 2008/0234153 | A1 | 9/2008 | Matsui |
| 2008/0293600 | A1 | 11/2008 | Goldblatt et al. |
| 2010/0162981 | A1 | 7/2010 | Adams et al. |
| 2013/0274162 | A1* | 10/2013 | Friend .................. C10M 159/20 508/390 |
| 2017/0073606 | A1 | 3/2017 | Galic Raguz et al. |
| 2018/0002628 | A1 | 1/2018 | Hartley |
| 2018/0044610 | A1 | 2/2018 | Mayhew et al. |
| 2018/0051224 | A1 | 2/2018 | Kunchithapatham Salem et al. |
| 2018/0066203 | A1 | 3/2018 | Dance et al. |
| 2018/0237718 | A1* | 8/2018 | Stidder ................ C10M 155/02 |
| 2018/0258365 | A1 | 9/2018 | Ohkubo et al. |
| 2019/0002784 | A1 | 1/2019 | Boffa et al. |
| 2019/0106651 | A1* | 4/2019 | Kubo .................. C10M 133/44 |
| 2019/0225911 | A1 | 7/2019 | Sutton et al. |
| 2019/0233758 | A1 | 8/2019 | Takeshima |
| 2020/0255762 | A1 | 8/2020 | Elliott et al. |
| 2022/0073836 | A1 | 3/2022 | Delbridge et al. |
| 2022/0403284 | A1 | 12/2022 | Jones et al. |
| 2023/0151295 | A1 | 5/2023 | McDermott et al. |
| 2023/0183597 | A1 | 6/2023 | Mosier et al. |
| 2024/0141156 | A1* | 5/2024 | Haidaaz .................. C08C 19/22 |
| 2024/0218284 | A1 | 7/2024 | Ritchie et al. |
| 2024/0400929 | A1 | 12/2024 | De Feo et al. |

FOREIGN PATENT DOCUMENTS

| | | | |
|---|---|---|---|
| EP | 1661970 | B1 | 4/2012 |
| EP | 1803797 | B1 | 12/2014 |
| EP | 2401348 | B1 | 11/2017 |
| EP | 2940110 | B1 | 12/2018 |
| EP | 3322783 | B1 | 9/2020 |
| EP | 3366755 | B1 | 11/2023 |
| EP | 4353805 | A1 | 4/2024 |
| EP | 4397738 | A1 | 10/2024 |
| WO | 97/47709 | A1 | 12/1997 |
| WO | 99/21902 | A1 | 5/1999 |
| WO | 03/099890 | A2 | 12/2003 |
| WO | 2006/116663 | A1 | 11/2006 |
| WO | 2016/138227 | A1 | 9/2016 |
| WO | 2017/011633 | A1 | 1/2017 |
| WO | 2018/036285 | A1 | 3/2018 |
| WO | 2020/095467 | A1 | 5/2020 |
| WO | 2022/261488 | A1 | 12/2022 |
| WO | 2023/057581 | A1 | 4/2023 |
| WO | 2024/229029 | A1 | 11/2024 |

OTHER PUBLICATIONS

Aggarwal, S.K. et al., "Ignition characteristics of heptane-hydrogen and heptane-methane fuel blends at elevated pressures", International Journal of Hydrogen Energy, 2011, vol. 36, pp. 15392-15402.

Grabner, Peter et al., "Formation Mechanisms and Characterization of abnormal Combustion Phenomena of Hydrogen Engines", SAE Technical Paper 2023-32-0168, 2023.

Gschiel, K. et al., "Measures to improve the transient behaviour of hydrogen ICE", Conference 27, Aufladetechnische Konferenz, 2023, Dresden, Germany.

Harvey, Andrew J., "Low-speed pre-ignition in turbo-charged, direct injection, gasoline engines", School of Computing, Engineering and Mathematics, University of Brighton, 2020.

Imada, Yasushi et al., "Flavin-Catalyzed Generation of Diimide: An Environmentally Friendly Method for the Aerobic Hydrogenation of Olefins", Journal of the American Chemical Society. 2005, vol. 127, pp. 14544-14545.

Luo, Yang et al., "An Overview of Pre-ignition of Hydrogen Engine", Journal of Scientific Research and Reports, 2020, vol. 26, issue 10, pp. 1-7.

(56) References Cited

OTHER PUBLICATIONS

International Search Report and Written Opinion for related PCT Application No. PCT/IB2024/000645 dated May 14, 2025.
International Search Report and Written Opinion for related PCT Application No. PCT/IB2024/000675 dated Jun. 3, 2025.
International Search Report and Written Opinion for related PCT Application No. PCT/IB2024/000676 dated May 12, 2025.
International Search Report and Written Opinion for related PCT Application No. PCT/IB2024/062498 dated Mar. 21, 2025.
International Search Report and Written Opinion for related PCT Application No. PCT/IB2024/062628 dated Mar. 26, 2025.
International Search Report and Written Opinion for related PCT Application No. PCT/IB2024/062629 dated Apr. 4, 2025.
International Search Report and Written Opinion for related PCT Application No. PCT/IB2024/062630 dated Mar. 27, 2025.
International Search Report and Written Opinion for related PCT Application No. PCT/IB2024/062631 dated Apr. 4, 2025.
International Search Report and Written Opinion for related PCT Application No. PCT/IB2024/062634 dated Apr. 7, 2025.
International Search Report and Written Opinion for related PCT Application No. PCT/IB2024/062635 dated Mar. 26, 2025.
International Search Report and Written Opinion for related PCT Application No. PCT/IB2024/062636 dated Apr. 3, 2025.
International Search Report and Written Opinion for related PCT Application No. PCT/IB2024/062637 dated Apr. 15, 2025.
Smits, Martino M. et al., "Quantitative Determination of Olefinic Unsaturation by Measurement of Ozone Absorption", Analytical Chemistry, 1972, vol. 44, issue 9, pp. 1688-1689.
Szwaja, Stanislaw et al., "Hydrogen combustion in a compression ignition diesel engine", International Journal of Hydrogen Energy, 2009. vol. 34, pp. 4413-4421.
Xu, Han et al., "Experimental and numerical investigation on effects of pre-ignition positions on knock intensity of hydrogen fuel", International Journal of Hydrogen Energy, 2021, vol. 46, pp. 26631-26645.

* cited by examiner

Figure 1 (Fig. 1)
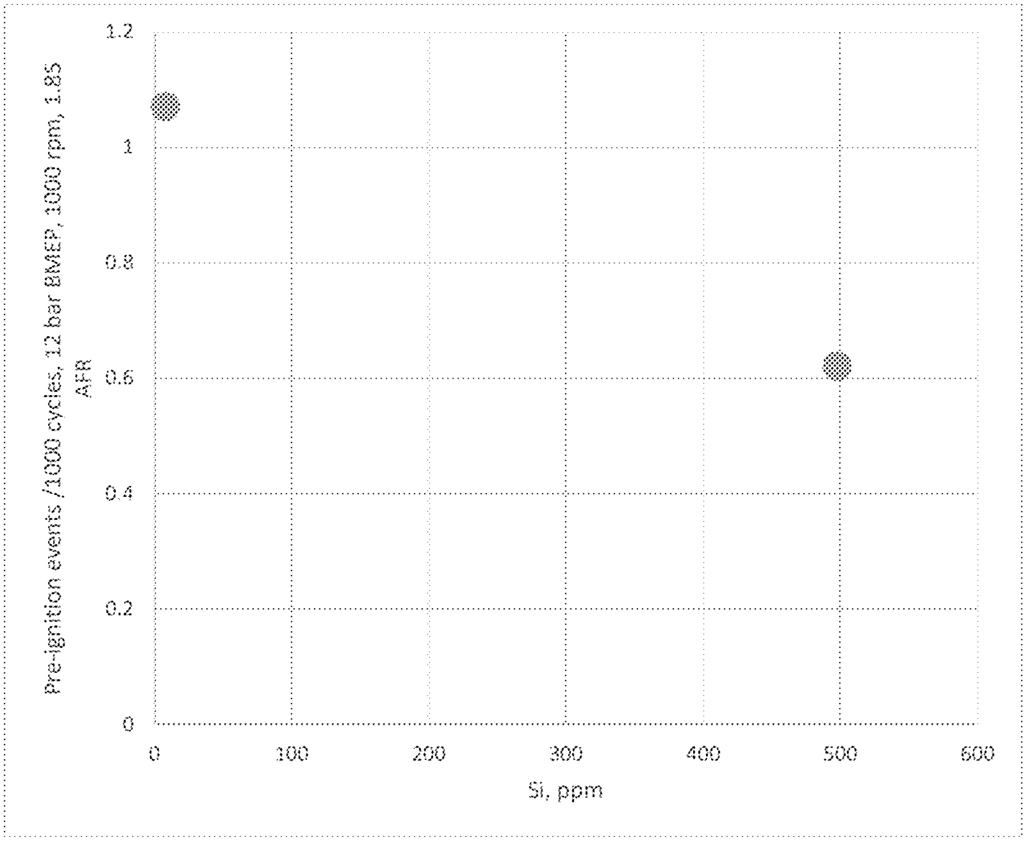

Figure 2 (Fig. 2)
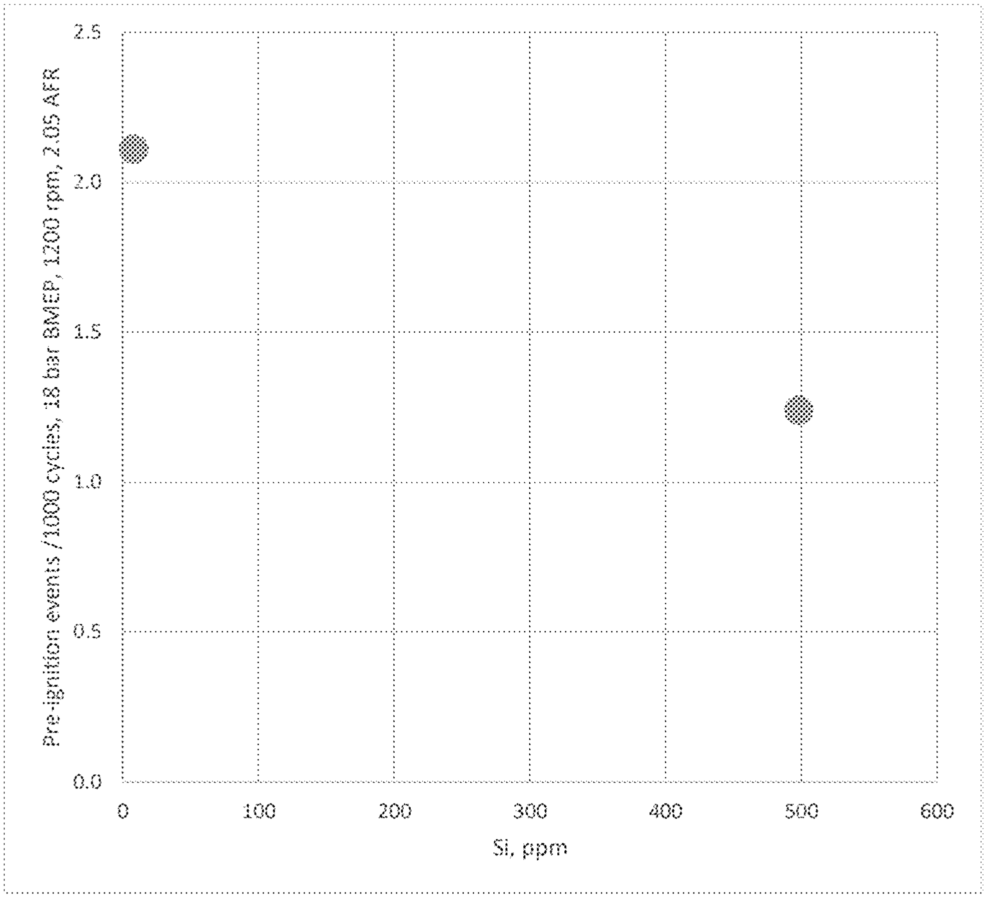

LUBRICANT COMPOSITIONS CONTAINING SILICON FOR REDUCED PRE-IGNITION IN HYDROGEN FUELED ENGINES

STATEMENT OF RELATED APPLICATIONS

This application is related to following U.S. Provisional applications filed on the same date as this application:

1. U.S. Ser. No. 63/609,993, entitled "Lubricant Compositions Containing Low Phosphorus For Use In Hydrogen Fueled Engines";
2. U.S. Ser. No. 63/610,000, entitled "Lubricant Compositions Containing Magnesium Detergent For Reduced Pre-ignition In Hydrogen Fueled Engines";
3. U.S. Ser. No. 63/610,004, entitled "Lubricant Compositions Containing Detergent For Reduced Pre-ignition In Hydrogen Fueled Engines";
4. U.S. Ser. No. 63/610,012, entitled "Lubricant Compositions Containing Molybdenum For Reduced Pre-ignition In Hydrogen Fueled Engines"; and
5. U.S. Ser. No. 63/610,014, entitled "Lubricant Compositions For Reduced Pre-ignition In Hydrogen Fueled Engines."

CROSS-REFERENCE TO RELATED APPLICATION

This U.S. Non-provisional application claims priority to U.S. Provisional Application Ser. No. 63/609,985 filed on Dec. 14, 2023, the contents of which are herein incorporated by reference in their entirety.

FIELD OF THE INVENTION

This disclosure relates to the use of lubricating oil compositions including at least one silicon containing compound for use in hydrogen fueled engines to reduce abnormal combustion events, such as in compression ignited internal combustion engines and/or spark ignited internal combustion engines.

BACKGROUND OF THE INVENTION

The present invention relates to lubricating oil compositions for use in internal combustion engines (such as hydrogen fueled engines using spark, compression or spark assisted compression ignition), which exhibit improved abnormal combustion event ("ACE") characteristics (e.g., backfire, various types of knock, including super knock and heavy knock type events, as well as pre-ignition type events). The present invention further relates to lubricating oil compositions for use in compression ignited, or spark assisted compression-ignited internal combustion engines such compositions often referred to as crankcase lubricants; and to the use of additives in such lubricating oil compositions for reducing abnormal combustion events in use of such engines and/or improving the performance of an engine lubricated with the lubricating oil composition by facilitating, inter alia, use of use of hydrogen fueled internal combustion engines where abnormal combustion events, such as pre-ignition, are a concern.

Several terms exist for various forms of abnormal combustion in internal combustion engines including knock, extreme knock (sometimes referred to as super-knock, mega-knock, or heavy knock), surface ignition, and pre-ignition (ignition occurring prior to spark or desired compression ignition point). Extreme knock occurs in the same manner as traditional knock, but with increased knock amplitude, and typically can be mitigated using traditional knock control methods. Pre-ignition can occur at high or low speeds and is a notable characteristic of hydrogen internal combustion engines.

Pre-ignition is a form of abnormal combustion event where the air/fuel mixture ignites prior to the desired ignition by a spark plug, e.g., before the spark plug fires or before a desired ignition point in a compression ignited engine. There are many kinds of pre-ignition and methods used to address one kind of pre-ignition, do not necessarily treat another. Likewise, many elements combine to influence pre-ignition, therefore is it a complex problem.

Historically, pre-ignition in hydrogen fueled systems has generally been a challenge. Hydrogen as an internal combustion engine fuel exhibits a lower minimum ignition energy, wider flammability range and faster flame propagation than gasoline. (*A Study of Abnormal Ignition in a Hydrogen Combustion Engine*, Naoyoshi Matsubara, Yoshinori Miyamoto, Shiro Tanno, Carbon Neutral Development Div. Toyota Motor Corporation, Yuua Abe Denso Corporation, $10^{th}$ International Engine Congress, Baden-Baden, Germany, Feb. 28 to Mar. 1, 2023, ATZ Live Springer Fachmedien Weisbaden GmbH, Wiesbaden, Germany). These combustion properties increase the potential for abnormal combustion of the air-fuel mixture. Early abnormal combustion events tend to be initiated by an energy source other than the designed spark event in a spark ignition engine, or by air heated from compression in a compression ignition engine. Sources of abnormal combustion ignition can include combustion chamber hotspots (hot air pockets, hot surfaces or combustion chamber deposits), or energy contained within oil droplets ejected into the combustion chamber. (*FEV's Pathway to an ICE Powertrain Powered by Future Fuels Achieving the Maximum Efficiency*, Dieter Van DerPut, FEV Eurpoe GmbH, $10^{th}$ International Engine Congress, Baden-Baden, Germany, Feb. 28 to Mar. 1, 2023, ATZ Live Springer Fachmedien Weisbaden GmbH, Wiesbaden, Germany).

Abnormal combustion events can occur in both spark ignition and compression ignition internal combustion engines (see *Hydrogen Combustion in a Compression Ignition Diesel Engine*, Stanislaw Szwaja & Karol Grab-Rogalinski, International Journal of Hydrogen Energy, vol 34, issue 10, May 2009, pg 4413-4421) and are typically counted and characterized by inspecting crank angle resolved cylinder pressure traces to identify combustion cycles with early and, or high pressure events relative to the mean combustion pressure trace, or by mass fraction burned by a defined crank angle. These high pressure events have potential to cause engine damage which includes, but is not limited to, damage to the piston or piston ring, or damage to the head gasket, cylinder head bolts or cylinder head. Such damage adversely impacts the expected engine life (see Xu H, Ni X, Su X, Xiao B, Luo Y, Zhang F, Weng C and Yao C, *Experimental and numerical investigation on effects of pre-ignition positions on knock intensity of hydrogen fuel*, Int. J. Hydrogen Energy 46 26631-45, 2021), and Yang Luo, Chuanhao Zhao, *Na Overview of Pre-ignition of Hydrogen Engine*, J. Scientific Research and Reports. 26(10): 1-7, 2020). Milder pre-ignition events may not cause significant engine damage, but can adversely impact fuel economy, engine performance, tailpipe emissions and engine noise, vibration, and harshness (NVH).

Lube oil-derived hydrogen abnormal combustion is different from gasoline low speed pre-ignition. Trace base oil appears to reduce the auto-ignition delay of hydrogen-air mixture, in effect making early abnormal ignition more likely. (see *Hydrogen Combustion in a Compression Ignition Diesel Engine*, Stanislaw Szwaja & Karol Grab-Rogalinski, International Journal of Hydrogen Energy, vol 34, issue 10, May 2009, pg 4413-4421, and Aggarwal S K, Awomolo O and Akber K, *Ignition characteristics of heptane-hydrogen and heptanemethane fuel blends at elevated pressures Int*. J. Hydrogen Energy 36 15392-402, 2011).

As hydrogen internal combustion engines continue to evolve, pre-ignition causes and impacts are expected to evolve as well. First generation hydrogen internal combustion engines are typically port fuel injection or low pressure direct injection. This is driven by available hardware technology (high pressure direct injection injectors do not typically have the required level of durability, and require complex fuel tank management to deliver a competitive vehicle range). The limited fuel pressure possible, combined with propensity of the air-fuel mixture to pre-ignite, is leading engine manufacturers to develop engines with very lean combustion, where the air-to-fuel ratio (AFR) is typically between 2 to 2.5 (in contrast, gasoline engines, which tend to operate around 1).

A consequence of very lean combustion is additional air handling cost, as more air will need to be delivered to the combustion chamber (relative to a non-lean engine), and this requires a higher air charge. In practice, this is delivered with a variable geometry turbocharger, two stage turbocharger or a supercharger. Air charge cooling will also be required to ensure sufficient air density, and to prevent abnormal combustion from heated air charge. Operators will also find that throttle response of lean burn engines is poorer, increasing the time between input and desired output. This is a consequence of the greater inertia of the air charge system, and desire to prevent pre-ignition from fuel enrichment.

Without wishing to be bound by theory, the instant inventors anticipate that engine designers will wish to increase engine brake mean effective pressure (BMEP) to close the performance gap between hydrogen internal combustion engines and diesel or gasoline internal combustion engines, this will require identifying solutions to limit or mitigate pre-ignition at high BMEP, where higher energy combustion and great air/fuel charge will increase the likelihood of pre-ignition. Without wishing to be bound by theory, the instant inventors further expect that engine designers will both wish to increase engine throttle performance, and reduce air charge handling cost by moving to a less lean engine operation (tending towards an air fuel ratio of 1).

It is also recognised in some aspects of abnormal combustion that some components in lubricating oil may have an varying impacts on increasing or decreasing abnormal combustion, and may have impacts on other components as they impact the abnormal combustion events.

Many different lubricant additive chemistries have been proposed to control or influence the occurrence of abnormal combustion events (i.e., pre-ignition, knock, heavy knock type events) in modern internal combustion engines, such as turbocharged, gasoline direct injected engines, but these chemistries do not easily translate to hydrogen fueled engines, which have significantly different combustion environments.

U.S. patent application U.S. Ser. No. 18/475,174, filed Sep. 26, 2023 discusses the prevention of low speed pre-ignition in hydrogen engines, and suggests that lubricants formulated with high levels of abnormal combustion event inhibiting compound(s) (such as phosphorus compounds) can significantly reduce or eliminate abnormal combustion events, offering the opportunity to increase internal combustion engine power density and use a wider range of fuels, such as e-fuels, co-blended fuels, fuels containing abnormal combustion event promoters (e.g., ethanol), and or lower octane/cetane fuels.

U.S. Pat. No. 8,163,681 discloses a lubricant composition of a synthetic oil of lubricating viscosity, 3 to 6 percent by weight of a nitrogen-containing dispersant, 1 to 2.5 weight percent of an overbased magnesium detergent, 1 to 5 weight percent of an antioxidant; and 0.25 to 1.5 weight percent of a friction modifier is useful for lubricating a hydrogen-fueled engine. The composition will typically contain less than 0.01 weight percent Ca, less than 0.01 weight percent Zn, less than 0.06 weight percent P. and will have a sulfated ash level of less than 1.2%. At col 14, line 48-66 of U.S. Pat. No. 8,163,681, it discloses a zinc free low corrosion/rust lubricant for use in a fleet of hydrogen-fueled busses, comprising, other things, group IV basestocks (synthetic polyalpha-olefin), polyolester, succinimide dispersant, magnesium alkyl benzenesulfonate detergents, antioxidant mixture (ester substituted hindered phenol, alkylaromatic amine, and phosphosulfurized olefin), linear fatty acid monoester and oleamide, and antifoam agent, where a calculated KV100 of the combined PAO bases stocks is likely about 12 cSt (based upon a weighted average of the two PAO base stocks), and the lubricant likely has a sixty weight (60) SAE viscosity descriptor.

U.S. Pat. No. 11,034,912 discloses a method of preventing or reducing the occurrence of low speed pre-ignition in a direct-injected, boosted, spark-ignited internal combustion gasoline engine by lubricating the crankcase with a lubricating oil composition having a total sulfated ash content of no greater than about 1.2 mass %, a zinc-phosphorus compound providing said composition with a phosphorus content of from about 0.05 to about 0.08 mass %, a magnesium detergent in an amount providing said composition with at least about 0.3 mass % of magnesium sulfated ash, and an amount of calcium detergent, or calcium and sodium detergent providing said composition with from about 0.3 to about 0.4 mass % of calcium sulfated ash, or calcium and sodium sulfated ash, wherein the total amount of sulfated ash provided to said composition from detergent is no greater than 1.0 mass %, and at least 40 mass % of the total amount of metal introduced into said lubricating oil composition by metal detergent is magnesium, and wherein said zinc phosphorus compound is zinc dihydrocarbyl dithiophosphate derived from secondary alcohol, or primary and secondary alcohol.

Other references of interest include: CN11512503A; WO2023057581; WO 2017/011633; WO 2018/036285; EP 3 366 755; EP 2940110; U.S. Pat. Nos. 11,214,756; 11,034,910; 11,142,719; 10,604,720; 10,214,703; 10,519,394; 10,584,300; 10,669,505; 11,155,764; 10,604,720; Leach et al. SAE Int. J. Fuels Lubr./Volume 15, Issue 1, 2022, SAE 04-15-01-001.

The present inventor's investigations into hydrogen pre-ignition has identified that the impact of lubricant composition in a hydrogen fueled internal combustion engine is distinct to that of gasoline LSPI, and thus presents different and unique challenges.

The present invention relates to lubricating oil compositions for use in (spark-ignited) and (compression-ignited, or spark assisted compression ignited) internal combustion engines fueled with a fuel composition containing up to and including 100% hydrogen; and to the use of additives in such lubricating oil compositions for reducing abnormal combustion events in use of such engines and/or improving the performance, such as the brake mean effective pressure (BMEP) and/or durability impact of a hydrogen fueled engine lubricated with the lubricating oil composition.

It has now surprisingly been found by the present inventors that silicon containing compounds can be used in a lubricant composition, such as in hydrogen fueled internal combustion engines, to provide very low abnormal combustion events, such as pre-ignition.

SUMMARY OF THE INVENTION

This invention relates to a method of reducing abnormal combustion events in a hydrogen fueled internal combustion engine (HICE) during operation of the engine comprising: a) providing to the hydrogen fueled internal combustion engine a lubricating oil composition comprising or resulting from the admixing of: i) a base oil having a viscosity KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 900 ppm by weight of total silicon to the composition; and iv) the lubricating oil composition having a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; and b) providing a fuel comprising hydrogen to the hydrogen fueled internal combustion engine; and c) combusting the fuel in the hydrogen fueled internal combustion engine.

This invention further relates to a lubricating oil composition for hydrogen fueled internal combustion engines (HICE) comprising or resulting from the admixing of: i) a base oil having a KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 900 ppm by weight of total silicon to the composition; and wherein the lubricating oil composition has a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60.

This invention also further relates to a concentrate comprising or resulting from the admixing of: from 5 wt. % to less than or equal to 30 wt. % of one or more base oils having a KV100 of less than or equal to 12 cSt and comprising a Group I base oil, a Group II base oil, a Group III base oil, a Group IV base oil, or combinations thereof; and from 1 to 95 wt. %, based upon the weight of the concentrate, of at least one overbased metal containing detergent with a Total Base Number (KOH/g) greater than or equal to 9 and less than or equal to 500; and from 0.1 to 94 wt. %, based upon the weight of the concentrate, of at least one silicon containing compound.

In another embodiment, the method of reducing abnormal combustion events in a hydrogen fueled internal combustion engine (HICE) during operation of the engine further comprises measuring a number of abnormal pre-ignition events during combustion (1000 rpm, 12 bar BMEP and 1.85 air:fuel ratio (AFR)) and wherein the number of pre-ignition events per 1,000 engine cycles is less than or equal to 1.

In yet another embodiment, the method of reducing abnormal combustion events in a hydrogen fueled internal combustion engine (HICE) during operation of the engine further comprises measuring a number of abnormal pre-ignition events during combustion (1200 rpm, 18 bar BMEP and 2.05 air:fuel ratio (AFR)) and wherein the number of pre-ignition events per 1,000 engine cycles is less than or equal to 2.

In still yet another embodiment, the method of reducing abnormal combustion events in a hydrogen fueled internal combustion engine (HICE) during operation of the engine at 100% load provides a frequency of abnormal pre-ignition events during combustion being decreased by at least 20% compared to a comparable lubricating oil composition not including the at least one silicon containing compound.

This invention further relates to embodiments where the lubricating oil composition used in the hydrogen fueled engine comprises at least one overbased metal containing detergent with a Total Base Number (KOH/g) greater than or equal to 9 and less than or equal to 500.

BRIEF DESCRIPTION OF THE DRAWINGS

FIG. 1 is a graph for the inventive and comparative lubricating oil compositions disclosed herein of the number of pre-ignition events per 1000 cycles (measured at 1000 rpm, 12 bar BMEP and 1.85 air:fuel ratio (AFR)) as a function of lubricating oil composition silicon containing compound silicon content, loading, or treat level in the composition in a hydrogen fueled internal combustion engine (HICE) showing a clear credit for higher silicon content in the composition.

FIG. 2 is a bar graph for the inventive and comparative lubricating oil compositions disclosed herein of the number of pre-ignition events per 1000 cycles (measured at 1200 rpm, 18 bar BMEP and 2.05 air:fuel ratio (AFR)) as a function of lubricating oil composition silicon containing compound silicon content, loading, or treat level in the composition in a hydrogen fueled internal combustion engine (HICE) showing a clear credit for higher silicon content in the composition.

DEFINITIONS

For purposes of this specification and all claims to this invention, the following words and expressions, if and when used, have the meanings ascribed below.

For purposes herein, the new numbering scheme for the Periodic Table of the Elements is used as set out in CHEMICAL AND ENGINEERING NEWS, 63(5), 27 (1985), i.e., Alkali metals are group 1 metals (e.g., Li, Na, K, etc.) and Alkaline earth metals are group 2 metals (e.g., Mg, Ca, Ba, etc.).

The term “about” means approximately, which includes values obtain by rounding. As used herein, the term “about” modifying the quantity of an ingredient, component, or reactant of the invention employed refers to variation in the numerical quantity that can occur, for example, through typical measuring and liquid handling procedures used for making concentrates or lubricating oil compositions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The term "LOC" means lubricating oil composition.

The term "major amount" means more than 50 mass % of a composition, such as more than 60 mass % of a composition, such as more than 70 mass % of a composition, such as from 80 to 99.009 mass % of a composition, such as from 80 to 99.9 mass % of a composition, of a composition based upon the mass of the composition.

The term "mass %" means mass percent of a component, based upon the mass of the composition as measured in grams, unless otherwise indicated, and is alternately referred to as weight percent ("weight %", "wt %", "wt. %" or "% w/w").

The term "minor amount" means 50 mass % or less of a composition; such as 40 mass % or less of a composition; such as 30 mass % or less of a composition, such as from 20 to 0.001 mass %, such as from 20 to 0.1 mass %, based upon the mass of the composition.

The term "active ingredient" (also referred to as "a.i." or "A.I.") refers to additive material that is neither diluent nor solvent. Unless otherwise indicated, amounts herein are described as active ingredient.

The terms "oil-soluble" and "oil-dispersible," or cognate terms, used herein do not necessarily indicate that the compounds or additives are soluble, dissolvable, miscible, or are capable of being suspended in the oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired.

The term "hydrocarbon" means a compound of hydrogen and carbon atoms. A "heteroatom" is an atom other than carbon or hydrogen. When referred to as "hydrocarbons," particularly as "refined hydrocarbons," the hydrocarbons may also contain one or more heteroatoms or heteroatom-containing groups (such as halo, especially chloro and fluoro, amino, alkoxyl, mercapto, alkylmercapto, nitro, nitroso, sulfoxy, etc.) in minor amounts (e.g., where the heteroatom(s) do not substantially alter the hydrocarbon properties of the hydrocarbon compound).

The terms "group" and "radical" are used interchangeably herein.

The term "hydrocarbyl" means a radical that contains hydrogen and carbon atoms. Preferably, the group consists essentially of, more preferably consists only of, hydrogen and carbon atoms, unless specified otherwise. Preferably, the hydrocarbyl group comprises an aliphatic hydrocarbyl group. The term "hydrocarbyl" includes "alkyl," "alkenyl," "alkynyl," and "aryl" as defined herein. Hydrocarbyl groups may contain one or more atoms/groups other than carbon and hydrogen provided they do not affect the essentially hydrocarbyl nature of the hydrocarbyl group. Those skilled in the art will be aware of such atoms/groups (e.g., halo, especially chloro and fluoro, amino, alkoxyl, mercapto, alkylmercapto, nitro, nitroso, sulfoxy, etc.).

The term "alkyl" means a radical of carbon and hydrogen (such as a $C_1$ to $C_{30}$, such as a $C_1$ to $C_{12}$ group). Alkyl groups in a compound are typically bonded to the compound directly via a carbon atom. Unless otherwise specified, alkyl groups may be linear (i.e., unbranched) or branched, be cyclic, acyclic, or part cyclic/acyclic. Preferably, the alkyl group comprises a linear or branched acyclic alkyl group. Representative examples of alkyl groups include, but are not limited to, methyl, ethyl, n-propyl, iso-propyl, n-butyl, sec-butyl, iso-butyl, tert-butyl, n-pentyl, iso-pentyl, neo-pentyl, hexyl, heptyl, octyl, dimethyl hexyl, nonyl, decyl, undecyl, dodecyl, tridecyl, tetradecyl, pentadecyl, hexadecyl, heptadecyl, octadecyl, nonadecyl, icosyl and triacontyl.

The term "alkenyl" means a radical of carbon and hydrogen (such as a $C_2$ to $C_{30}$ radical, such as a $C_2$ to $C_{12}$ radical) having at least one double bond. Alkenyl groups in a compound are typically bonded to the compound directly via a carbon atom. Unless otherwise specified, alkenyl groups may be linear (i.e., unbranched) or branched, be cyclic, acyclic or part cyclic/acyclic.

The term "alkylene" means a $C_1$ to $C_{20}$, preferably a $C_1$ to $C_{10}$, bivalent saturated aliphatic radical, which may be linear or branched. Representative examples of alkylene include methylene, ethylene, propylene, butylene, pentylene, hexylene, heptylene, octylene, nonylene, decylene, 1-methyl ethylene, 1-ethyl ethylene, 1-ethyl-2-methyl ethylene, 1,1-dimethyl ethylene and 1-ethyl propylene.

An "olefin", alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "isoprene" content of 55 mass % to 95 mass %, it is understood that the mer unit in the copolymer is derived from isoprene in the polymerization reaction and said derived units are present at 55 mass % to 95 mass %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An "isoprene polymer" or "isoprene copolymer" is a polymer or copolymer comprising at least 50 mol % isoprene derived units, a "butadiene polymer" or "butadiene copolymer" is a polymer or copolymer comprising at least 50 mol % butadiene derived units, and so on. Likewise, when a polymer is referred to as a "partially or fully saturated polymer comprising $C_{4-5}$ olefins," the $C_{4-5}$ olefin(s) present in such polymer or copolymer are the polymerized form of the olefin(s), and the polymer has been partially or fully saturated (such as by hydrogenation) after polymerization of the monomers.

The term "alkynyl" means a $C_2$ to $C_{30}$ (such as a $C_2$ to $C_{12}$) radical, which includes at least one carbon-to-carbon triple bond.

The term "aryl" means a group containing at least one aromatic ring, such a cyclopentadiene, phenyl, naphthyl, anthracenyl, and the like. Aryl groups are typically $C_5$ to $C_{40}$ (such as $C_5$ to $C_{18}$, such as $C_6$ to $C_{14}$) aryl groups, optionally substituted by one or more hydrocarbyl groups, heteroatoms, or heteroatom-containing groups (such as halo, hydroxyl, alkoxy and amino groups). Preferred aryl groups include phenyl and naphthyl groups and substituted derivatives thereof, especially phenyl, and alkyl substituted derivatives of phenyl.

The term "substituted" means that a hydrogen atom has been replaced with hydrocarbon group, a heteroatom, or a heteroatom-containing group. An alkyl substituted derivative means a hydrogen atom has been replaced with an alkyl group. An "alkyl substituted phenyl" is a phenyl group where a hydrogen atom has been replaced by an alkyl group, such as a $C_1$ to $C_{20}$ alkyl group, such as methyl, ethyl, n-propyl, iso-propyl, n-butyl, sec-butyl, iso-butyl, tert-butyl, n-pentyl, iso-pentyl, neo-pentyl, hexyl, heptyl, octyl, dimethyl hexyl, nonyl, decyl, undecyl, dodecyl, tridecyl, tetradecyl, pentadecyl, hexadecyl, heptadecyl, octadecyl, nonadecyl, icosyl and/or triacontyl.

The term "halogen" or "halo" means a group 17 atom or a radical of group 17 atom, such as fluoro, chloro, bromo, and iodo.

The term "ashless" in relation to an additive means the composition does not include a metal. The term "ash-containing" in relation to an additive means the composition includes a metal.

The term "effective amount" in respect of an additive means an amount of such an additive in a lubricating oil composition so that the additive provides the desired technical effect.

The term "effective minor amount" in respect of an additive means an amount of such an additive of less than 50 mass % of the lubricating oil composition so that the additive provides the desired technical effect. The term "effective major amount" in respect of an additive means an amount of such an additive of 50 mass % or more of the lubricating oil composition so that the additive provides the desired technical effect.

The term "ppm" means parts per million by mass, based on the total mass of the lubricating oil composition, unless otherwise indicated.

The term "metal content" of a lubricating oil composition or of an additive component, for example, magnesium content, molybdenum content or total metal content (i.e., the sum of all individual metal contents), is measured by ASTM D5185.

The term "absent" or "substantially free" as it relates to components included within the lubricating oil compositions described herein and the claims thereto means that the particular component is present at 0 mass %, based upon the weight of the lubricating oil composition, or if present in the lubricating oil composition the component is present at levels that do not impact the lubricating oil composition properties, such as less than 10 ppm, or less than 1 ppm or less than 0.001 ppm. When the term "absent" is used in relation to monomer reactants and/or to repeat units in (co)polymers described herein, it means present at 0 wt %, based upon the weight of all (co)monomers in the (co) polymer, or, if present at all, at levels so low that they do not substantially impact the physical properties of the (co) polymer, such as at 0.2 wt % or less or at 0.1 wt % or less.

As used herein, Mn is number average molecular weight, Mw is weight average molecular weight, and Mz is z average molecular weight. Molecular weight distribution (MWD), also referred to as polydispersity index (PDI), is defined to be Mw divided by Mn. Unless otherwise noted, all molecular weight units (e.g., Mw, Mn, Mz) are reported in g/mol. When used in context of functionalized polymers (such as dispersants, functionalized styrenic polymers, etc.), the molecular weights are typically reported in terms of the base polymer prior to modification. For example PIBSA-PAM dispersant molecular weights are typically reported for the base polyisobutylene polymer prior to functionalization with the acylating agent (maleic acid or anhydride) and functional group (such as polyamine).

Total Base Number, also referred to as "TBN," in relation to an additive component or of a lubricating oil composition (i.e., unused lubricating oil composition) means total base number as measured by ASTM D2896 and reported in units of mgKOH/g. "High TBN" is considered to be greater than or equal to 200 KOH/g, or 300 to 500 mgKOH/g. "Low TBN" is considered less than 200 KOH/g, or less than 100 KOH/g.

Total Acid Number ("TAN") is determined by ASTM D664.

Phosphorus, Boron, Calcium, Zinc, Molybdenum, Sodium, Silicon, and Magnesium content are measured by ASTM D5185.

Sulfur content in oil formulations is measured by ASTM D5185.

Sulfated ash ("SASH") content is measured by ASTM D874.

Kinematic viscosity (KV100, KV40) is determined pursuant to ASTM D445-19a and reported in units of cSt, unless otherwise specified.

Viscosity index is determined according to ASTM D2270.

Saponification number is determined by ASTM D94, and reported in units of mgKOH/g.

A hydrogen fueled internal combustion engine (HICE) is an internal combustion engine (mobile or standing) that uses a fuel containing hydrogen as the combustion source in a spark ignited, a compression ignited or a combination thereof engine, which can be up to substantially 100 mass % hydrogen (which means impurities levels of other components may be present), such as 1 to 100 mass % hydrogen, such as 25 to 100 mass % hydrogen, such as 50 to 100 mass % hydrogen, such as 77 to 100 mass % hydrogen based upon the total mass of the fuel. Common fuels containing hydrogen include compressed hydrogen, hydrogen compressed hydrocarbon combinations (such as hydrogen/compressed natural gas), and the like.

For purposes of this specification and all claims to this invention, an abnormal combustion event ("ACE") is defined to be an event where combustion in a spark ignited internal combustion engine (SI engine) occurs outside the flame front propagated from a spark plug, or in a compression ignited internal combustion engine ("CI engine") an event where combustion occurs outside of or in the incorrect location or time of the piston compression cycle. A spark assisted compression ignited engine may have either or both of the above defined of abnormal combustion events. Auto-ignition and pre-ignition are both abnormal combustion events. Auto-ignition (also referred to as detonation) is the spontaneous combustion of an fuel/air mixture in the combustion chamber that occurs after normal combustion is initiated by the spark plug or by compression (such as by a compressing piston). Pre-ignition is defined as the ignition of the air/fuel mixture prior to the spark plug firing in an spark ignition (SI) engine or prior to the correct time/pressure in the compression ignition cycle in a compression ignition (CI) engine. Low Speed Pre-ignition (LSPI) is a specific type of pre-ignition which occurs under low engine speeds and relatively high engine loads. Knocking (also referred to as knock, detonation, spark knock, pinging or pinking) in internal combustion engines typically occurs when combustion of some of the air/fuel mixture in the cylinder does not result from propagation of the flame front ignited by the spark plug, but one or more pockets of air/fuel mixture explode outside the envelope of the normal combustion front. The fuel-air charge is meant to be ignited by the spark plug only and at a precise point in the piston's stroke. Knock occurs when the peak of the combustion process no longer occurs at the optimum moment for the engine stroke cycle (such as a four-stroke cycle). The shock wave from the auto-ignition can create the characteristic metallic "pinging" or "knocking" sound. Effects of engine knocking range from inconsequential to completely destructive to the engine. Knocking should not be confused with pre-ignition as they are two separate events. However, pre-ignition can be followed by knocking. Abnormal combustion events (such as auto-ignition) are influenced by multiple factors, including but not limited to, engine design (shape, size, geometry, plug location), spark plug performance/timing, compression ratio, engine timing, air/fuel mixture temperature, cylinder pressure, fuel octane rating, lubricant composition, fuel additive composition, and the like.

Octane number is defined as the Research Octane Number plus the Motor Octane Number divided by two (i.e., (RON+MON)/2). Research Octane Number is determined by ASTM D2699-21. Motor Octane Number is determined by ASTM D2700-21. Diesel gasoline cetane number is determined by ASTM D613.

Unless otherwise indicated, all percentages reported are mass % on an active ingredient basis, i.e., without regard to carrier or diluent oil.

Also, it will be understood that various components used, essential as well as optimal and customary, may react under conditions of formulation, storage or use and that the disclosure also provides the product obtainable or obtained as a result of any such reaction.

Further, it is understood that any upper and lower quantity, range and ratio limits set forth herein may be independently combined.

Also, it will be understood that the preferred features of each aspect of the present disclosure are regarded as preferred features of every other aspect of the present disclosure. Accordingly, preferred and more preferred features of one aspect of the present disclosure may be independently combined with other preferred and/or more preferred features of the same aspect or different aspects of the present disclosure.

DETAILED DESCRIPTION OF THE INVENTION

The features of the disclosure relating, where appropriate, to each and all aspects of the disclosure, will now be described in more detail as follows.

The inventors have unexpectedly and surprisingly discovered that the presence of higher levels of silicon from one or more silicon containing compounds used in the lubricating oil composition for a hydrogen fueled internal combustion engine (HICE) has a significant impact on the propensity for abnormal combustion events (ACE) that occur during the combustion of the hydrogen containing fuel in the HICE. In particular, the inventors have discovered that the presence of silicon above a certain threshold level from one or more silicon containing compounds when used in the lubricating oil composition acts as a quencher and decreases the propensity of ACE, and in particular abnormal pre-ignition events relative to a comparable lubricating oil composition not including the one or more silicon containing compounds or the one or more silicon containing compounds at treat rates below the threshold level, which is unexpected and surprising. In particular, the threshold level of silicon for a significant reduction in abnormal combustion events in a hydrogen fueled internal combustion engine is at a level significantly higher than that incorporated by anti-formants in lubricating oils for gas fueled internal combustion engines. The inventors have also discovered that at least one silicon containing compound included at a treat level to deliver between 50 to 900 ppm by weight of total silicon to the composition, decreases the propensity of ACE, and in particular abnormal pre-ignition events relative to a comparable lubricating oil composition not including the at least one silicon containing compound or the at least one silicon containing compound at less than 50 ppm by weight of silicon to the composition, which is unexpected and surprising.

Hydrogen engine abnormal combustion is distinct and different to gasoline combustion engine low speed preignition (LSPI). In particular, a hydrogen-air mixture requires much lower minimum ignition energy than a gasoline-air mixture, that is approximately 0.02 mJ for a hydrogen-air mixture compared to 0.25 mJ for gasoline-air mixture. Additionally, a hydrogen-air mixture also exhibits shorter ignition delay than a gasoline-air mixture at high combustion temperatures and low cylinder pressures. (See, http://teams/sites/il/Conferences/Baden % 20Baden %20-%20International %20Engine %20Congress/20 23% 2010th %20International %20Engine %20Congress/13p_Matsubara_Toyota.pdf.). These factors are expected to increase the propensity for hydrogen abnormal combustion compared to gasoline pre-ignition under equivalent combustion conditions. Furthermore, the high propensity for hydrogen internal combustion engines (ICEs) to experience abnormal combustion requires lean combustion operation with air to fuel ratios of from 1.5 to 2.5 being typical. In contrast, gasoline combustion engines operate near-stoichiometrically with an air to fuel ratio of about or approximately 1.0. It is well known that fuel enrichment in gasoline engines experiencing LSPI will mitigate pre-ignition. (See, https://cris.brighton.ac.uk/ws/portalfiles/portal/31594156/Harvey Thesis.pdf.). However in hydrogen ICE applications, the inventors have demonstrated that abnormal combustion, and specifically pre-ignition unexpectedly and surprisingly increases with fuel enrichment (reference Table 1 herein) contrary to what is typical in a gasoline ICE.

Lubricating Oil Compositions and Methods of Using Such Compositions to Reduce Pre-Ignition This invention relates to a method of reducing abnormal combustion events in a hydrogen fueled internal combustion engine (HICE) during operation of the engine comprising:

a) providing to the hydrogen fueled internal combustion engine a lubricating oil composition comprising or resulting from the admixing of:

i) a base oil having a viscosity KV100 of less than or equal to 12 cSt and included at greater than 50 wt. % of the composition and comprising a Group I base oil, a Group II base oil, a Group III base oil, a Group IV base oil, or combinations thereof;

ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition;

iii) at least one silicon containing compound included at a treat level to deliver between 50 to 900 ppm by weight of total silicon to the composition; and iv) the lubricating oil composition having a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; and b) providing a fuel comprising hydrogen to the hydrogen fueled internal combustion engine; and c) combusting the fuel in the hydrogen fueled internal combustion engine.

This invention also relates to a lubricating oil composition for hydrogen fueled internal combustion engines (HICE) comprising or resulting from the admixing of:

i) a base oil having a KV100 of less than or equal to 12 cSt and included at greater than 50 wt. % of the composition and comprising a Group I base oil, a Group II base oil, a Group III base oil, a Group IV base oil, or combinations thereof;

ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition;

iii) at least one silicon containing compound included at a treat level to deliver between 50 to 900 ppm by weight of total silicon to the composition; and wherein the lubricating oil composition has a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60.

The method of reducing abnormal combustion events in a hydrogen fueled internal combustion engine (HICE) during operation of the engine may further include measuring a number of abnormal pre-ignition events during combustion at 1000 rpm, 12 bar BMEP and 1.85 air:fuel ratio (AFR)), which results in the number of pre-ignition events per 1,000 engine cycles being less than 1, or less than 0.75, or less than 0.50, or less than 0.25.

The method of reducing abnormal combustion events in a hydrogen fueled internal combustion engine (HICE) during operation of the engine may further include measuring a number of abnormal pre-ignition events during combustion at 1000 rpm, 18 bar BMEP and 2.05 air:fuel ratio (AFR)), which results in the number of pre-ignition events per 1,000 engine cycles being less than 2.0, or less than 1.5, or less than 1.0, or less than 0.75, or less than 0.50, or less than 0.25.

The method of reducing abnormal combustion events in a hydrogen fueled internal combustion engine (HICE) during operation of the engine may further include measuring a number of abnormal pre-ignition events during combustion at 1000 rpm to 1200 rpm, 12 to 18 bar BMEP and 1.5 to 2.5 air:fuel ratio (AFR)), which results in the number of pre-ignition events per 1,000 engine cycles during combustion in the HICE operating at full (100%) load being decreased by at least 20%, or at least 30%, or at least 40%, or at least 50%, or at least 60%, or at least 70%, or at least 80%, or at least 90% compared to a comparable lubricating oil composition not including the at least one silicon containing compound.

The base oil used in the method of reducing abnormal combustion events in a hydrogen fueled internal combustion engine (HICE) during operation of the engine and the lubricating oil composition of the instant disclosure for use in a HICE may have a KV100 viscosity of less than or equal to 12 cSt, or less than 10 cSt, or less than 9 cSt, or less than 8 cSt, or less than 7 cSt, or less than 6 cSt, or less than 5 cSt, or less than 5 cSt; and may be included at greater than 50 wt. %, or greater than 60 wt. %, or greater than 70 wt. %, or greater than 80 wt. %, or greater than 90 wt. %, or greater than 95 wt. % of the composition.

Silicon Containing Compounds

The at least one silicon containing compound used in the method of reducing abnormal combustion events in a hydrogen fueled internal combustion engine (HICE) during operation of the engine and the lubricating oil composition of the instant disclosure for use in a HICE may include, but is not limited to, siloxane compounds, organo modified siloxane compounds, small molecule silicon compounds, and silazane compounds.

Optionally, the method of reducing abnormal combustion events in a hydrogen fueled internal combustion engine (HICE) during operation of the engine and the lubricating oil composition of the instant disclosure for use in a HICE comprises a silicon antifoam additive. Preferably, at least a portion of the silicon content of the lubricating oil composition is provided by a silicon antifoam additive, such as a major portion. It may be that introducing at least a portion of the silicon content of the lubricating oil composition into the composition in the form of a silicon-containing antifoam additive provides a particularly convenient way of introducing silicon. Optionally, one or more silicon antifoam agents provide at least 50 ppm, such as at least 75 ppm, for example at least 100 ppm, by weight silicon in the lubricating oil composition, based on the weight of the lubricating oil composition. Optionally, at least 20 wt. %, preferably at least 40 wt./, such as at least 60 wt. %, for example at least 80 wt. %, of the silicon in the lubricating oil composition, based on the weight of the silicon in the lubricating oil composition, is provided by one or more silicon antifoam additives. Optionally, 100 wt %, of the silicon in the lubricating oil composition, based on the weight of the silicon in the lubricating oil composition, is provided by one or more silicon antifoam additives. Optionally, from 20 wt. % to 100 wt. %, preferably from 40 wt. % to 80 wt. %, such as from 50 wt. % to 70 wt. %, of the silicon in the lubricating oil composition, based on the weight of the silicon in the lubricating oil composition, is provided by one or more silicon antifoam additives. Additionally, or alternatively, the lubricating oil composition optionally comprises an antifoam additive that is free from silicon (in other words, the lubricating oil composition optionally comprises a non-silicon antifoam additive).

Optionally, the method of reducing abnormal combustion events in a hydrogen fueled internal combustion engine (HICE) during operation of the engine and the lubricating oil composition of the instant disclosure for use in a HICE comprises one or more silicon-containing compounds that is not an antifoam agent (for example, that is not used as an antifoam agent). In a preferred embodiment, at least a portion of the silicon content of the lubricating oil composition is provided by a silicon-containing compound that is not an antifoam, such as a major portion. It may be that introducing at least a portion of the silicon content of the lubricating oil composition into the composition in the form of a silicon-containing compound that is not an antifoam provides a particularly convenient way of introducing silicon, for example it may be that at least some silicon-containing compounds that are not antifoam additives are more soluble in oil compositions than silicon antifoam additives. Optionally, one or more silicon-containing compounds that are not antifoam additives provide at least 50 ppm, such as at least 75 ppm, for example at least 100 ppm, by weight silicon in the lubricating oil composition, based on the weight of the lubricating oil composition. Optionally, at least 20 wt. %, preferably at least 40 wt. %, such as at least 60 wt. %, for example at least 80 wt. %, of the silicon in the lubricating oil composition, based on the weight of the silicon in the lubricating oil composition, is provided by one or more silicon-containing compounds that are not antifoam additives. Optionally, 100 wt. %, of the silicon in the lubricating oil composition, based on the weight of the silicon in the lubricating oil composition, is provided by one or more silicon-containing compounds that are not antifoam additives. Optionally, from 20 wt. % to 100 wt. %, preferably from 40 wt. % to 80 wt. %, such as from 50 wt. % to 70 wt. %, of the silicon in the lubricating oil composition, based on the weight of the silicon in the lubricating oil composition, is provided by one or more silicon-containing compounds that are not antifoam additives.

Optionally, the method of reducing abnormal combustion events in a hydrogen fueled internal combustion engine (HICE) during operation of the engine and the lubricating oil composition of the instant disclosure for use in a HICE comprises one or more siloxane compound, such as a polymeric siloxane compound. Preferably, the method of reducing abnormal combustion events and the lubricating oil composition comprises one or more siloxane compound in an amount of at least about 0.01 wt. %, such as at least about 0.015 wt. %, for example at least about 0.02 wt. %, based on the weight of the lubricating oil composition. Optionally, the method of reducing abnormal combustion events and lubricating oil composition comprises one or more siloxane compound in an amount of about 0.01 wt. % to about 0.1 wt./, such as about 0.015 wt. % to about 0.07 wt. %, for example about 0.02 wt. % to about 0.04 wt. %, based on the weight of the lubricating oil composition. For example, it may be that the method of reducing abnormal combustion events and the lubricating oil composition comprises a polyalkyl siloxane, such as a polydialkyl siloxane, for example wherein alkyl is a $C_1$-$C_{10}$ alkyl group, e.g. a polydimethylsiloxane (PDMS), also known as a silicone oil. It may be that, for example, the method of reducing abnormal combustion events and the lubricating oil composition comprises a polymeric siloxane compound according to Formula 1, below, wherein $R^1$ and $R^2$ are methyl, and n is from 50 to 450. Optionally, a major portion of the silicon content of the lubricating oil is provided by the one or more siloxane compound.

Additionally, or alternatively, it may be that the method of reducing abnormal combustion events and the lubricating oil composition comprises an organo modified siloxane (OMS), such as a siloxane modified with an organo group such as a polyether (e.g. ethylene-propyleneoxide copolymer), long chain hydrocarbyl (e.g. $C_{11}$-$C_{100}$ alkyl), or aryl (e.g. $C_6$-$C_{14}$ aryl). Preferably, the method of reducing abnormal combustion events and the lubricating oil composition comprises one or more OMS compounds in an amount of at least about 0.01 wt. %, such as at least about 0.05 wt. %, for example at least about 0.1 wt./O, based on the weight of the lubricating oil composition. Optionally, the method of reducing abnormal combustion events and the lubricating oil composition comprises one or more OMS compounds in an amount of about 0.01 wt. % to about 0.6 wt. %, such as about 0.05 wt. % to about 0.4 wt. %, for example about 0.1 wt. % to about 0.2 wt. %, based on the weight of the lubricating oil composition. It may be that, for example, the method of reducing abnormal combustion events and the lubricating oil composition comprises an organo modified siloxane compound according to Formula 1, wherein n is from 50 to 450, and wherein $R^1$ and $R^2$ are the same or different, optionally wherein each of $R^1$ and $R^2$ is, independently an organo group, such as an organo group as defined hereinabove. Preferably, one of $R^1$ and $R^2$ is $CH_3$. Optionally, a major portion of the silicon content of the lubricating oil is provided by the one or more OMS compounds. It may be that, for example, OMS compounds are particularly soluble in lubricating oil compositions, thus providing a particularly convenient additive for providing a relatively high silicon content in a lubricating oil composition.

Formula 1

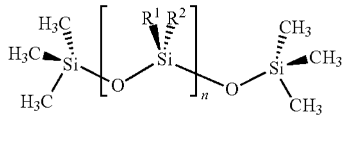

Optionally, the method of reducing abnormal combustion events and the lubricating oil composition comprises one or more small molecule silicon compound, for example an organic small molecule silicon compound. Preferably, the method of reducing abnormal combustion events and the lubricating oil composition comprises one or more small molecule silicon compounds in an amount of at least about 0.01 wt. %, such as at least about 0.03 wt. %, for example at least about 0.06 wt. %, based on the weight of the lubricating oil composition. Optionally, the method of reducing abnormal combustion events and the lubricating oil composition comprises one or more small molecule silicon compounds in an amount of about 0.01 wt. % to about 0.3 wt. %, such as about 0.03 wt. % to about 0.2 wt. %, for example about 0.06 wt. % to about 0.1 wt. %, based on the weight of the lubricating oil composition.

Preferably, a small molecule silicon compound is a silicon-containing molecule having a molecular weight of no more than 600 g/mol, such as no more than 450 g/mol, for example, no more than 300 g/mol. Optionally, a small molecule silicon compound is a silicon-containing molecule having a molecular weight of from 78 to 600 g/mol, such as from 100 to 450 g/mol, for example from 130 to 300 g/mol. Additionally, or alternatively, a small molecule silicon compound is a silicon compound having a carbon number of from 4 to 24, such as from 4 to 20, for example from 8 to 13, and/or a silicon number of from 1 to 8, such as from 1 to 4, for example from 1 to 2. It will be appreciated that a molecule having a carbon number of 4, for example, is a molecule comprising 4 carbon atoms.

Preferably, a major portion of the silicon content of the lubricating oil is provided by the one or more small molecule silicon compounds. It may be that, for example, small molecule silicon compounds are particularly soluble in lubricating oil compositions and provide a particularly even and effective dispersion of silicon in the composition.

Optionally, the method of reducing abnormal combustion events and the lubricating oil composition comprises one or more small molecule silicon compounds according to Formula 2, wherein each of $R^1$, $R^2$, $R^3$ and $R^4$ is, independently, a $C_1$-$C_{10}$ hydrocarbyl group or a $C_1$-$C_{10}$ heterocarbyl group, such as a $C_1$-$C_{10}$ alkyl group or a $C_1$-$C_{10}$ aklyoxy group. Optionally, at least one of, such as at least two or, for example at least three of, optionally all of the $R^1$, $R^2$, $R^3$ and $R^4$ groups is selected from the list consisting of methyl, ethyl, propyl, butyl, pentyl, hexyl, heptyl, octyl, nonyl, and decyl groups, such as ethyl, propyl, and butyl groups.

Additionally, or alternatively, at least one of, such as at least two or, for example at least three of, optionally all of the $R^1$, $R^2$, $R^3$ and $R^4$ groups is selected from the list consisting of methyloxy, ethyloxy, propyloxy, butyloxy, pentyloxy, hexyloxy, heptyloxy, octyloxy, nonyloxy, and decyloxy groups, such as ethyloxy, propyloxy, and butyloxy groups. Optionally, at least one of the $R^1$, $R^2$, $R^3$ and $R^4$ groups is an alkyl group and at least one of the $R^1$, $R^2$, $R^3$ and $R^4$ groups is an alkoxy group.

In a preferred embodiment, the method of reducing abnormal combustion events and the lubricating oil composition comprises one or more silicon-containing compounds selected from the list consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$). In an embodiment of the invention, the lubricating oil composition the one or more silicon-containing compounds is selected from the list consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$).

Formula 2

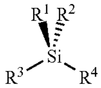

Optionally, the method of reducing abnormal combustion events and the lubricating oil composition comprises one or more silazane compounds. Preferably, the method of reducing abnormal combustion events and the lubricating oil composition comprises one or more silazane compounds in an amount of at least about 0.01 wt. %, such as at least about 0.03 wt. %, for example at least about 0.06 wt./, based on the weight of the lubricating oil composition. Optionally, the method of reducing abnormal combustion events and the lubricating oil composition comprises one or more silazane compounds in an amount of about 0.01 wt. % to about 0.3 wt. %, such as about 0.03 wt. % to about 0.2 wt. %, for example about 0.06 wt. % to about 0.1 wt. %, based on the weight of the lubricating oil composition. For example, it may be that the silazane compound is a compound according to Formula 3, below, wherein each of $R^1$ and $R^2$ is, independently, a $C_1$-$C_3$ hydrocarbyl group, such as a $C_1$-$C_3$ alkyl group. Optionally, at least one of, such both of the $R^1$ and $R^2$ groups is selected from the list consisting of methyl, ethyl, and propyl. Optionally, the lubricating oil composition comprises octamethyl cyclotetrasilazane $C_8H_{28}N_4Si_4$.

Formula 3

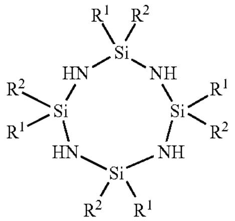

In an embodiment of the present invention that silicon-containing compound does not comprise a fluorinated polysiloxane.

Preferably, the composition comprises one or more silicon-containing compounds selected from the list consisting of siloxane compounds, organo modified siloxane compounds, small molecule silicon compounds, and silazane compounds. In an embodiment, the composition comprises one or more silicon-containing compounds selected from the list consisting of siloxane compounds, organo-modified siloxane compounds, tetraethylsilane ($Si(C_2H_5)_4$), tetraethyl orthosilicate ($Si(OC_2H_5)_4$), triethoxymethylsilane ($CH_3Si(OC_2H_5)_3$), tetrabutyl orthosilicate ($Si(OC_4H_9)_4$) and silazane compounds.

Preferably, the method of reducing abnormal combustion events and the lubricating oil composition comprises said silicon-containing compound in an amount or treat level to deliver at least 50 ppm to up to 900 ppm, or 60 ppm to 800 ppm, or 70 ppm to 700 ppm, or 75 ppm to 600 ppm, or 70 ppm to 800 ppm, or 80 ppm to 750 ppm, or 90 ppm to 700 ppm, or 100 ppm to 650 ppm, or 110 ppm to 600 ppm, or 120 ppm to 550 ppm, or 130 ppm to 500 ppm, or 140 ppm to 450 ppm, or 150 ppm to 400 ppm, or 160 ppm to 350 ppm, or 170 ppm to 300 ppm, or 180 ppm to 250 ppm, or 190 ppm to 225 ppm, or 200 ppm to 220 ppm, of total silicon based on the weight of the lubricating oil composition. Preferably, the method of reducing abnormal combustion events and the lubricating oil composition comprises said silicon-containing compound in an amount or treat level to deliver no more than 900 ppm, such as no more than 800 ppm, such as no more than 700 ppm, for example no more than 600 ppm of total silicon, based on the weight of the lubricating oil composition. Optionally, the method of reducing abnormal combustion events and the lubricating oil composition comprises said silicon-containing compound in an amount or treat level to deliver at least 50 ppm, or at least 60 ppm, or at least 70 ppm, or at least 80 ppm, or at least 90 ppm, or at least 100 ppm, or at least 120 ppm, or at least 140 ppm, or at least 160 ppm, or at least 180 ppm, or at least 200 ppm, or at least 300 ppm, or at least 400 ppm, or at least 500 ppm, or at least 600 ppm, but no more than 900 ppm of total silicon based on the weight of the lubricating oil composition. Suitably, the silicon content of the lubricating oil described herein above is provided entirely by the silicon compounds as described hereinabove.

Overbased Metal Containing Detergent

The method of reducing abnormal combustion events in a hydrogen fueled internal combustion engine (HICE) during operation of the engine and the lubricating oil composition of the instant disclosure for use in a HICE also includes at least one overbased metal containing detergent with a Total Base Number (KOH/g) greater than or equal to 9 and less than or equal to 500 and included at a treat level to deliver between 100 to 5000 ppm by weight of total metal to the composition. The overbased metal containing detergent may have a Total Base Number (KOH/g) greater than or equal to 9 and less than or equal to 500, or alternatively 50 to 450, or alternatively 100 to 400, or 150 to 400, or 200 to 350, or 250 to 300 (KOH/g). In another form, the overbased magnesium containing detergent may have a TBN of 100 mgKOH/g or more (such as 200 mgKOH/g or more), and typically will have a TBN of 250 mgKOH/g or more, such as 300 mgKOH/g or more, such as from 200 to 500 mgKOH/g, 225 to 450 mgKOH/g, 250 to 400 mgKOH/g, or 300 to 350 mgKOH/g.

The overbased metal containing detergent used in the method of reducing abnormal combustion events in a hydrogen fueled internal combustion engine (HICE) during operation of the engine and the lubricating oil composition of the instant disclosure for use in a HICE may be included at treat level to deliver between 100 to 5000 ppm, or 500 to 4500 ppm, or 1000 to 4000 ppm, or 1500 to 3500 ppm, or 2000 to 3000 ppm, or 400 to 1200 ppm by weight of total metal to the lubricating oil composition.

The overbased metal containing detergent used in the method of reducing abnormal combustion events in a hydrogen fueled internal combustion engine (HICE) during operation of the engine and the lubricating oil composition of the instant disclosure for use in a HICE may be included at treat level to deliver between 0.15 to 8.0 wt. %, or 0.2 to 7.5 wt. %, or 0.3 to 7.0 wt. %, or 0.4 to 6.5 wt. %, or 0.5 to 6.0 wt. %, or 0.6 to 5.0 wt. %, or 0.8 to 4.0 wt. %, or 1.0 to 3.0 wt. %, or 1.5 to 2.5 wt. %, or 2.0 to 2.3 wt. % of total soap to the lubricating oil composition. Alternatively, the overbased metal containing detergent may be included at treat level to deliver between 1.0 to 100 mmol, or 2.0 to 50 mmol, or 3.0 to 30 mmol, or 4.0 to 20 mmol, or 5.0 to 15 mmol, or 7.0 to 12 mmol of total soap to the lubricating oil composition.

The method of reducing abnormal combustion events in a hydrogen fueled internal combustion engine (HICE) during operation of the engine and the lubricating oil composition of the instant disclosure for use in a HICE including the at least one overbased metal containing detergent may be, but is not limited to, a sulfonate, a salicylate, a phenate or combinations thereof. The metal of the at least one overbased metal detergent may be, but is not limited to, sodium, potassium, lithium, calcium, and magnesium and combinations thereof. Particularly advantageous overbased metal containing detergents include calcium salicylate, calcium sulfonate, magnesium sulfonate, magnesium salicylate, and magnesium phenate.

The method of reducing abnormal combustion events in a hydrogen fueled internal combustion engine (HICE) during operation of the engine and the lubricating oil composition of the instant disclosure for use in a HICE may have a total sulfated ash of less than or equal to 2.0 wt. %, or less than or equal to 1.8 wt. %, or less than or equal to 1.6 wt. %, or less than or equal to 1.4 wt. %, or less than or equal to 1.2 wt. %, or less than or equal to 1.0 wt. %, or less than or equal to 0.8 wt. %, or less than or equal to 0.6 wt. %, or less than or equal to 0.4 wt. %. The lubricating oil composition of the instant disclosure of use in a HICE may have a total phosphorous level of less than or equal to 0.120 wt. %, or less than or equal to 0.100 wt. %, or less than or equal to 0.090 wt. %, or less than or equal to 0.080 wt. %, or less than or equal to 0.070 wt. %, or less than or equal to 0.060 wt. %, or less than or equal to 0.050 wt. %, or less than or equal to 0.040 wt. %, or less than or equal to 0.030 wt. %.

The method of reducing abnormal combustion events in a hydrogen fueled internal combustion engine (HICE) during operation of the engine and the lubricating oil composition of the instant disclosure for use in a HICE may be of various SAE viscosity grades including, but not limited to, 25W-X, 20W-X, 15W-X, 10W-X, 5W-X or 0W-X, where X represents any one of 8, 12, 16, 20, 30, 40, 50 or 60.

In another embodiment, the method of reducing abnormal combustion events in a hydrogen fueled internal combustion engine (HICE) during operation of the engine and the lubricating oil composition of the instant disclosure for use in a HICE may include a base oil comprising a Group I base oil, a Group II base oil, a Group III base oil, a Group IV base oil, a Group V base oil or combinations thereof, wherein the base oil is included at greater than 60 wt. %, or greater than 70 wt. %, or greater than 80 wt. %, or greater than 90 wt. %, or greater than 95 wt. % of the composition.

In another embodiment, the method of reducing abnormal combustion events in a hydrogen fueled internal combustion engine (HICE) during operation of the engine and the lubricating oil composition of the instant disclosure for use in a HICE may include a base oil comprising a Group I base oil, a Group II base oil, a Group III base oil, a Group IV base oil, or combinations thereof, wherein the base oil is included at greater than 60 wt. %, or greater than 70 wt. %, or greater than 80 wt. %, or greater than 90 wt. %, or greater than 95 wt. % of the composition. That is the base oil is substantially free of Group V base oil.

In yet another embodiment, the method of reducing abnormal combustion events in a hydrogen fueled internal combustion engine (HICE) during operation of the engine and the lubricating oil composition of the instant disclosure for use in a HICE may include a base oil comprising a Group I base oil, a Group II base oil, a Group III base oil, or combinations thereof, wherein the base oil is included at greater than 60 wt. %, or greater than 70 wt. %, or greater than 80 wt. %, or greater than 90 wt. %, or greater than 95 wt. % of the composition. That is the base oil is substantially free of both Group V base oil and Group IV base oil.

In still yet another embodiment, the method of reducing abnormal combustion events in a hydrogen fueled internal combustion engine (HICE) during operation of the engine and the lubricating oil composition of the instant disclosure for use in a HICE may include a base oil comprising a Group I base oil, a Group II base oil, or combinations thereof, wherein the base oil is included at greater than 60 wt. %, or greater than 70 wt. %, or greater than 80 wt. %, or greater than 90 wt. %, or greater than 95 wt. % of the composition. That is the base oil is substantially free of both Group V base oil and Group IV base oil as well as Group III base oil.

In another embodiment, the method of reducing abnormal combustion events in a hydrogen fueled internal combustion engine (HICE) during operation of the engine and the lubricating oil composition of the instant disclosure for use in a HICE may include a dispersant, dispersant viscosity modifier or combinations thereof. In one form, the dispersant or dispersant viscosity modifier comprises an amide, imide, and/or ester functionalized partially or fully saturated polymer comprising $C_{4-5}$ olefins having: i) an Mw/Mn of less than 2, ii) a Functionality Distribution (Fd) value of 3.5 or less, and iii) an Mn of 10,000 g/mol or more of the polymer prior to functionalization. In another form, the dispersant comprises one or more, optionally borated, higher molecular weight polyisobutylene succinimide (PIBSA-PAM) dispersant (Mn 1600 g/mol or more), one or more, optionally borated, lower molecular weight polyisobutylene succinimide (PIBSA-PAM) dispersant (Mn less than 1600 g/mol), or combinations thereof, and wherein the treat level of the dispersant is from 1.0 to 15.0 wt. % of the lubricating oil composition. In another form, the higher molecular weight PIBSA-PAM is borated, the lower molecular weight PIBSA-PAM is borated or a combination thereof, and is/are included in the lubricating oil composition at a treat level to deliver from 20 ppm to 700 ppm, or 50 to 650 ppm, or 100 to 600 ppm, or 200 to 500 ppm, or 300 to 400 ppm by weight of boron to the lubricating oil composition. The dispersant, dispersant viscosity modifier or combinations thereof may be included in the lubricating oil composition at treat level of from 0.5 to 15 wt. %, or 0.75 wt. % to 13 wt. %, or 1.0 to 10.0 wt. %, or 2.0 to 9.0 wt. %, or 3.0 to 8.0 wt. %, or 4.0 to 7.0 wt. %, or 5.0 to 6.0 wt. % of the lubricating oil composition.

In another embodiment, the method of reducing abnormal combustion events in a hydrogen fueled internal combustion engine (HICE) during operation of the engine and the lubricating oil composition of the instant disclosure for use in a HICE may include a corrosion inhibitor. Water is a reaction product of the combustion of a fuel containing hydrogen, and therefore corrosion of various internal components of the HICE due to water exposure may be addressed with proper selection of corrosion inhibitor type and treat level in the lubricating oil composition. The corrosion inhibitor may include, but is not limited to, a substituted thiadiazole, a substituted benzotriazole, a substituted triazole, a trisubstituted borate, an ethoxylated lauryl alcohol, a nonylphenol ethoxylate, a $C_6$ to $C_{20}$ ethoxylated linear alcohol, or a combination thereof. The corrosion inhibitor may be included in the lubricating oil composition at a treat level of from of 0.001 wt. % to 5.0 wt. %, or 0.01 to 4.8 wt. %, or 0.1 to 4.5 wt. %, or 0.5 to 4.0 wt. %, or 1.0 to 3.5 wt. %, or 1.5 to 3.0 wt. %, or 2.0 to 2.5 wt. % of the lubricating oil composition.

In another embodiment, the method of reducing abnormal combustion events in a hydrogen fueled internal combustion engine (HICE) during operation of the engine and the lubricating oil composition of the instant disclosure for use in a HICE may include an antiwear agent. The antiwear agent may include, but is not limited to, one or more zinc dialkyl dithiophosphate (ZDDP) compounds. The ZDDP compounds may include a hydrocarbyl group of the zinc hydrocarbyl dithiophosphate which is derived from one or more primary alcohols, one or more secondary alcohols or a combination of primary and secondary alcohols. The one or more ZDDP compounds may be included in the lubricating oil at a treat level of from about 0.4 wt. % to about 1.5 wt, or 0.5 to 1.3 wt. %, or 0.6 to 1.1 wt. %, or 0.7 to 1.0 wt. %, or 0.8 to 0.9 wt % of the lubricating oil composition.

In another embodiment, the method of reducing abnormal combustion events in a hydrogen fueled internal combustion engine (HICE) during operation of the engine and the lubricating oil composition of the instant disclosure for use in a HICE may include one or more of the following components: one or more functional polymers, one or more friction modifiers; one or more antioxidants; one or more pour point depressants; one or more anti-foaming agents; one or more viscosity modifiers; one or more other dispersants; one or more other overbased metal-containing detergents, one or more inhibitors, one or more antirust agents; one or more seal swell agents; and/or one or more anti-wear agents.

The method of reducing abnormal combustion events in a hydrogen fueled internal combustion engine (HICE) during operation of the engine and the lubricating oil composition of the instant disclosure for use in a HICE may have a kinematic viscosity at 100° C. of 10 cSt or less, or 2 to 9 cSt, or 3 to 8 cSt, or 4 to 7 cSt, or 5 to 6 cSt (as measured by ASTM D445). The lubricating oil composition of the instant disclosure for use in a HICE may be used as a passenger vehicle lubricant (PVL), a commercial vehicle lubricant (CVL), or a marine engine lubricant.

The method of reducing abnormal combustion events in a hydrogen fueled internal combustion engine (HICE) during operation of the engine and the lubricating oil composition of the instant disclosure for use in a HICE may be used in conjunction with various hydrogen containing fuel sources for combusting in the hydrogen fueled internal combustion engine, including, but not limited to fuel sources including green hydrogen, blue hydrogen, grey hydrogen, brown hydrogen, or combinations thereof. The hydrogen containing fuel source may also include other non-hydrogen fuel sources including, but not limited to, natural gas, compressed natural gas, propane, mogas (such as gasoline having an octane number of 87 or more, such as 93 more), diesel fuel (such as diesel fuel having a cetane number of 40 or more, such as 50 or more), renewable fuel (such as hydrogenated vegetable oil, fatty acid methyl ester, sustainable aviation fuel (SAF), or combinations thereof. The other non-hydrogen fuels may be included in the hydrogen containing fuel at from 1 to 75 wt. %, or 5 to 70 wt. %, or 10 to 65 wt. %, or 15 to 60 wt. %, or 20 to 55 wt. %, or 25 to 50 wt. %, or 30 to 45 wt. %, or 35 to 40 wt. % of the overall fuel composition. Hence, the fuel supplied to the hydrogen fueled engine comprises at least 5 mass % hydrogen, such as at least 10 mass % hydrogen, such as at least 15 mass % hydrogen, such as 20 mass % hydrogen, such as at least 25 mass % hydrogen, such as at least 30 mass % hydrogen, such as at least 35 mass % hydrogen, such as at least 40 mass % hydrogen, such as at least 45 mass % hydrogen, such as at least 50 mass % hydrogen, such as at least 55 mass % hydrogen, such as at least 60 mass % hydrogen, such as at least 70 mass % hydrogen, such as at least 75 mass % hydrogen, such as at least 80 mass % hydrogen, such as at least 85 mass % hydrogen, such as at least 90 mass % hydrogen, such as at least 95 mass % hydrogen, such as at least 99 mass % hydrogen, such as 100 mass % hydrogen, based upon the mass of the fuel. In a preferred form, the fuel supplied to the hydrogen engine comprises substantially 100 mass % hydrogen, based upon the mass of the fuel.

In other embodiments the fuel supplied to the hydrogen fueled engine comprises at least 5 mass % hydrogen and less than 95 mass % of non-hydrogen fuel (such as hydrocarbon fuel), such as at least 10 mass % hydrogen and less than 90 mass % of non-hydrogen fuel, such as at least 15 mass % hydrogen and less than 85 mass % of non-hydrogen fuel, such as 20 mass % hydrogen and less than 80 mass % of non-hydrogen fuel, such as at least 25 mass % hydrogen and less than 75 mass % of non-hydrogen fuel, such as at least 30 mass % hydrogen and less than 70 mass % of non-hydrogen fuel, such as at least 35 mass % hydrogen and less than 65 mass % of non-hydrogen fuel, such as at least 40 mass % hydrogen and less than and less than 60 mass % of non-hydrogen fuel, such as at least 45 mass % hydrogen and less than 55 mass % of non-hydrogen fuel, such as at least 50 mass % hydrogen and less than 50 mass % of non-hydrogen fuel, such as at least 55 mass % hydrogen and less than 45 mass % of non-hydrogen fuel, such as at least 60 mass % hydrogen and less than 40 mass % of non-hydrogen fuel, such as at least 70 mass % hydrogen and less than 30 mass % of non-hydrogen fuel, such as at least 75 mass % hydrogen and less than 25 mass % of non-hydrogen fuel, such as at least 80 mass % hydrogen and less than 20 mass % of non-hydrogen fuel, such as at least 85 mass % hydrogen and less than 15 mass % of non-hydrogen fuel, such as at least 90 mass % hydrogen and less than 10 mass % of non-hydrogen fuel, such as at least 95 mass % hydrogen and less than 5 mass % of non-hydrogen fuel, such as at least 99 mass % hydrogen and less than 1 mass % of non-hydrogen fuel, based upon the mass of the fuel.

The method of reducing abnormal combustion events in a hydrogen fueled internal combustion engine (HICE) during operation of the engine and the lubricating oil composition of the instant disclosure for use in a HICE may be used such that the fuel comprising hydrogen and the lubricating oil composition are combined prior to injection into a combustion chamber of the hydrogen fueled internal combustion engine (HICE) to form a fuel composition. Alternatively, the method of reducing abnormal combustion events in a hydrogen fueled internal combustion engine (HICE) during operation of the engine and the lubricating oil composition of the instant disclosure for use in a HICE may be used such that the fuel comprising hydrogen and the lubricating oil composition are combined in the combustion chamber of the hydrogen fueled internal combustion engine (HICE) to form a fuel composition.

The method of reducing abnormal combustion events in a hydrogen fueled internal combustion engine (HICE) during operation of the engine and the lubricating oil composition of the instant disclosure for use in a HICE may be used in conjunction with a hydrogen fueled internal combustion engine (HICE) that is spark ignited, compression ignited, or a combination thereof. The hydrogen fueled internal combustion engine may be a heavy duty or light duty internal combustion engine. Alternatively, the hydrogen fueled internal combustion engine for use with the method of reducing abnormal combustion events in a hydrogen fueled internal combustion engine (HICE) during operation of the engine and the lubricating oil composition of the instant disclosure for use in a HICE may be a stationary internal combustion engine. The hydrogen fueled internal combustion engine (HICE) may optionally include a turbocharger or a supercharger prior to the hydrogen fueled internal combustion engine.

The method of reducing abnormal combustion events in a hydrogen fueled internal combustion engine (HICE) during operation of the engine and the lubricating oil composition of the instant disclosure for use in a HICE may be used in a hydrogen fueled internal combustion engine (HICE) that operates at a BMEP ranging from 12 bar to 18 bar, or 13 to 17 bar, or 14 to 16 bar, or 15 bar, and operates at an air:fuel ratio (AFR) from 1:1 to 3:1. In particular, when the hydrogen fueled internal combustion engine operates at about 12 bar, the AFR may be 3:1 or less, 2.5:1 or less, or 2:1 or less, 1.85:1 or less, or 1.7:1 or less, or 1.6:1 or 1.5:1 or less, or 1.4:1 or less, such as 1:1 to 2:1. When the hydrogen fueled internal combustion engine operates at about 18 bar, the AFR may be 3:1, 2.5:1 or less, or 2:1 or less, 1.85:1 or less, or 1.7:1 or less, or 1.6:1 or 1.5:1 or less, or 1.4:1 or less, such as 1:1 to 2:1.

This invention also relates to the use of the lubricating oil composition described herein, to lubricate a hydrogen fueled internal combustion engine where the fuel provided to the hydrogen fueled internal combustion engine comprises:

a)$_1$ to 100 mass % of hydrogen, b)$_0$ to 99 mass % of a petroleum derived fuel, and/or c) from 0 to 99 mass %, or 0.1 to 98.9 mass %, or 1 to 75 mass %, or 5 to 50 mass %, of a renewable fuel other than hydrogen, based upon the total mass of hydrogen fuel, renewable fuel and the petroleum derived fuel.

In embodiments, the fuel comprising hydrogen and the lubricating oil composition are combined in the combustion chamber to form a fuel composition, alternately the fuel comprising hydrogen and the lubricating oil composition are combined prior to injection into the combustion chamber to form a fuel composition.

In embodiments, the fuel comprising hydrogen and the lubricating oil composition comprise from 0.01 to 20 mass % of lubricating oil composition, such as from 0.025 to 15 mass % of lubricating oil composition, from 0.05 to 10 mass % of lubricating oil composition, from 0.10 to 5 mass % of lubricating oil composition, from 0.015 to 2.5 mass % of lubricating oil composition, based upon the mass of the fuel comprising hydrogen and the lubricating oil composition.

Lambda, λ, is the air fuel ratio (AFR) of the amount of air and fuel provided to an engine combustion chamber divided by the air fuel ratio for a stoichiometric reaction in the same engine combustion chamber under the same conditions of pressure and temperature. In a preferred embodiment, the lambda, λ or AFR, for hydrogen fueled engines being lubricated with the lubrication composition herein is 2.5 or less, such as 2 or less, such as 1.85 or less, such as 1.7 or less, such as 1.6 or less, such as 1.5:1 or less, such as 1.4 or less, such as 0.5 to 3, such as 1 to 2.1 such as 1.3 to 2, such as 1.4 to 1.9, such as 1.5 to 1.85. For a given hydrogen fueled engine, a lower lambda means lower cost because less air is injected into the combustion chamber allowing more fuel to be consumed and more power to be produced. Likewise, less cost is incurred in engine design and operation as more efficient lambda, λ, at higher pressures requires less specialized high pressure equipment (such as turbochargers or super chargers) to inject air into the combustion chambers, among other things. Hence, the lubricating oil compositions described herein when utilized with hydrogen fueled engines built with existing engine block technology, enable easier/more efficient retrofitting/less-redesign to be able to efficiently use hydrogen fuel. Moreover, the lubricating oil compositions described herein enables one or more of the following benefits to the HICE during operation: lower lambda operation by reducing oil-derived abnormal combustion events typically associated with enriched lambda operation (relative to lambda at 2 to 2.5). In turn this enables, better throttle response, improved power density, reduction in air charging complexity and cost, or reduced engine research and development.

In embodiments, the air fuel ratio (AFR) in the combustion chamber of a hydrogen fueled internal combustion engine at 12 bar (1.2 MPa), is 2.5:1 or less, or 2:1 or less, 1.85:1 or less, or 1.7:1 or less, or 1.6:1 or 1.5:1 or less, or 1.4:1 or less, such as 1:1 to 2:1 or 1.5 to 1.9.

In other embodiments, the air fuel ratio (AFR) in the combustion chamber of a hydrogen fueled internal combustion engine at 18 bar (1.8 MPa), is 2.5:1 or less, or 2:1 or less, 1.85:1 or less, or 1.7:1 or less, or 1.6:1 or 1.5:1 or less, or 1.4:1 or less, such as 1:1 to 2:1 or 1.5 to 1.9.

In still other embodiments, the ratio of air fuel ratio in the combustion chamber of a hydrogen fueled internal combustion engine at 12 bar (1.2 MPa) to the ratio of air fuel ratio in the combustion chamber of a hydrogen fueled internal combustion engine at 18 bar (1.8 MPa), is 0.75 or more, such as 0.8 or more, such as 0.85 or more, such as 0.90 or more.

The lubricating oil compositions described herein, when used in hydrogen fueled internal combustion engines, facilitate a higher Brake Mean Effective Pressure (BMEP) by allowing the engine to operate at greater power and torque without the propensity for abnormal combustion events. For example hydrogen fueled ICE's can obtain a BMEP of 12 to 18 bar.

The hydrogen fueled internal combustion engines described herein may be retrofitted engines, or engines designed for moving vehicles (such as automobiles, trucks, generators, marine vessels, etc.), stationary engines, such as heavy duty internal combustion engines or standing generators comprising internal combustion engines.

In embodiments, the lubricating compositions disclosed herein may be used in heavy-duty engines (e.g., heavy-duty vehicles having a gross vehicle weight rating of 10,000 pounds or more).

In embodiments, the lubricating compositions disclosed herein may be used as passenger car motor oil.

In embodiments, the lubricating compositions disclosed herein may be used in a passenger car where the hydrogen fueled internal combustion engine is an passenger car internal combustion engine (optionally also using gasoline and or diesel fuel).

In embodiments, the lubricating compositions disclosed herein may be for use in a heavy duty internal combustion engines or stationary internal combustion engines.

Concentrates

A concentrate, also referred to as an additive package, adpak, or addpack, is a composition having less than 50 mass % (such as from 1 to 40 mass %, such as from 2 to 30 mass %, such as 3 to 25 mass %, such as 4 to 20 mass %, such as 5 to 15 ass %) base oil and lubricant composition additives (such as described herein) which is typically then further blended with additional Group I, II, and or Group III base oil to form a lubricating oil product. The concentrate typically is absent Group IV base oil, such as polyalphaolefin, having a viscosity index of 100 or more, such as 120 or more, such as 140 or more as determined by ASTM D2270. Alternately the concentrate contains Group IV base oil, such as polyalphaolefin, having a viscosity index of 100 or more, such as 120 or more, such as 140 or more as determined by ASTM D2270 in amounts that the total concentration of the PAO in the final lubrication oil composition is less 70 mass % or less, such as 60 mass % or less, 50 mass % or less, such as 40 mass % or less, 30 mass % or less, such as 20 mass % or less, 10 mass % or less, such as 5 mass % or less, based upon the weight of the lubricating oil composition.

This disclosure relates to concentrate compositions comprising or resulting from the admixing of: from 5 wt. % to less than or equal to 30 wt. % of one or more base oils having a KV100 of less than or equal to 12 cSt and comprising a Group I base oil, a Group II base oil, a Group III base oil, a Group IV base oil, or combinations thereof; and from 1 to 95 wt. %, based upon the weight of the concentrate, of at least one overbased metal containing detergent with a Total Base Number (KOH/g) greater than or equal to 9 and less than or equal to 500; and from 0.1 to 94 wt. %, based upon the weight of the concentrate, of at least one silicon containing compound.

The concentrate compositions disclosed herein may further comprise combining the concentrate with a base oil to form a lubricating oil composition comprising: i) a base oil having a KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 900 ppm by weight of total silicon to the composition; and wherein the lubricating oil composition has a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; and wherein the composition decreases the number of abnormal pre-ignition events in the hydrogen fueled internal combustion engines (HICE) during combustion as measured at 1000 rpm, 12 bar BMEP and 1.85 air:fuel ratio (AFR) to less than 1 event per 1,000 engine cycles; and wherein the composition decreases the number of abnormal pre-ignition events in the hydrogen fueled internal combustion engines (HICE) during combustion as measured at 1200 rpm, 18 bar BMEP and 2.05 air:fuel ratio (AFR) to less than 2 events per 1,000 engine cycles.

Also alternatively, the resulting lubricating oil composition decreases the number of abnormal pre-ignition events in the hydrogen fueled internal combustion engines (HICE) operating at 100% load during combustion by at least 20% compared to a comparable lubricating oil composition not including the at least one silicon containing compound.

Concentrates disclosed herein may be present in the lubricating oil composition at from of 0.5 mass % to 35 mass %, such as 5 mass % to 30 mass %, such as 7.5 mass % to 25 mass %, such as 10 to 22.5 mass %, such as 15 to 20 mass %, based upon the mass of the lubricating oil composition.

Optionally, the concentrate may be absent functionalized oil.

In embodiments, the concentrate composition may optionally be absent solvent (such as aliphatic or aromatic solvent) and/or absent functionalized base oil.

Optionally, the concentrate may be absent phenolic antioxidant.

In embodiments, the concentrate may comprise less than 75 ppm boron, alternately less than 60 ppm boron, alternately from 1 to 70 ppm boron. Alternately, the concentrate may be absent boron.

In embodiments, the concentrate may comprise less than or equal to 20 (such as 15, such as 10, such as 5, such as 3, such as 1) mass %, functionalized (such as aminated) polybutene (such as polyisobutylene), such as PIBSA-PAM. In embodiments, the concentrate comprises is substantially free or absent, functionalized (such as aminated) polybutene (such as polyisobutylene), such as PIBSA-PAM.

In embodiments, the concentrate may further include one or more of the following components: one or more functionalized polymers, one or more other friction modifiers; one or more antioxidants; one or more pour point depressants; one or more anti-foaming agents; one or more viscosity modifiers; one or more dispersants; one or more inhibitors, one or more antirust agents; one or more seal swell agents; and/or one or more anti-wear agents.

In embodiments, the concentrate may comprise acylated polymers, such as polyisobutylene succinic acid, optionally, having an Mn of 500 to 50,000 g/mol, such as 600 to 5,000 g/mol, such as 700 to 3000 g/mol. In embodiments, the concentrate may comprise acylated polymers, such as polyisobutylene succinic acid, having an Mn of 500 1600 g/mol, such as 700 to 1200 g/mol.

In embodiments, the concentrate may comprise 20 (such as 15, such as 10, such as 5, such as 3, such as 1) mass % or less block copolymer, such as block, star, random, and/or tapered block copolymer.

In embodiments, the concentrate may be substantially free of or absent block copolymer, such as block, star, random, and/or tapered block copolymer.

In embodiments, the concentrate may comprise 20 mass % or less (such as 15 mass % or less, such as 10 mass % or less, such as 5 mass % or less, such as 3 mass % or less, such as 1) mass % or less styrenic copolymer, such as block, star, random, and/or tapered styrenic block copolymer).

In embodiments, the concentrate may be substantially free of or absent styrenic copolymer, such as block, star, random, and/or tapered styrenic block copolymer).

In embodiments, the concentrate may comprise less than 20 (such as less than 15, such as 10, such as less than 5, such as less than 3, such as 1) mass % of functionalized diluent, such as functionalized oil.

In embodiments, the concentrate may substantially free of or absent functionalized diluent, such as functionalized oil.

In embodiments, the concentrate may comprise less than 0.5 (such as less than 0.4, such as less than 0.3, such as less than 0.2, such as 0.1, substantially absent, no) wt %, based upon the weight of the concentrate, of secondary hydrocarbyl amine compounds and tertiary hydrocarbyl amine compounds.

In embodiments, the concentrate may be substantially absent, or may comprise no, secondary hydrocarbyl amine compounds and tertiary hydrocarbyl amine compounds.

In embodiments, the concentrate may have a kinematic viscosity at 100° C. of less than 1000 cSt, such as less than 500 cSt, such as less than 200 cSt.

This disclosure also relates to methods of making concentrate compositions comprising combining: from 5 wt. % to less than or equal to 30 wt. % of one or more base oils having a KV100 of less than or equal to 12 cSt and comprising a Group I base oil, a Group II base oil, a Group III base oil, a Group IV base oil, or combinations thereof; and from 1 to 95 wt. %, based upon the weight of the concentrate, of at least one overbased metal containing detergent with a Total Base Number (KOH/g) greater than or equal to 9 and less than or equal to 500; and from 0.1 to 94 wt. %, based upon the weight of the concentrate, of at least one silicon containing compound.

Lubricating Oil Composition Components and Concentrate Components

A. Base Oil

The base oil (also referred to as "base stock," "lubricating oil basestock," or "oil of lubricating viscosity") useful herein may be a single oil or a blend of oils, and is typically a large liquid constituent of a lubricating composition, also referred to as a lubricant, into which additives and optional additional oils are blended, for example, to produce a lubricating composition, such as a final lubricant composition, a concentrate, or other lubricating composition.

A base oil may be selected from vegetable, animal, mineral, and synthetic lubricating oils, and mixtures thereof. It may range in viscosity from light distillate mineral oils to heavy lubricating oils, such as those for gas engine oil, mineral lubricating oil, motor vehicle oil, and heavy-duty diesel oil. Generally, the kinematic viscosity at 100° C. ("KV100") of the base oil ranges from 1 to 30 cSt, such as 2 to 25 cSt, such as 5 to 20 cSt, as determined according to ASTM D445-19a, in particular, from 1.0 to 12 cSt, from 1.2 cSt to 10 cSt, from 1.5 cSt to 8.3 cSt, from 2.7 cSt to 8.1 cSt, from 3.0 cSt to 7.2 cSt, or from 2.5 cSt to 6.5 cSt. Generally, the high temperature high shear (HTHS) viscosity at 150° C. of the base oil ranges from 0.5 to 20 cP such as 1 to 10 cP, such as 2 to 5 cP as determined according to ASTM D4683-20.

Typically, when lubricating oil basestock(s) is used to make a concentrate, it may advantageously be present in a concentrate-forming amount to give a concentrate containing, from 1 mass % to 20 mass %, such as from 5 mass % to 80 mass %, from 10 mass % to 70 mass %, or from 5 mass % to 50 mass % of active ingredient, based upon the weight of the concentrate.

Common oils useful as base oils include animal and vegetable oils (e.g., castor and lard oil), liquid petroleum oils, and hydrorefined and/or solvent-treated mineral lubricating oils of the paraffinic, naphthenic, and mixed paraffinic-naphthenic types. Oils derived from coal or shale are also useful base oils. Base stocks may be manufactured using a variety of different processes including, but not limited to, distillation, solvent refining, hydrogen processing, oligomerization, esterification, and re-refining.

Synthetic lubricating oils useful herein as base oils include hydrocarbon oils such as homopolymerized and copolymerized olefins, referred to as polyalphaolefins or PAO's or group IV base oils [according to the API EOLCS 1509 definition (American Petroleum Institute Publication 1509, see section E.1.3, 19th edition, January 2021, www.API.org)]. Examples of PAO's useful as base oils include: poly(ethylenes), copolymers of ethylene and propylene, polybutylenes, polypropylenes, propylene-isobutylene copolymers, chlorinated polybutylenes, poly(1-hexenes), poly(1-octenes), poly(1-decenes), homo- or co-polymers of $C_8$ to $C_{20}$ alkenes, homo- or co-polymers of $C_8$, and/or $C_{10}$, and/or $C_{12}$ alkenes, $C_8/C_{10}$ copolymers, $C_8/C_{10}/C_{12}$ copolymers, and $C_{10}/C_{12}$ copolymers, and the derivatives, analogues and homologues thereof.

In another embodiment, the base oil may comprise polyalphaolefins comprising oligomers of linear olefins having 6 to 14 carbon atoms, more preferably 8 to 12 carbon atoms, more preferably 10 carbon atoms having a Kinematic viscosity at 100° C. of 10 or more (as measured by ASTM D445); and preferably having a viscosity index ("VI"), as determined by ASTM D2270, of 100 or more, preferably 110 or more, more preferably 120 or more, more preferably 130 or more, more preferably 140 or more; and/or having a pour point of −5° C. or less (as determined by ASTM D97), more preferably −10° C. or less, more preferably −20° C. or less.

In another embodiment polyalphaolefin oligomers useful in the present disclosure may comprise $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. The PAO oligomers are dimers, trimers, tetramers, pentamers, etc., of $C_5$ to $C_{14}$ alpha-olefins in one embodiment, and $C_6$ to $C_{12}$ alpha-olefins in another embodiment, and $C_8$ to $C_{12}$ alpha-olefins in another embodiment. Suitable olefins include 1-pentene, 1-hexene, 1-heptene, 1-octene, 1-nonene, 1-decene, 1-undecene, and 1-dodecene. In one embodiment, the olefin is a combination of 1-octene, 1-decene, and 1-dodecene, or alternately may be substantially 1-decene, and the PAO is a mixture of dimers, trimers, tetramers, and pentamers (and higher) thereof. Useful PAO's are described more particularly in, for example, U.S. Pat. Nos. 5,171,908 and 5,783, 531, and in Synthetic Lubricants and High-Performance Functional Fluids 1-52 (Leslie R. Rudnick & Ronald L. Shubkin, ed. Marcel Dekker, Inc. 1999).

PAO's useful in the present disclosure typically possess a number average molecular weight of from 100 to 21,000 g/mol in one embodiment, and from 200 to 10,000 g/mol in another embodiment, and from 200 to 7,000 g/mol in yet another embodiment, and from 200 to 2,000 g/mol in yet another embodiment, and from 200 to 500 g/mol in yet another embodiment. Desirable PAO's are commercially available as SpectraSyn™ Hi-Vis, SpectraSyn™ Low-Vis, SpectraSyn™ plus, SpectraSyn™ Elite PAO's (ExxonMobil Chemical Company, Houston Texas) and Durasyn PAO's from Ineos Oligomers USA LLC.

Synthetic lubricating oils useful as base oils also include hydrocarbon oils such as homopolymerized and copolymerized: alkylbenzenes (e.g., dodecylbenzenes, tetradecylbenzenes, dinonylbenzenes, di(2-ethylhexyl)benzenes); polyphenols (e.g., biphenyls, terphenyls, alkylated polyphenols); and alkylated diphenyl ethers, and alkylated diphenyl sulfides; and the derivatives, analogues, and homologues thereof.

In alternate embodiments, the lubricating oil composition comprises less than 50 mass % of Group IV base oil (such as the PAO's described above), such as less than 40 mass %, such as less than 30 mass %, such as less than 20 mass % such as less than 10 mass %, based upon the mass of the lubricating oil composition.

Another suitable class of synthetic lubricating oils useful as base oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) reacted with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils herein also include those made from $C_5$ to $C_{12}$ monocarboxylic acids and polyols, and polyol ethers such as neopentyl glycol, trimethylolpropane, pentaerythritol, dipentaerythritol, and tripentaerythritol.

Desirable ester base oils are commercially available as Esterex™ Esters (ExxonMobil Chemical Company, Houston, Texas).

Silicon-based oils such as the polyalkyl-, polyaryl-, polyalkoxy- or polyaryloxysilicone oils and silicate oils comprise another useful class of synthetic lubricants useful herein; such oils include tetraethyl silicate, tetraisopropyl silicate, tetra-(2-ethylhexyl) silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes, and poly(methylphenyl)-siloxanes.

Other synthetic lubricating oils useful herein include liquid esters of phosphorous-containing acids (e.g., tricresyl phosphate, trioctyl phosphate, diethyl ester of decylphosphonic acid) and polymeric tetrahydrofurans.

Unrefined, refined, and re-refined oils can be used in the lubricating compositions disclosed herein. Unrefined oils are those obtained directly from a natural or synthetic source without further purification treatment. For example, a shale oil obtained directly from retorting operations, a petroleum oil obtained directly from distillation, or an ester oil obtained directly from an esterification process and used without further treatment is considered an unrefined oil. Refined oils are similar to the unrefined oils except they have been further treated in one or more purification steps to improve one or more properties. Many such purification techniques, such as distillation, solvent extraction, acid or base extraction, filtration, and percolation are used by those in the art. Re-refined oils are oils obtained by processes similar to those used to obtain refined oils where the refining processes are applied to previously refined oils which have been previously used in service. Such re-refined oils are also referred to as reclaimed or reprocessed oils and often are additionally processed for removal of spent additive and oil breakdown products. A re-refined base oil is preferably substantially free from materials introduced through manufacturing, contamination, or previous use.

Other examples of useful base oils are gas-to-liquid ("GTL") base oils, i.e., the base oil is an oil derived from hydrocarbons made from synthesis gas ("syn gas") containing $H_2$ and CO using a Fischer-Tropsch catalyst. These hydrocarbons typically require further processing in order to be useful as a base oil. For example, they may, by methods known in the art, be hydroisomerized; hydrocracked and hydroisomerized; dewaxed; or hydroisomerized and dewaxed. For further information on useful GTL base oils and blends thereof, please see U.S. Pat. No. 10,913,916 (col 4, ln 62 to col 5, ln 60) and U.S. Pat. No. 10,781,397 (col 14, ln 54 to col 15, ln 5, and col 16, ln 44 to col 17, ln 55).

In particular, oils from renewable sources, i.e., based in part on carbon and energy captured from the environment, such as biological sources, are useful herein.

The various base oils are often categorized as Group I, II, III, IV, or V according to the API EOLCS 1509 definition (American Petroleum Institute Publication 1509, see section E.1.3, 19th edition, January 2021, www.API.org). Generally speaking, Group I base stocks have a viscosity index of between about 80 to 120 and contain greater than about 0.03% sulfur and/or less than about 90% saturates. Group II base stocks have a viscosity index of between about 80 to 120 and contain less than or equal to about 0.03% sulfur and greater than or equal to about 90% saturates. Group III base stocks have a viscosity index greater than about 120 and contain less than or equal to about 0.03% sulfur and greater than about 90% saturates. Group IV base stocks includes polyalphaolefins (PAO). Group V base stocks include base stocks not included in Groups I-IV, such as ester base stocks. (Viscosity index measured by ASTM D 2270, saturates is measured by ASTM D2007, and sulfur is measured by ASTM D5185, D2622, ASTM D4294, ASTM D4927, and ASTM D3120). Group I, II and III base oils are derived from petroleum, while Group IV and V base oils tend to be synthetic.

Base oils for use in the formulated lubricating compositions useful in the present disclosure are any one, two, three, or more of the variety of oils described herein. In desirable embodiments, base oils for use in the formulated lubricating compositions useful in the present disclosure are those described as API Group I (including Group I+), Group II (including Group II+), Group III (including Group III+), Group IV, and Group V oils and mixtures thereof, preferably API Group II, Group III, Group IV, and Group V oils and mixtures thereof. Likewise, in desirable embodiments, base oils for use in the formulated lubricating compositions useful in the present disclosure are those described as API Group I (including Group I+), Group II (including Group II+), Group III (including Group III+) and mixtures thereof, preferably API Group II, Group III oils and mixtures thereof. The base oil may be a Group III, Group III+, IV, and Group V base oils due to their exceptional volatility, stability, viscometric, and cleanliness features. Minor quantities of Group I basestock, such as the amount used to dilute additives for blending into formulated lube oil products, can be tolerated but are typically kept to a minimum, e.g., amounts only associated with their use as diluent/carrier oil for additives used on an "as-received" basis. In regard to the Group II basestocks, it is often more useful that the Group II base stock be in the higher quality range associated with that base stock, i.e., a Group II base stock having a viscosity index in the range from 100 to 120.

The base oil useful herein may be selected from any of the synthetic, natural, or re-refined oils (such as those typically used as crankcase lubricating oils for spark-ignited and compression-ignited engines). Mixtures of synthetic and/or natural and/or re-refined base oils may be used if desired. Multi-modal mixtures (such as bi- or tri-modal mixtures) of Group I, II, III, IV, and/or V base stocks may be used if desired. Multi-modal mixtures (such as bi-, tri- or tetra-modal mixtures) of Group I, Group II, and or Group III base stocks with 70 mass % or less, such as 60 mass % or less, 50 mass % or less, such as 40 mass % or less, 30 mass % or less, such as 20 mass % or less, 10 mass % or less, such as 5 mass % or less, or such as absent Group IV base stocks, such as PAO's, may be used if desired.

The base oil or base oil blend used herein conveniently has a kinematic viscosity at 100° C. (KV100, as measured according to ASTM D445-19a, and reported in units of centistoke (cSt) or it its equivalent, $mm^2/s$), of about 2 to about 40 cSt, alternately of 3 to 30 cSt, alternately 4 to 20 cSt at 100° C., alternately 5 to 10 cSt, alternately the base oil or base oil blend may have a kinematic viscosity at 100° C. of 2 to 20 cSt, of 2.5 to 2 cSt, and preferably of about 2.5 cSt to about 9 cSt.

The base oil or base oil blend preferably has a saturate content of at least 65 mass %, more preferably at least 75 mass %, such as at least 85 mass %, such as at least than 90 mass % as determined by ASTM D2007.

Preferably, the base oil or base oil blend will have a sulfur content of less than 1 mass %, preferably less than 0.6 mass %, most preferably less than 0.4 mass %, such as less than 0.3 mass %, based on the total mass of the lubricating composition, as measured by ASTM D5185.

In embodiments, the volatility of the base oil or base oil blend, as measured by the Noack test (ASTM D5800, procedure B), is less than or equal to 30 mass %, such as less than or equal to 25 mass %, such as less than or equal to 20 mass %, such as less than or equal to 16 mass %, such as less than or equal to 12 mass %, such as less than or equal to 10 mass %, based on the total mass of the lubricating composition.

In embodiments, the viscosity index (VI) of the base oil is at least 95, preferably at least 110, more preferably at least 120, even more preferably at least 125, most preferably from about 130 to 240, in particular from about 105 to 140 (as determined by ASTM D2270).

The base oil may be provided in a major amount, in combination with a minor amount of one or more additive components as described hereinafter, constituting a lubricant. This preparation may be accomplished by adding the additives directly to the oil or by adding the one or more additives in the form of a concentrate thereof to disperse or dissolve the additive(s). Additives may be added to the oil by any method known to those skilled in the art, either before, at the same time as, or after addition of other additives.

The base oil may be provided in a minor amount, in combination with minor amounts of one or more additive components as described hereinafter, constituting an additive concentrate. This preparation may be accomplished by adding the additives directly to the oil or by adding the one or more additives in the form of a solution, slurry or suspension thereof to disperse or dissolve the additive(s) in the oil. Additives may be added to the oil by any method known to those skilled in the art, either before, at the same time as, or after addition of other additives.

The base oil typically constitutes the major component of an engine oil lubricant composition of the present disclosure and typically is present in an amount ranging from about 50 to about 99 mass %, preferably from about 70 to about 95 mass %, and more preferably from about 80 to about 95 mass %, based on the total weight of the composition.

Typically, one or more base oils are present in the lubricating composition in an amount of 32 mass % or more, alternately 55 mass % or more, alternately 60 mass % or more, alternately 65 mass % or more, based on the total weight of the lubricating composition. Typically, one or more base oils are present in the lubricating composition at an amount of 98 mass % or less, more preferably 95 mass % or less, even more preferably 90 mass % or less. Alternately, one or more base oils are present in the lubricating composition at from 1 to 99 mass %, alternately 50 to 97 mass %, alternately to 60 to 95 mass %, alternately 70 to 95 mass %, based upon the weight of the lubricating composition.

The base oils and blends thereof described above are also useful for making concentrates as well as for making lubricants therefrom.

Concentrates constitute a convenient means of handling additives before their use, as well as facilitating solution or dispersion of additives in lubricants. When preparing a lubricant that contains more than one type of additive (sometime referred to as "additive components"), each additive may be incorporated separately, each in the form of a concentrate. In many instances, however, it is convenient to provide a so-called additive "package" (also referred to as an "addpack") comprising one or more additives/co-additives, such as described hereinafter, in a single concentrate.

Typically, one or more base oils are present in the concentrate composition in an amount of 50 mass % or less, alternately 40 mass % or less, alternately 30 mass % or less, alternately 20 mass % or less, based on the total weight of the concentrate composition. Typically, one or more base oils are present in the concentrate composition at an amount of 0.1 to 49 mass %, alternately 5 to 40 mass %, alternately to 10 to 30 mass %, alternately 15 to 25 mass %, based upon the weight of the concentrate composition.

B. Detergents

The lubricating oil compositions and concentrate compositions may comprise one or more additional/other overbased metal detergents (such as blends of metal detergents) also referred to as a "detergent additive" in addition to the combination or mixture of the overbased calcium based detergent and overbased magnesium based detergent described above. The lubricating composition may comprise one or more metal detergents (such as blends of metal detergents) also referred to as a "detergent additive." Metal detergents typically function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number ("TBN" as measured by ASTM D2896) of up to 150 mgKOH/g, such as from 0 to 80 (or 5-30) mgKOH/g. A large amount of a metal base may be incorporated by reacting excess metal compound (e.g., an oxide or hydroxide) with an acidic gas (e.g., carbon dioxide). Such detergents, sometimes referred to as overbased, may have a TBN of 100 mgKOH/g or more (such as 200 mgKOH/g or more), and typically will have a TBN of 250 mgKOH/g or more, such as 300 mgKOH/g or more, such as from 200 to 800 mgKOH/g, 225 to 700 mgKOH/g, 250 to 650 mgKOH/g, or 300 to 600 mgKOH/g, such as 150 to 650 mgKOH/g.

Suitable other detergents include, oil-soluble neutral and overbased sulfonates, phenates, sulfurized phenates, thiophosphonates, salicylates, naphthenates and other oil-soluble carboxylates of a metal, particularly the alkali metals (Group 1 metals, e.g., Li, Na, K, Rb) or alkaline earth metals (Group 2 metals, e.g., Be, Mg, Ca, Sr, Ba), particularly, sodium, potassium, lithium, calcium, and magnesium, such as Ca and/or Mg. Furthermore, the detergent may comprise a hybrid detergent comprising any combination of sodium, potassium, lithium, calcium, or magnesium salts of sulfonates, phenates, sulfurized phenates, thiophosphonates, salicylates, and naphthenates or other oil-soluble carboxylates of a Group 1 and/or 2 metal.

Preferably, the other overbased metal based detergent additive(s) useful in the present disclosure comprises calcium and/or magnesium metal salts. The detergent may be a calcium and/or magnesium carboxylate (e.g., salicylates), sulfonate, or phenate detergent. More preferably, the detergent additives are selected from magnesium salicylate, calcium salicylate, magnesium sulfonate, calcium sulfonate, magnesium phenate, calcium phenate, and hybrid detergents comprising two, three, four, or more of more of these detergents and/or combinations thereof.

The metal-containing detergent may also include "hybrid" detergents formed with mixed surfactant systems including phenate and/or sulfonate components, e.g., phenate/salicylates, sulfonate/phenates, sulfonate/salicylates, sulfonates/phenates/salicylates, as described, for example, in U.S. Pat. Nos. 6,429,178; 6,429,179; 6,153,565; and 6,281,179. Where, for example, a hybrid sulfonate/phenate detergent is employed, the hybrid detergent would be considered equivalent to amounts of distinct phenate and sulfonate detergents introducing like amounts of phenate and sulfonate soaps, respectively.

The metal-containing detergent disclosed herein may also include polyolefin substituted hydroxy-aromatic carboxylic acid or salt thereof where the polyolefin is derived from a branched alkene having at least 4 carbon atoms and wherein the polyolefin has a number average molecular weight of 150 to 800 g/mol, (such as those disclosed in US 2022/0073836), such as a such as a salicylate detergent.

The overbased metal-containing detergent may be sodium salts, calcium salts, magnesium salts, or mixtures thereof of the phenates, sulfur-containing phenates, sulfonates, salixarates, and salicylates. Overbased phenates and salicylates typically have a total base number of 180 to 650 mgKOH/g, such as 200 to 450 TBN mgKOH/g. Overbased sulfonates typically have a total base number of 250 to 600 mgKOH/g, or 300 to 500 mgKOH/g. In embodiments, the sulfonate detergent may be predominantly a linear alkylbenzene sulfonate detergent having a metal ratio of at least 8 as is described in paragraphs [0026] to [0037] of US Patent Application Publication No. 2005/065045 (and granted as U.S. Pat. No. 7,407,919). The overbased detergent may be present at 0 mass % to 15 mass %, or 0.1 mass % to 10 mass %, or 0.2 mass % to 8 mass %, or 0.2 mass % to 3 mass %, based upon of the lubricating composition. For example, in a heavy-duty diesel engine, the detergent may be present at 2 mass % to 3 mass % of the lubricating composition. For a passenger car engine, the detergent may be present at 0.2 mass % to 1 mass % of the lubricating composition.

The detergent additive(s) may comprise one or more magnesium sulfonate detergents. The magnesium detergent may be a neutral salt or an overbased salt. Suitably the magnesium detergent is an overbased magnesium sulfonate having a TBN of from 80 to 650 mgKOH/g (ASTM D2896), such as 200 to 500 mgKOH/g, such as 240 to 450 mgKOH/g.

Alternately, the detergent additive(s) is a magnesium salicylate, optionally having a TBN of from 30 to 650 mgKOH/g (ASTM D2896), such as 50 to 500 mgKOH/g, such as 200 to 500 mgKOH/g, such as 240 to 450 mgKOH/g or alternately of 150 mgKOH/g or less, such as 100 mgKOH/g or less.

The magnesium detergent typically provides the lubricating composition thereof with from 200-4000 ppm of magnesium atoms, suitably from 200-2000 ppm, from 300 to 1500 or from 450-1200 ppm of magnesium atoms (ASTM D5185).

The detergent composition may comprise (or consist of) a combination of one or more magnesium sulfonate detergents and one or more calcium salicylate detergents. Alternately, the detergent additive(s) is a combination of magnesium salicylate and magnesium sulfonate.

The combination of one or more magnesium sulfonate detergents and one or more calcium salicylate detergents optionally provides the lubricating composition thereof with: 1) from 200-4000 ppm of magnesium atoms, suitably from 200-2000 ppm, from 300 to 1500 ppm or from 450-1200 ppm of magnesium atoms (ASTM D5185), and 2) at least 500 ppm, preferably at least 750 ppm, more preferably at least 900 ppm of atomic calcium, such as from 500-4000 ppm, preferably from 750-3000 ppm, more preferably from 900-2000 ppm atomic calcium (ASTM D5185).

The detergent may comprise one or more calcium detergents such as calcium carboxylate (e.g., salicylate), sulfonate, or phenate detergent.

Suitably the calcium detergent has a TBN of from 30 to 700 mgKOH/g (ASTM D2896), such as 50 to 650 mgKOH/g, such as 200 to 500 mgKOH/g, such as 240 to 450 mgKOH/g or alternately of 150 mgKOH/g or less, such as 100 mgKOH/g or less, or 200 mgKOH/g or more, or 300 mgKOH/g or more, or 350 mgKOH/g or more.

Suitably, the calcium detergent is a calcium salicylate, sulfonate, or phenate having a TBN of from 30 to 700 mgKOH/g, 30 to 650 mgKOH/g (ASTM D2896), such as 50 to 650 mgKOH/g, such as 200 to 500 mgKOH/g, such as 240 to 450 mgKOH/g or alternately of 150 mgKOH/g or less, such as 100 mgKOH/g or less, or 200 mgKOH/g or more, or 300 mgKOH/g or more, or 350 mgKOH/g or more.

Calcium detergent is typically present in amount sufficient to provide at least 500 ppm, preferably at least 750 more preferably at least 900 ppm atomic calcium to the lubricating oil composition (ASTM D5185). If present, any calcium detergent is suitably present in amount sufficient to provide no more than 4000 ppm, preferably no more than 3000 ppm, more preferably no more than 2000 ppm atomic calcium to the lubricating oil composition (ASTM D5185). If present, any calcium detergent is suitably present in amount sufficient to provide at from 500-4000 ppm, preferably from 750-3000 ppm more preferably from 900-2000 ppm atomic calcium to the lubricating oil composition (ASTM D5185).

Suitably the total atomic amount of metal from detergent in the lubrication composition according to all aspects of the disclosure is no more than 5000 ppm, preferably no more than 4000 μm and more preferably no more than 2000 ppm (ASTM D5185). The total amount of atomic metal from detergent in the lubrication oil composition according to all aspects of the disclosure is suitably at least 500 ppm, preferably at least 800 ppm and more preferably at least 1000 ppm (ASTM D5185). The total amount of atomic metal from detergent in the lubrication oil composition according to all aspects of the disclosure is suitably from 500 to 5000 ppm, preferably from 500 to 3000 ppm and more preferably from 500 to 2000 ppm (ASTM D5185).

Sulfonate detergents may be prepared from sulfonic acids which are typically obtained by the sulfonation of alkyl substituted aromatic hydrocarbons, such as those obtained from the fractionation of petroleum or by the alkylation of aromatic hydrocarbons. Examples include those obtained by alkylating benzene, toluene, xylene, naphthalene, diphenyl, or their halogen derivatives such as chlorobenzene, chlorotoluene, and chloronaphthalene. The alkylation may be carried out in the presence of a catalyst with alkylating agents having from about 3 to more than 70 carbon atoms. The alkaryl sulfonates usually contain from about 9 to about 80 or more carbon atoms, preferably from about 16 to about 60 carbon atoms per alkyl substituted aromatic moiety. The oil soluble sulfonates or alkaryl sulfonic acids may be neutralized with oxides, hydroxides, alkoxides, carbonates, carboxylate, sulfides, hydrosulfides, nitrates, borates and ethers of the metal. The amount of metal compound is chosen having regard to the desired TBN of the final product, but typically ranges from about 100 to 220 mass % (preferably at least 125 mass %) of that stoichiometrically required.

Metal salts of phenols and sulfurized phenols are prepared by reaction with an appropriate metal compound such as an oxide or hydroxide and neutral or overbased products may be obtained by methods well known in the art. Sulfurized phenols may be prepared by reacting a phenol with sulfur or a sulfur-containing compound such as hydrogen sulfide, sulfur monohalide, or sulfur dihalide, to form products which are generally mixtures of compounds in which 2 or more phenols are bridged by sulfur-containing bridges.

Carboxylate detergents, e.g., salicylates, can be prepared by reacting an aromatic carboxylic acid (such as a $C_{5-100}$, $C_{9-30}$, $C_{14-24}$ alkyl-substituted hydroxy-benzoic acid) with an appropriate metal compound such as an oxide or hydroxide and neutral or overbased products may be obtained by methods well known in the art. The aromatic moiety of the aromatic carboxylic acid can contain heteroatoms, such as nitrogen and oxygen. Preferably, the moiety contains only carbon atoms; more preferably the moiety contains six or more carbon atoms; for example, benzene is a preferred moiety. The aromatic carboxylic acid may contain one or more aromatic moieties, such as one or more benzene rings, either fused or connected via alkylene bridges.

Preferred substituents in oil-soluble salicylic acids are alkyl substituents, which may be linear or branched. In alkyl-substituted salicylic acids, the alkyl groups advantageously contain 1 to 500, such as 5 to 100, preferably 9 to 30, especially 14 to 20, carbon atoms. Where there is more than one alkyl group, the average number of carbon atoms in all of the alkyl groups is preferably at least 9 to ensure adequate oil solubility.

Alternately, salicylate detergent useful herein may be selected from the salicylate detergents disclosed in US 2022/0073836. Such detergents comprise polyisobutylene (Mn 100 to 900 g/mol, such as 150 to 400 g/mol) substituted phenols as part of the alkyl salicylate moiety of an alky salicylate metal salt.

Further, as metal organic and inorganic base salts, which are used as detergents can contribute to the sulfated ash content of a lubricating oil composition, in embodiments of the present disclosure, the amounts of such additives are minimized. In order to maintain a low sulfur level, salicylate detergents can be used and the lubricating composition herein may comprise one or more salicylate detergents (said detergents are preferably used in amounts in the range of 0.05 to 20.0 mass %, more preferably from 1.0 to 10.0 mass % and most preferably in the range of from 2.0 to 5.0 mass %, based on the total weight of the lubricating composition).

The total sulfated ash content of the lubricating composition herein is typically not greater than 2.0 mass %, alternately at a level of not greater than 1.0 mass % and alternately at a level of not greater than 0.8 mass %, based on the total weight of the lubricating composition as determined by ASTM D874.

Furthermore, it is useful that each of the detergents, independently, have a TBN (total base number) value in the range of from 10 to 700 mgKOH/g, 10 to 500 mgKOH/g, alternately in the range of from 100 to 650, alternately in the range of from 10 to 500 mgKOH/g, alternately in the range of from 30 to 350 mgKOH/g, and alternately in the range of from 50 to 300 mgKOH/g, as measured by ISO 3771.

The sulfonate detergents (such as Ca and/or Mg sulfonate detergents) may be present in an amount to deliver 0.1 mass % to 1.5 mass %, or 0.15 to 1.2 mass %, or 0.2 mass % to 0.9 mass % sulfonate soap to the lubricant composition.

The salicylate detergents (such as Ca and/or Mg salicylate detergents) are present in an amount to deliver 0.3 mass % to 1.4 mass %, or 0.35 mass % to 1.2 mass %, or 0.4 mass % to 1.0 mass % salicylate soap to the lubricant composition.

The sulfonate soap may be present in an amount 0.2 mass % to 0.8 mass % of the lubricant composition, and the salicylate soap may be present in an amount 0.3 mass % to 1.0 mass % of the lubricant composition.

The total of all alkaline earth metal detergent soap may be present in an amount 0.6 mass % to 2.1 mass %, or 0.7 mass % to 1.4 mass % of the lubricant composition.

Typically, lubricating compositions formulated for use in heavy-duty diesel engines comprise detergents at from about 0.1 to about 10 mass %, alternately from about 0.5 to about 7.5 mass %, alternately from about 1 to about 6.5 mass %, based on the lubricating composition.

Typically, lubricating compositions formulated for use in a passenger-car engines comprise detergents at from about 0.1 to about 10 mass %, alternately from about 0.5 to about 7.5 mass 0 alternately from about 1 to about 6.5 mass %, based on the lubricating composition.

Typically, lubricating compositions formulated for use in a drive train (e.g., transmissions) comprise detergents at from about 0.1 to about 10 mass %, alternately from about 0.5 to about 7.5 mass %, alternately from about 2 to about 6.5 mass %, based on the lubricating composition.

Optionally, phenate is substantially absent or absent from the detergent in the lubricating oil composition.

C. Functional or Functionalized Polymers

The optional functional polymer or functionalized polymer component of the lubricating oil compositions and concentrate compositions disclosed herein comprises a polymer that prior to functionalization has an Mn of about 10,000 g/mol or more, such as 20,000 g/mol or more, such as 25,000 g/mol or more, such as 30,000 g/mol or more, such as 35,000 g/mol or more (GPC-PS). Alternately, functionalized polymer comprises a polymer that prior to functionalization has an Mn of 10,000 to 300,000 g/mol, such as 20,000 to about 150,000 g/mol, such as 30,000 to about 125,000 g/mol, such as 35,000 to about 100,000 g/mol, such as 40,000 to 80,000 g/mol (GPC-PS). The polymer prior to functionalization may have an Mw/Mn of less than 2 (such as less than 1.6, such as less than 1.5, such as 1.4 or less, such as from 1 to 1.3, such as from 1.0 to 1.25, such as from 1.0 to 1.2, such as 1.0 to 1.15, such as from 1.0 to 1.1 as determined by GPC-PS). The polymer prior to functionalization may comprise repeat units of one or more olefins having 4 to 5 carbon atoms (preferably conjugated dienes having 4 to 5 carbon atoms). Prior to functionalization the $C_{4-5}$ polymer is preferably fully or partially saturated (such as fully or partially hydrogenated). The functionalized polymer may be obtained by reacting the $C_{4-5}$ polymer with an acylating agent to form acylated polymer and then reacting acylated polymer with an amine or alcohol to form an amide, imide, ester, or combination thereof. The functionalized polymer may also be obtained by reacting an acylated $C_{4-5}$ polymer (such as a commercially available maleated fully or partially hydrogenated $C_{4-5}$ polymer) with an amine to form an amide, imide or combination thereof.

This disclosure further relates to lubricating oil compositions including functionalized polymers including amide, imide, and/or ester functionalized saturated (such as hydrogenated) polymers of $C_{4-5}$ conjugated dienes described herein obtained by reacting fully or partially saturated (such as fully or partially hydrogenated) polymers of $C_{4-5}$ conjugated dienes having an Mw/Mn of less than 2, with an acylating agent, such as maleic acid or maleic anhydride and thereafter reacting the acylated polymer with an amine (such as a polyamine) to form an imide, amide or combination thereof.

This disclosure relates to lubricating oil compositions including functionalized polymers containing one or more pendant amine groups and comprising or resulting from the admixing of: at least partially (preferably completely) hydrogenated $C_{4-5}$ olefin polymers with an acylating agent, such as maleic acid or maleic anhydride, and thereafter reacting the acylated polymer with a polyamine to form an imide, amide or combination thereof.

In embodiments, the functionalized polymer is not prepared in aromatic solvent (such as benzene or toluene), or aromatic solvent is present at 2 wt % or less (such as 1 wt % or less, such as 0.5 wt % or less), based upon the weight of solvent, diluent, and polymer.

In embodiments, the functionalized polymer is not prepared in an alkylated naphthylenic solvent, or alkylated naphthylenic solvent is present at 5 wt % or less (such as 3 wt % or less, such as 1 wt % or less), based upon the weight of solvent, diluent, and polymer.

The polymer useful herein to prepare the functionalized polymer may be a homopolymer of butadiene, isoprene, or the like.

In embodiments, the polymer useful herein to prepare the functionalized polymer may be a homopolymer of isoprene, or a copolymer of isoprene and less than 5 mol % (such as less than 3 mol %, such as less than 1 mol %, such as less than 0.1 mol %) comonomer.

The polymer useful herein to prepare the functionalized polymer may be copolymer of isoprene and one or more of styrene, methyl-styrene, 2,3-dimethyl-butadiene, 2-methyl-1,3-pentadiene, myrcene, 3-methyl-1,3-pentadiene, 4-methyl-1,3-pentadiene, 2-phenyl-1,3-butadiene, 2-phenyl-1,3-pentadiene, 3-phenyl-1,3 pentadiene, 2,3-dimethyl-1,3-pentadiene, 2-hexyl-1,3-butadiene, 3-methyl-1,3-hexadiene, 2-benzyl-1,3-butadiene, 2-p-tolyl-1,3-butadiene 1,3-butadiene, 1,3-pentadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, and 3,5-decadiene, [optionally the comonomer(s) are present at less than 20 mol %, less than 5 mol %, such as less than 3 mol %, such as less than 1 mol %, such as less than 0.1 mol %].

Generally, the polymerized conjugated diene polymer useful herein to prepare the functionalized polymer includes a mixture of 1,4- and 1,2-insertions (a.k.a. 2,1-insertions; for butadiene, 1,2-insertions are the same as 3,4-insertions). As measured by 1H NMR, the polymerized conjugated diene polymer useful herein to prepare the functionalized polymer contains at least about 50% of 1,4-insertions, such as at least about 75% of 1,4 insertions, such as at least about 80% of 1,4 insertions, such as at least about 90% of 1,4 insertions, such as at least about 95% of 1,4 insertions, such as at least 98% of 1,4 insertions, based upon the total of the 2,1 insertions, 1,4 insertions, and 3,4 insertions of isoprene. For purposes of this disclosure: 1) the phrase "1,4 insertion" includes 1,4 and 4,1 insertions, 2) the phrase "2,1 insertion" includes 2,1 and 1,2 insertions, and 3) the phrase "3,4 insertion" includes 3,4 and 4,3 insertions.

Optionally, styrene repeat units may be absent in the polymer useful herein to prepare the functionalized polymer. Optionally, styrene repeat units may be absent in the functionalized hydrogenated/saturated polymers.

Optionally, butadiene repeat units may be absent in the polymer useful herein to prepare the functionalized polymer. Optionally, butadiene repeat units may be absent in the functionalized hydrogenated/saturated polymers.

Optionally, the polymer useful herein to prepare the functionalized polymer may be not homopolybutylene. Optionally, the functionalized hydrogenated/saturated polymer may be not homopolybutylene.

Optionally, the polymer useful herein to prepare the functionalized polymer may be not homopolyisobutylene. Optionally, the functionalized hydrogenated/saturated polymer may be not homopolyisobutylene.

Optionally, the polymer useful herein to prepare the functionalized polymer may not be a copolymer of isoprene and butadiene. Optionally, the functionalized hydrogenated/saturated polymer may not be a copolymer of isoprene and butadiene.

The polymer useful herein to prepare the functionalized polymer and/or the functionalized polymer may be homopolymer or copolymer. The copolymer may be a random copolymer, a tapered block copolymer, a star copolymer, or a block copolymer. Block copolymers are formed from a monomer mixture comprising one or more first monomers (such as isobutylene), wherein, for example, a first monomer forms a discrete block of the polymer joined to a second discrete block of the polymer formed from a second monomer (such as butadiene). While block copolymers have substantially discrete blocks formed from the monomers, a tapered block copolymer may be composed of, at one end, a relatively pure first monomer and, at the other end, a relatively pure second monomer. The middle of the tapered block copolymer may be more of a gradient composition of the two monomers.

The polymer useful herein to prepare the functionalized polymer may typically have an Mn of 20,000 to 150,000 g/mol, alternately 20,000 to about 150,000 g/mol, alternately 30,000 to about 125,000 g/mol, alternately 35,000 to about 100,000 g/mol, alternately 40,000 to 80,000 g/mol (GPC-PS).

Polymers useful herein to prepare the functionalized polymers may typically have an Mw/Mn (as determined by GPC-PS) of 1 to 2, alternately greater than 1 to less than 2, alternately 1.1 to 1.8, alternately 1.2 to 1.5. Alternately, the polymers useful herein to prepare the functionalized polymers may typically have an Mw/Mn of 1 or greater than 1 to less than 2 (such as less than 1.8, such as less than 1.7, such as less than 1.6, such as less than 1.5, such as less than 1.4, such as less than 1.3, such as less than 1.2, such as less than 1.15, such as less than 1.12, such as less than 1.10).

The polymers used to prepare the functionalized polymers may have an Mz (as determined by GPC-PS) of 20,000 to 150,000 g/mol, alternately 20,000 to about 150,000 g/mol, alternately 30,000 to about 125,000 g/mol, alternately 35,000 to about 100,000 g/mol, alternately 40,000 to 80,000 g/mol, alternately 40,000 to 60,000 g/mol (GPC-PS).

Polymers useful herein to prepare the functionalized polymers may have a glass transition temperature (Tg) of −25° C. or less, such as −40° C. or less, such as −50° C. or less, as determined by Differential Scanning calorimetry (DSC) using a Perkin Elmer or TA Instrument Thermal Analysis System (sample is heated from ambient to 210° C. at 10° C./minute and held at 210° C. for 5 minutes, then cooled down to −40° C. at 10° C./minute and held for 5 minutes.)

Polymers useful herein to prepare the functionalized polymers typically have a residual unsaturation of less than 3%, such less than 2%, such less than 1%, such as less than 0.5%, such as less than 0.25% based upon number of double bonds in the non-hydrogenated polymer.

Polymers useful herein to prepare the functionalized polymers typically have a residual metal (such as Li, Co, and Al) content of less than 100 ppm, such less than 50 ppm, such as less than 25 ppm, such as less than 10 ppm, such as less than 5 ppm.

Hydrogenation

The $C_{4-5}$ polymer useful herein to prepare the functionalized polymer can be hydrogenated partially or completely by any hydrogenating agent known to one of ordinary skill in the art. For example, a saturated or partially saturated polymer can be prepared by (a) providing a $C_{4-5}$ polymer containing unsaturations (such as double or triple bonds); and (b) hydrogenating at least a portion or all of the unsaturations (such as double or triple bonds) in the polymer in the presence of a hydrogenation reagent. In some embodiments, the polymer is fully hydrogenated. In some embodiments, the polymer is partially hydrogenated. In some embodiments, the polymer is saturated (hydrogenated) at 50% or more, such as 60% or more, such as 70% or more, such as 80% or more, such as 90% or more, such as 95% or more, such as 98% or more, such as 99% or more, such as from 50 to 100% saturated (hydrogenated), as determined by ozone adsorption method described in Martino N. Smits and Dirkman Hoefman, Quantative Determination of Olefinic Unsaturation by Measurement of Ozone Absorption Analytical Chemistry Vol 44, No. 9, pg. 1688, 1972, Martino N. Smits.

In embodiments, the hydrogenation reagent can be hydrogen in the presence of a hydrogenation catalyst. In some embodiments, the hydrogenation catalyst is Pd, Pd/C, Pt, PtO2, Ru(PPh3)2Cl2, Raney nickel, or a combination thereof. In embodiments, the catalyst is a Pd catalyst. In another embodiment, the catalyst is 5% Pd/C. In a further embodiment, the catalyst may comprise or be 10% Pd/C in a high-pressure reaction vessel and the hydrogenation reaction is allowed to proceed until completion. Generally, after completion, the reaction mixture can be washed, concentrated, and dried to yield the corresponding hydrogenated product. Alternatively, any reducing agent that can reduce a C═C bond to a C—C bond can also be used. For example, the olefin polymer can be hydrogenated by treatment with hydrazine in the presence of a catalyst, such as 5-ethyl-3-methyllumiflavinium perchlorate, under an oxygen atmosphere to give the corresponding hydrogenated products. The reduction reaction with hydrazine is disclosed in Imada et al., J Am. Chem. Soc., 127, pp. 14544-14545, (2005), which is incorporated herein by reference.

Acylation

The fully or partially saturated (hydrogenated) polymer may be chemically modified (functionalized) to provide a polymer having at least one polar functional group, such as, but not limited to, halogen, epoxy, hydroxy, amino, nitrilo, mercapto, imido, carboxy, and sulfonic acid groups of combinations thereof. The functionalized polymers can be further modified to give a more desired type of functionality. In a preferred case, the fully or partially hydrogenated polymer is functionalized by a method, which includes reacting the fully or partially hydrogenated polymer with an unsaturated carboxylic acid (or derivative thereof, such as maleic anhydride) to provide an acylated polymer (which may then be further functionalized as described below).

In some embodiments, a carboxylic acid functionality or a reactive equivalent thereof is grafted onto the polymer to form an acylated polymer. An ethylenically unsaturated carboxylic acid material is typically grafted onto the polymer backbone. These materials which are attached to the polymer typically contain at least one ethylenic bond (prior to reaction) and at least one, such as two, carboxylic acid (or its anhydride) groups or a polar group which is convertible into said carboxyl groups by oxidation or hydrolysis. Maleic anhydride or a derivative thereof is suitable. It grafts onto the polymer, to give two carboxylic acid functionalities. Examples of additional unsaturated carboxylic materials include itaconic anhydride, or the corresponding dicarboxylic acids, such as maleic acid, fumaric acid and their esters, as well as cinnamic acid and esters thereof.

The ethylenically unsaturated carboxylic acid material may be grafted onto the polymer in a number of ways. It may be grafted onto the polymer in solution or in essentially pure (molten) form with or without using a radical initiator. Free-radical induced grafting of ethylenically unsaturated carboxylic acid materials may also be conducted in solvents, such as hexane or mineral oil. It may be carried out at an elevated temperature in the range of 100° C. to 250° C., e.g., 120° C. to 190° C., or 150° C. to 180° C., e.g., above 160° C.

The free-radical initiators which may be used include peroxides, hydroperoxides, and azo compounds, typically those which have a boiling point greater than about 100° C. and which decompose thermally within the grafting temperature range to provide free radicals. Representative of these free-radical initiators include azobisisobutyronitrile and 2,5-dimethyl-hex-3-yne-2,5-bis-tertiary-butyl peroxide. The initiator may be used in an amount of 0.005% to 1% by weight based on the weight of the reaction mixture solution. The grafting may be carried out in an inert atmosphere, such as under nitrogen blanketing. The resulting acylated polymer intermediate is characterized by having carboxylic acid acylating functions as a part of its structure.

In embodiments, the acylated polymer may have 2 or more anhydride groups per polymer molecule and may exhibit less than 10% gel. Alternately, the acylated polymer may have less than 2 anhydride groups per polymer molecule and may exhibit less than 10% gel. (See also col 17, ln 14-col 18, ln 11 of U.S. Pat. No. 5,429,758).

Alternately, in some embodiments, the acylated polymer may have a gel content of less than about 5 wt %, less than 3 wt %, less than 2 wt %, less than 1 wt %, less than 0.5 wt %, less than 0.1 wt %, or 0 wt %, where the gel content is measured by determining the amount of material that is extractable from the polymer by using boiling xylene (or cyclohexane) as an extractant. The percent of soluble and insoluble (gel) material in a polymer composition is determined by soaking a nominally 0.5 mm thick thin film specimen of polymer for 48 hours in cyclohexane at 23° C. or refluxing the thin film specimen in boiling xylene for one half hour, removing the solvent, weighing the dried residue and calculating the amount of soluble and insoluble (gel) material. This method is generally described in U.S. Pat. No. 4,311,628, which is incorporated herein by reference. For purposes of this disclosure, gel content is measured using boiling xylene, unless the sample is not soluble in xylene, then the cyclohexane method is used.

In embodiments, the acylated polymer may have a Saponification Number (SAP) of 5 g/KOH or more, such as 10 g/KOH or more, such as 20 g/KOH or more, such as 30 g/KOH or more, such as 50 g/KOH or more, such as 10 to 60 g/KOH, such as 20 to 40 g/KOH as determined by ASTM D94.

In embodiments, the acylated polymer composition may have less than 5 wt % unreacted acylating agent (such as maleic anhydride), such as less than 4 wt %, such as less than 3 wt %, such as less than 1 wt %, such as less than 0.5 wt %, such as less than 0.25 wt %, such as less than 0.1 wt %, based upon the weight of the acylated polymer composition (i.e., polymer, acylating agent, and diluent).

In embodiments, the acylation reactions described herein may take place in base oil diluent. As a side product, functionalized base oil can be produced. The oil may become acylated itself. For example, maleated base oil may be present after the acylation reactions described herein.

It is contemplated that the functionalized base oil may comprise the acylated oil and/or the reaction product of the acylated oil with an amine to form an amide, imide or combination thereof.

Preferably, the acylated oil and/or reaction product of the acylated oil with an amine or alcohol to form an amide, imide, ester, or combination thereof, may be present in a concentrate in an amount of 40 wt % or less, alternately 20 wt % or less, alternately 10 wt % or less, alternately 5 wt % or less, alternately 3 mass % or less, preferably 2 mass % or less, preferably 1 mass % or less, preferably at 0.1 mass % or less, preferably at 0 mass % (such as 0 to 40 mass %, alternately 0.01 to 40 mass %, alternately 0.1 to 20 mass %, alternately to 1 to 10 mass %, alternately 1.5 to 5 mass %), based upon the weight of the concentrate composition.

Preferably one or more functionalized base oils, such as acylated oil and/or reaction product of the acylated oil with an amine or alcohol to form an amide, imide, ester, or combination thereof, may be present in the lubricating oil composition at an amount of 0.01 to 40 mass %, alternately 0.1 to 20 mass %, alternately to 1 to 10 mass %, alternately 1.5 to 5 mass %, (such as at 3 mass % or less, preferably 2 mass % or less, preferably 1 mass % or less, preferably at 0.1 mass % or less, preferably at 0 mass %), based upon the weight of the lubricating oil composition.

In embodiments, the acylation reactions described herein take place in solvent containing media. As a side product, acylated/functionalized solvent can be produced. In embodiments, acylated and/or functionalized solvent may be present in a concentrate composition at 3 mass % or less, preferably 2 mass % or less, preferably 1 mass % or less, preferably at 0.1 mass % or less, preferably at 0 mass %, based upon the weight of the concentrate composition. In embodiments, functionalized solvent may be present in a lubricating oil composition at 3 mass % or less, preferably 2 mass % or less, preferably 1 mass % or less, preferably at 0.1 mass % or less, preferably at 0 mass %, based upon the weight of the lubricating oil composition.

In embodiments, the acylating agent may be added in such a way as to minimize side reactions (such as reaction with base oil or other diluent present in the reaction vessel).

In embodiments, the acylating reaction may occur where the acylating agent (such as maleic acid or maleic anhydride) is added in a continuous or semi-continuous (such as intermittent) stream (such as, for example, in controlled relatively equal portions over the reaction time, or larger and/or smaller portions at different points in the reaction) to minimize functionalized base oil and other side reactions. As an example, the acylating agent may be added in a continuous fashion where the amounts of polymer and acylating agents are added in controlled stoichiometric amounts. As another example, the polymer may be added to a reaction vessel in batch fashion and the acylating agent added slowly or in a semi-continuous fashion (such as adding the acylating agent in 2 or more, such as 5 or more, such as 10 or more, such as 20 or more, such as 30 or more, such as 40 or more, such as 50 or more, such as 60 or more discrete amounts or portions). Alternately, the polymer can be added to the reaction vessel in X number of portions and the acylating agent added in 1.5X or more (such as 2X or more, such as 5X or more, such as 10X or more, such as 20X or more, such as 30X or more, such as 40X or more, such as 50X or more, such as 60X or more) number of portions. This same effect may also be achieved by diluting or concentrating a polymer solution and/or the acylating agent solution to the same or different extents.

Preferably, the acylating agent may be added in such a way as to minimize side reactions, such as in a continuous or semi-continuous fashion.

The reaction may also be run so as to minimize side reactions by using high concentrations of the polymer in diluent, such as 45 wt % or more, or 50 wt % or more, or 55 wt % or more, or 60 wt % or more in batch, semi-continuous, or continuous reactor operations. For example, the polymer (such as a hydrogenated isoprene polymer, such as hydrogenated homo-polyisoprene) may be introduced into batch, semi-continuous, or continuous reactor operations as solution or suspension (such as a slurry) in diluent (such as oil (e.g., base oil, such as a Group I, II, III, IV, and/or V base oil, such as a Group II and/or Group III base oil) or alkane solvent or diluent or a combination thereof), where the polymer may be present in the solution or suspension at 45 wt % or more (or 50 wt % or more, or 55 wt % or more, or 60 wt % or more), based upon the weight of the polymer and diluent.

In embodiments, the side reactions may be minimized by: 1) adding the acylating agent in a continuous or semi-continuous fashion, and/or 2) the polymer is introduced into batch, semi-continuous or continuous reactor operations as solution or suspension in diluent where the polymer is present at 45 wt % or more, based upon the weight of the polymer and diluent.

In embodiments, side reactions are minimized, optionally by adding the acylating agent in a continuous or semi-continuous fashion, and/or by introducing the fully or partially hydrogenated polymer (such as isoprene polymer) into batch, semi-continuous, or continuous reactor operations as solution or suspension in diluent, said solution or suspension comprising 45 wt % or more (or 50 wt % or more, or 55 wt % or more, or 60 wt % or more), of the fully or partially hydrogenated polymer, based upon the weight of the fully or partially hydrogenated polymer and diluent.

In embodiments, side reactions are minimized, optionally by adding the acylating agent in a continuous or semi-continuous fashion, and by introducing the fully or partially hydrogenated polymer (such as isoprene polymer) into batch, semi-continuous, or continuous reactor operations as solution or suspension in diluent, said solution or suspension comprising 45 wt % or more (or 50 wt % or more, or 55 wt % or more, or 60 wt % or more), of the fully or partially hydrogenated polymer, based upon the weight of the fully or partially hydrogenated polymer and diluent.

Functionalization

In embodiments, the acylated polymer may be reacted with an alcohol or an amine to form an amide, imide, ester or combinations thereof. The reaction may consist of condensation to form an imide, an amide, a half-amide, amide-ester, diester, or an amine salt. A primary amino group will typically condense to form an amide or, in the case of maleic anhydride, an imide. It is noted the amine may have a single primary amino group or multiple primary amino groups.

Suitable amines may include one or more aromatic amines, such as amines wherein a carbon atom of the aromatic ring structure is attached directly to the amino nitrogen. The amine may also be aliphatic. In embodiments aliphatic amines can be used alone or in combination with each other or in combination with aromatic amines. The amount of aromatic amine may, in some embodiments, be a major or minor amount compared with the amount of the non-aromatic amines, or in some instances, the composition may be substantially free of aromatic amine. Alternately, the composition may be substantially free of aliphatic amine.

Examples of aromatic amines which may be used herein include one or more N-arylphenylenediamine(s) represented by the formula:

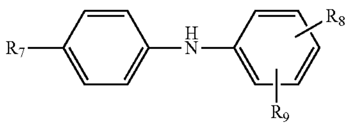

wherein $R_7$ is H, —NHaryl, —NHalkaryl, or a branched or straight chain hydrocarbyl radical having from about 4 to about 24 carbon atoms selected from alkyl, alkenyl, alkoxyl, aralkyl or alkaryl; $R_9$ is $—NH_2$, $—(NH(CH_2)_n)_mNH_2$, —NHalkyl, —NHaralkyl, $—CH_2$-aryl-$NH_2$, in which n and m each have a value from about 1 to about 10; and $R_8$ is hydrogen, or alkyl, alkenyl, alkoxyl, aralkyl, or alkaryl, having from about 4 to about 24 carbon atoms.

Suitable N-arylphenylenediamines include N-phenylphenylenediamines (NPPDA), for example, N-phenyl-4,4-phenylenediamine, N-phenyl-1,3-phenylenediamine, and N-phenyl-1,2-phenylenediamine and N-naphthyl-1,4-phenylenediamine. Other derivatives of NPPDA may also be included, such as N-propyl-N'-phenylphenylenediamine.

linear or branched alkylene group containing 1 to 5, or 1 to 2 carbon atoms; and w may be 1 to 10, or 1 to 4, or 1 to 2 (typically 1).

Other examples of aromatic amines include aniline, N-alkylanilines such as N-methyl aniline, and N-butylaniline, di-(para-methylphenyl)amine, naphthylamine, 4-aminodiphenylamine, N,N-dimethylphenylenediamine, 4-(4-nitrophenylazo)aniline (disperse orange 3), sulfamethazine, 4-phenoxyaniline, 3-nitroaniline, 4-aminoacetanilide, 4-amino-2-hydroxy-benzoic acid phenyl ester (phenyl amino salicylate), N-(4-amino-5-methoxy-2-methyl-phenyl)-benzamide (fast violet B), N-(4-amino-2,5-dimethoxy-phenyl)-benzamide (fast blue RR), N-(4-amino-2,5-di-ethoxy-phenyl)-benzamide (fast blue BB), N-(4-amino-phenyl)-benzamide and 4-phenylazoaniline. Suitable amines are referenced in U.S. Pat. No. 7,790,661 and are hereby incorporated by reference.

In embodiments, the compound condensing with the acylated polymer can be represented by the following formulas:

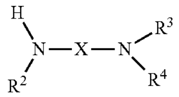

wherein X is an alkylene group containing about 1 to about 4 carbon atoms; $R^2$, $R^3$ and $R^4$ are hydrocarbyl groups.

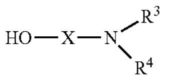

wherein X is an alkylene group containing about 1 to about 4 carbon atoms; $R^3$ and $R^4$ are hydrocarbyl groups.

Alternately, the amine may be an amine having at least 4 aromatic groups and an aldehyde (such as formaldehyde). The aromatic amine may be represented by formula:

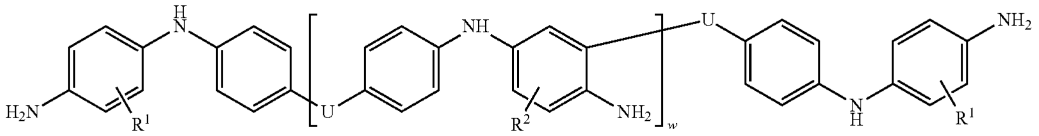

In embodiments, the amine reacted with the acylated polymer is an amine having at least 3 or 4 aromatic groups and may be represented by the following formula:

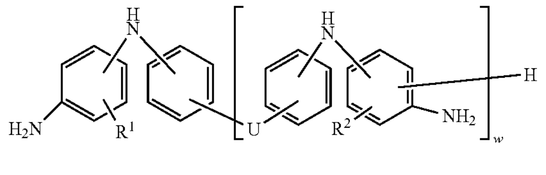

wherein independently each variable, $R^1$ may be hydrogen or a $C_1$ to $C_5$ alkyl group (typically hydrogen); $R^2$ may be hydrogen or a $C_1$ to $C_5$ alkyl group (typically hydrogen); U may be an aliphatic, alicyclic or aromatic group, with the proviso that when U is aliphatic, the aliphatic group may be wherein, $R^1$ is hydrogen or a $C_{1-5}$ alkyl group (typically hydrogen); $R^2$ is hydrogen or a $C_{1-5}$ alkyl group (typically hydrogen); U is an aliphatic, alicyclic or aromatic group, optionally with the proviso that when U is aliphatic, the aliphatic group may be linear or branched alkylene group containing 1, 2, 3, 4, or 5, or 1 to 2 carbon atoms; and w is 0, 1, 2, 3, 4, 5, 6, 7, 8, or 9, such as 0, 1, 2, or 3 or 0 or 1 (typically 0). For further information on such amines see, e.g., US 2017/0073606, page 5 paragraph [0064]-[0070] and European Patent No. 2 401 348.

Examples of compounds capable of condensing with the acylating agent and further having a tertiary amino group can include but are not limited to: dimethylaminopropylamine, N,N-dimethyl-aminopropy-lamine, N,N-diethyl-amino-propylamine, N,N-dimethyl-ami-noethylamine ethylenediamine, 1,2-propylenediamine, 1,3-propylenediamine, the isomeric butylenediamines, pentanediamines, hexanediamines, heptanediamines, diethylenetriamine, dipropylenetriamine, dibutylenetriamine, triethylenetetraamine, tetraethylene pentaamine, pentaethylenehexaamine, hexamethylenetetramine, and bis(hexamethylene) triamine, the diaminobenzenes, the diaminopyridines or mixtures thereof. The compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-aminoethyl)piperidine, 3,3-di-amino-N-methyldipropylamine, 3',3-aminobis(N,N-dimethylpropylamine). Another example of compounds capable of condensing with the acylating agent and having a tertiary amino group include alkanolamines including, but not limited to, triethanolamine, trimethanolamine, N,N-dimethylaminopropanol, N,N-di-ethylaminopropanol, N,N-diethylaminobutanol, N,N,N-tris(hydroxyethyl)amine, N,N,N-tris (hydroxymethyl)amine.

In embodiments, the polymer may be reacted with a polyether aromatic compound. Typically, the polyether aromatic compound will have at least two functional groups, each capable of reacting with a monocarboxylic acid or ester thereof, or dicarboxylic acid, anhydride or ester thereof, or mixtures thereof. In embodiments, the polyether aromatic compound is derived from an aromatic compound containing at least one amine group and wherein the poly ether is capable of reacting with a monocarboxylic acid or ester thereof, or dicarboxylic acid, anhydride or ester thereof.

Examples of suitable polyether aromatic amines include compounds having the following structure:

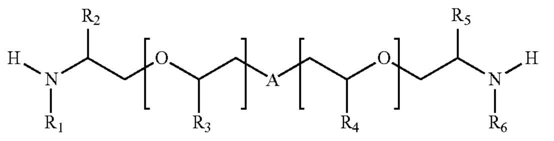

in which A represents an aromatic aminic moiety wherein the ether groups are linked through at least one amine group on the aromatic moiety; $R_1$ and $R_6$ are independently hydrogen, alkyl, alkaryl, aralkyl, or aryl or mixtures thereof; $R_2$, $R_3$, $R_4$, and $R_5$ are independently hydrogen or alkyl containing from about 1 to about 6 carbon atoms of mixtures thereof; and a and x are independently integers from about 1 to about 50.

The acylated polymer may be reacted with a polyether amine or polyether polyamine. Typical polyether amine compounds contain at least one ether unit and are chain terminated with at least one amine moiety. The polyether polyamines can be based on polymers derived from $C_2$-$C_6$ epoxides such as ethylene oxide, propylene oxide, and butylene oxide. Examples of polyether polyamines are sold under the Jeffamine™ brand and are commercially available from Hunstman Corporation.

Amines useful herein for combination with the acylated polymer include one or more of: N-phenyldiamines (such as N-phenyl-1,4-phenylenediamine, N-phenyl-p-phenylenediamine (a.k.a. 4-amino-diphenylamine, ADPA), N-phenyl-1, 3-phenylenediamine, N-phenyl-1,2-phenylenediamine), nitroaniline (such as 3-nitroaniline), N-phenylethane-diamine (such as N1-phenylethane-1,2-diamine), N-aminophenylacetamide (such as N-(4-aminophenyl)acetamide), morpholinopropanamine (such as 3-morpholinopropan-1-amine), and aminoethylpiperazine (such as 1-(2-aminoethyl) piperazine).

In embodiments, the functionalization (such as amination) reactions described herein may take place in diluent (such as base oil or alkane solvent). As a side product, functionalized diluent (such as functionalized base oil) can be produced. It is contemplated that the functionalized diluent (such as functionalized base oil) may comprise reaction product of the acylated diluent (such as acylated base oil) with an amine to form an amide, imide or combination thereof.

Preferably, the reaction product of the acylated diluent (such as acylated oil) with an amine or alcohol to form an amide, imide, ester, or combination thereof, may be present in a concentrate in an amount of 40 wt % or less, alternately 20 wt % or less, alternately 10 wt % or less, alternately 5 wt % or less, alternately 3 mass % or less, preferably 2 mass % or less, preferably 1 mass % or less, preferably at 0.1 mass % or less, preferably at 0 mass % (such as 0 to 40 mass %, alternately 0.01 to 40 mass %, alternately 0.1 to 20 mass %, alternately to 1 to 10 mass %, alternately 1.5 to 5 mass %), based upon the weight of the concentrate composition.

Preferably one or more functionalized base oils, such as the reaction product of the acylated diluent (such as acylated base oil) with an amine or alcohol to form an amide, imide, ester, or combination thereof, may be present in the lubricating oil composition at an amount of 0.01 to 40 mass %, alternately 0.1 to 20 mass %, alternately to 1 to 10 mass %, alternately 1.5 to 5 mass %, (such as at 3 mass % or less, preferably 2 mass % or less, preferably 1 mass % or less, preferably at 0.1 mass % or less, preferably at 0 mass %), based upon the weight of the lubricating oil composition.

In embodiments, the functionalization (such as amination) reactions described herein may take place in solvent-containing media. As a side product, functionalized solvent can be produced. In embodiments, the functionalized solvent may be present in a concentrate composition at 3 mass % or less, preferably 2 mass % or less, preferably 1 mass % or less, preferably at 0.1 mass % or less, preferably at 0 mass %, based upon the weight of the concentrate composition. In embodiments, functionalized solvent may be present in a lubricating oil composition at 3 mass % or less, preferably 2 mass % or less, preferably 1 mass % or less, preferably at 0.1 mass % or less, preferably at 0 mass %, based upon the weight of the lubricating oil composition.

In embodiments, the acylated base oil/solvent may be removed prior to functionalization.

The functionalized polymer may be a homopolymer of $C_4$ or $C_5$ olefins, such as butadiene and isoprene.

In embodiments, the functionalized polymer may be a homopolymer of isoprene, or a copolymer of isoprene and less than 5 mol % (such as less than 3 mol %, such as less than 1 mol %, such as less than 0.1 mol %) comonomer.

The functionalized polymer may comprise or be a copolymer of isoprene and one or more of styrene, methylstyrene, 2,3-dimethyl-butadiene, 2-methyl-1,3-pentadiene, myrcene, 3-methyl-1,3-pentadiene, 4-methyl-1,3-pentadiene, 2-phenyl-1,3-butadiene, 2-phenyl-1,3-pentadiene, 3-phenyl-1,3 pentadiene, 2,3-dimethyl-1,3-pentadiene, 2-hexyl-1,3-butadiene, 3-methyl-1,3-hexadiene, 2-benzyl-1, 3-butadiene, 2-p-tolyl-1,3-butadiene 1,3-butadiene, 1,3-pentadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, and 3,5-decadiene, (optionally the comonomer(s) are present at less than 20 mol %, less than 5 mol %, such as less than 3 mol %, such as less than 1 mol %, such as less than 0.1 mol %)

In embodiments, the functionalized polymer comprises 10 (such as 9, such as 8, such as 7, such as 6, such as 5, such as 4, such as 3, such as 2, such as 1) wt %, or less, based upon the weight of the functionalized polymer, of styrene monomer.

In embodiments, styrene repeat units may be absent in the functionalized polymer.

In embodiments, the functionalized polymer may be a block or tapered block copolymer that does not comprise a styrene block.

In embodiments, the functionalized polymer may be a block or tapered block copolymer comprising (or consisting of or consisting essentially of) isoprene.

In embodiments, the functionalized polymer may be a block or tapered block copolymer comprising 50 wt % or more isoprene, based upon the weight of the copolymer.

In embodiments, the functionalized polymer may be a block or tapered block copolymer comprising (or consisting of or consisting essentially of) $C_{4-5}$ conjugated diene, preferably comprising 50 (such as 60, such as 70, such as 80, such as 90, such as 95, such as 98) wt % or more $C_{4-5}$ conjugated diene, based upon the weight of the copolymer.

In embodiments, the functionalized polymer may be a copolymer comprising 50 (such as 60, such as 70, such as 80, such as 90, such as 95, such as 98) wt % or more isoprene, based upon the weight of the copolymer.

In embodiments, the functionalized polymer may be a copolymer comprising 50 (such as 60, such as 70, such as 80, such as 90, such as 95, such as 98) wt % or more butadiene, based upon the weight of the copolymer.

In embodiments, the functionalized polymer may be a copolymer comprising 50 (such as 60, such as 70, such as 80, such as 90, such as 95, such as 98) wt % or more butadiene and isoprene, based upon the weight of the copolymer.

In embodiments, the functionalized polymer may be a di-block copolymer comprising at least one block of isoprene homo- or co-polymer.

Optionally, butadiene repeat units may be absent in the functionalized polymer.

Optionally, the functionalized polymer may be not homopolyisobutylene.

Optionally, the functionalized polymer may be not a copolymer of isoprene and butadiene.

Generally, the polymerized conjugated diene in the functionalized polymer includes monomer units that have been inserted in the growing polymer chain by conjugated addition and non-conjugated addition In embodiments the functionalized polymer contains at least about 50% of by conjugated addition insertions, such as at least about 75% of by conjugated addition insertions, such as about 80% of by conjugated addition insertions, such as from about 85% to about 100% of by conjugated addition insertions, based upon the total number of by conjugated addition and non-conjugated insertions, as measured by $^{13}C$ NMR.

The insertion of isoprene most often occurs by 2,1 insertions, 1,4 insertions (trans and cis), and 3,4 insertions of isoprene. (Measurements of the insertion geometry are determined by $^1H$ NMR.) As measured by $^1H$ NMR, the functionalized isoprene polymer contains at least about 50% of 1,4-insertions, such as at least about 75% of 1,4 insertions, such as at least about 80% of 1,4 insertions, such as at least about 90% of 1,4 insertions, such as at least about 95% of 1,4 insertions, such as at least 98% of 1,4 insertions, based upon the total of the 2,1 insertions, 1,4 insertions, and 3,4 insertions of isoprene. For purposes of this disclosure: 1) the phrase "1,4 insertion" includes 1,4 and 4,1 insertions, 2) the phrase "2,1 insertion" includes 2,1 and 1,2 insertions, and 3) the phrase "3,4 insertion" includes 3,4 and 4,3 insertions.

The functionalized polymer may be homopolymer or copolymer. Optionally, the functionalized polymer comprises a homopolymer or copolymer of isoprene. The copolymer may be a random copolymer, a tapered block copolymer, a star copolymer, or a block copolymer.

The functionalized polymer may typically have an Mn of 20,000 to 150,000 g/mol, alternately 20,000 to about 150,000 g/mol, alternately 30,000 to about 125,000 g/mol, alternately 35,000 to about 100,000 g/mol, alternately 40,000 to 80,000 g/mol (GPC-PS).

The polymer prior to functionalization may typically have an Mn/Mw (GPC-PS) of 1.0 to 2, such as 1.1 to 1.5, such as 1.1 to 1.3, such as 1.1 to 1.2. As functionalization occurs, Mw/Mn broadening may occur.

The functionalized polymer may typically have an Mw/Mn (GPC-PS) of 1 to 3, alternately 1 to 2, alternately greater than 1 to less than 2, alternately 1.05 to 1.9, alternately 1.10 to 1.8, alternately 1.10 to 1.7, alternately 1.12 to 1.6, alternately 1.13 to 1.5, alternately 1.15 to 1.4, alternately 1.15 to 1.3. Alternately, the functionalized polymer may typically have an Mw/Mn of 1 or greater than 1 to less than 2 (such as less than 1.8, such as less than 1.7, such as less than 1.6, such as less than 1.4, such as less than 1.2, such as less than 1.15, such as less than 1.12, such as less than 1.10).

In embodiments, the functionalized polymer may have a Saponification Number (SAP) of 25 (such as 28, such as 30, such as 32, such as 34) mgKOH/g or more, as determined by ASTM D94.

In embodiments, the functionalized polymer may contribute 17% or more (such as 20% or more, such as 17 to 40%, such as 20 to 30%) to the Saponification Number of the lubricating oil composition.

In embodiments, the functionalized polymer may have an average functionality of 1.4 to 20 FG grafts/polymer chain, such as 1.4 to 15 FG grafts/polymer chain, such as 3 to 12.5 FG grafts/polymer chain, such as 4 to 10 FG grafts/polymer chain, as determined by GPC-PS.

The functionalized polymer may have an average functionality of 15 (such as 14, 13, 12, 11, 10, 9, 8, 7, or 6) or less FG grafts/polymer chain, as determined by GPC-PS.

The functionalized polymer may have an average functionality of 1 (such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0) or more FG grafts/polymer chain, as determined by GPC-PS.

The functionalized polymer may have an average functionality from 1 (such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0) to 15 (such as 14, 13, 12, 11, 10, 9, 8, 7, or 6) FG grafts/polymer chain, as determined by GPC-PS.

In embodiments, the functionalized polymer may have an aromatic content of 5% or less, such as 3% or less, such as 1% or less, such as 0%, based upon the weight of the polymer.

In embodiments, the functionalized polymer may comprise acylated polymers of branched $C_{4-5}$ monomers having an Mn of 20,000 to 500,000 g/mol having an Mw/Mn of 2 or less, such as from 1 to 2.0, as determined by GPC-PS.

In embodiments, the functionalized polymer may have a number average molecular weight (Mn) of 20,000 (such as 25,000, such as 30,000, such as 35,000 such as 40,000) g/mol or more, as determined by GPC-PS.

In embodiments, the functionalized polymer may have a weight average molecular weight (Mw) of 50,000 (such as 40,000, such as 35,000) g/mol or less, as determined by GPC-PS. In embodiments, the functionalized polymer may have a weight average molecular weight (Mw) of 1000 to 50,000 g/mol, such as 5000 to 40,000 g/mol as determined by GPC-PS.

In embodiments, the functionalized polymer may have a z average molecular weight (Mz) of 5000 to 150,000 g/mol, such as 10,000 to 150,000 g/mol, such as 15,000 to 70,000 g/mol, such as 20,000 to 150,000 g/mol, alternately 20,000 to about 150,000 g/mol, alternately 30,000 to about 125,000 g/mol, alternately 35,000 to about 100,000 g/mol, alternately 40,000 to 80,000 g/mol, alternately 40,000 to 60,000 g/mol (GPC-PS).

In embodiments, the functionalized polymer may have a gel content of less than about 5 wt %, less than 3 wt %, less than 2 wt %, less than 1 wt %, less than 0.5 wt %, less than 0.1 wt %, or 0 wt 04 where the gel content is measured by determining the amount of material that is extractable from the polymer by using boiling xylene (or cyclohexane) as an extractant. The percent of soluble and insoluble (gel) material in a polymer composition is determined as described herein.

In embodiments, the functionalized polymer may have a Functionality Distribution (Fd) value of 3.5 or less (such as 3.4 or less, such as from 1 to 3.3, such as from 1.1 to 3.2, such as from 1.2 to 3.0, such as 1.4 to 2.9, as determined by GPC-PS). Functionality Distribution (Fd) value is determined as set out in the Example section below and an average functionality of 1.4 to 20 FG grafts/polymer chain, such as 1.4 to 15 FG grafts/polymer chain, such as 3 to 12.5 FG grafts/polymer chain, such as 4 to 10 FG grafts/polymer chain, as determined by GPC-PS.

This disclosure relates to amide, imide, and/or ester functionalized hydrogenated/saturated polymers comprising (consisting essentially of or consisting of) $C_{4-5}$ olefins having an Mw/Mn of less than 2, a Functionality Distribution (Fd) value of 3.5 or less (such as 3.4 or less, such as from 1 to 3.3, such as from 1.1 to 3.2, such as from 1.2 to 3.0, such as 1.4 to 2.9, as determined by GPC-PS), and wherein, if the polymer prior to functionalization is a $C_4$ olefin polymer such as polyisobutylene, polybutadiene, or a copolymer thereof (preferably a polyisobutylene or a copolymer of isobutylene and butadiene), then the $C_4$ olefin polymer has an Mn of 10,000 g/mol or more (GPC-PS), and if the polymer prior to functionalization is a $C_4/C_5$ copolymer of isoprene and butadiene, then the Mn of the copolymer is greater than 25,000 Mn (GPC-PS).

This disclosure also relates to amide, imide, and/or ester functionalized hydrogenated/saturated polymers comprising 90 mol % or more isoprene repeat units, having an Mw/Mn of less than 2, a Functionality Distribution (Fd) value of 3.5 or less (such as 3.4 or less, such as from 1 to 3.3, such as from 1.1 to 3.2, such as from 1.2 to 3.0, such as 1.4 to 2.9, as determined by GPC-PS), and wherein the polymer prior to functionalization has an Mn of 30,000 g/mol or more (GPC-PS).

This disclosure also relates to amide, imide, and/or ester functionalized hydrogenated/saturated homopolymers of isoprene having an Mw/Mn of less than 2, a Functionality Distribution (Fd) value of 3.5 or less (such as 3.4 or less, such as from 1 to 3.3, such as from 1.1 to 3.2, such as from 1.2 to 3.0, such as 1.4 to 2.9, as determined by GPC-PS), and wherein the polymer prior to functionalization has an Mn of 30,000 g/mol or more (as determined by GPC-PS).

The lubricating composition according to the present disclosure may further comprise one or more additives such as detergents, friction modifiers, antioxidants, pour point depressants, anti-foam agents, viscosity modifiers, dispersants, corrosion inhibitors, antiwear agents, extreme pressure additives, demulsifiers, seal compatibility agents, seal swell agents, additive diluent base oils, etc. Specific examples of such additives are described in, for example, Kirk-Othmer Encyclopedia of Chemical Technology, third edition, volume 14, pp. 477-526, and several are discussed in further detail below.

D. Friction Modifiers

A friction modifier is any material or materials that can alter the coefficient of friction of a surface lubricated by any lubricant or fluid-containing such material(s). Friction modifiers, also known as friction reducers, or lubricity agents or oiliness agents, and other such agents that change the ability of base oils, formulated lubricating compositions, or functional fluids, to modify the coefficient of friction of a lubricated surface may be effectively used in combination with the base oils or lubricating compositions disclosed herein if desired. Friction modifiers that lower the coefficient of friction are particularly advantageous in combination with the base oils and lubricating compositions of this disclosure.

Illustrative friction modifiers may include, for example, organometallic compounds or materials, or mixtures thereof. Illustrative organometallic friction modifiers useful in the lubricating oil formulations of this disclosure include, for example, tungsten and/or molybdenum compounds, such as molybdenum amine, molybdenum diamine, an organotungstenate (such as Molyvan™ W-324 from Vanderbilt Chemicals LLC), a molybdenum dithiocarbamate, molybdenum dithiophosphates, molybdenum amine complexes, molybdenum carboxylates, and the like, and mixtures thereof. Examples of useful molybdenum-containing compounds may conveniently include molybdenum dithiocarbamates, trinuclear molybdenum compounds, for example, as described in PCT Publication No. WO 98/26030, sulfides of molybdenum and molybdenum dithiophosphate. Dimers Sakura Lube 515, 525, and MOlyvan 3000 dimers,)

Other known friction modifiers comprise oil-soluble organo-molybdenum compounds (Moly van 855). Such organo-molybdenum friction modifiers may also provide antioxidant and anti-wear credits to a lubricating oil composition. Examples of such oil-soluble organo-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D664 or D2896 titration procedure and are typically hexavalent. Included are molybdic acid, ammonium molybdate, sodium molybdate, potassium molybdate, and other alkali metal molybdates and other molybdenum salts, e.g., hydrogen sodium molybdate, $MoOC_{14}$, $MoO_2Br_2$, $Mo_2O_3C_{16}$, molybdenum trioxide or similar acidic molybdenum compounds.

Among the molybdenum compounds useful in the compositions of this disclosure are organo-molybdenum compounds of the formula: $Mo(R''OCS_2)_4$ and $Mo(R''SCS_2)_4$, wherein R" is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of organo-molybdenum compounds useful in the lubricating compositions of this disclosure are tri-nuclear molybdenum compounds, especially those of the formula $Mo_3S_kL_nQ_z$ and mixtures thereof wherein the L are independently selected ligands having organo groups with a sufficient number of carbon atoms to render the compound soluble or dispersible in the oil, n is from 1 to 4, k varies from 4 to 7, Q is selected from the group of neutral electron-donating compounds such as water, amines, alcohols, phosphines, and ethers, and z ranges from 0 to 5 and includes non-stoichiometric values. At least 21 carbon atoms should be present among all the ligand/organo groups, such as at least 25, at least 30, or at least 35 carbon atoms.

Lubricating oil compositions useful in all aspects of the present disclosure preferably contain at least 1 ppm, at least 10 ppm, at least 30 ppm, at least 40 ppm and more preferably at least 50 ppm molybdenum. Suitably, lubricating oil compositions useful in all aspects of the present disclosure contain no more than 1000 ppm, no more than 750 ppm, or no more than 500 ppm of molybdenum. Lubricating oil compositions useful in all aspects of the present disclosure preferably contain from 10 to 1000, such as 30 to 750 or 40 to 500, ppm of molybdenum (measured as atoms of molybdenum). Alternately, the lubricating oil compositions useful in all aspects of the present disclosure preferably contain 0 ppm Mo.

For more information or useful friction modifiers containing Mo, see U.S. Pat. No. 10,829,712 (col 8, ln 58 to col 11, ln 31).

Ashless friction modifiers may be present in the lubricating oil compositions of the present disclosure and are known generally and include esters formed by reacting carboxylic acids and anhydrides with alkanols and amine-based friction modifiers. Other useful friction modifiers generally include a polar terminal group (e.g., carboxyl or hydroxyl) covalently bonded to an oleophilic hydrocarbon chain. Esters of carboxylic acids and anhydrides with alkanols are described in U.S. Pat. No. 4,702,850. Examples of other conventional organic friction modifiers are described by M. Belzer in the "Journal of Tribology" (1992), Vol. 114, pp. 675-682 and M. Belzer and S. Jahanmir in "Lubrication Science" (1988), Vol. 1, pp. 3-26. Typically, the total amount of organic ashless friction modifier in a lubricant according to the present disclosure does not exceed 5 mass %, based on the total mass of the lubricating oil composition and preferably does not exceed 2 mass % and more preferably does not exceed 0.5 mass %.

Illustrative friction modifiers useful in the lubricating compositions described herein include, for example, alkoxylated fatty acid esters, alkanolamides, polyol fatty acid esters, borated glycerol fatty acid esters, fatty alcohol ethers, and mixtures thereof.

Illustrative alkoxylated fatty acid esters include, for example, polyoxyethylene stearate, fatty acid polyglycol ester, and the like. These can include polyoxypropylene stearate, polyoxybutylene stearate, polyoxyethylene isostearate, polyoxypropylene isostearate, polyoxyethylene palmitate, and the like.

Illustrative alkanolamides include, for example, lauric acid diethylalkanolamide, palmic acid diethylalkanolamide, and the like. These can include oleic acid diethyalkanolamide, stearic acid diethylalkanolamide, oleic acid diethylalkanolamide, polyethoxylated hydrocarbylamides, polypropoxylated hydrocarbylamides, and the like.

Illustrative polyol fatty acid esters include, for example, glycerol monooleate, saturated mono-, di-, and tri-glyceride esters, glycerol monostearate, and the like. These can include polyol esters, hydroxyl-containing polyol esters, and the like.

Illustrative borated glycerol fatty acid esters include, for example, borated glycerol monooleate, borated saturated mono-, di-, and tri-glyceride esters, borated glycerol monostearate, and the like. In addition to glycerol polyols, these can include trimethylolpropane, pentaerythritol, sorbitan, and the like. These esters can be polyol monocarboxylate esters, polyol dicarboxylate esters, and on occasion polyoltricarboxylate esters. Preferred can be the glycerol monooleates, glycerol di-oleates, glycerol tri-oleates, glycerol monooleates, glycerol di-stearates, and glycerol tri-stearates and the corresponding glycerol mono-palmitates, glycerol dipalmitates, and glycerol tri-palmitates, and the respective isostearates, linoleates, and the like. Ethoxylated, propoxylated, and/or butoxylated fatty acid esters of polyols, especially using glycerol as underlying polyol are useful herein.

Illustrative fatty alcohol ethers include, for example, stearyl ether, myristyl ether, and the like. Alcohols, including those that have carbon numbers from $C_3$ to $C_{50}$, can be ethoxylated, propoxylated, or butoxylated to form the corresponding fatty alkyl ethers. The underlying alcohol portion can preferably be stearyl, myristyl, $C_{11}$-$C_{13}$ hydrocarbon, oleyl, isostearyl, and the like.

Useful concentrations of friction modifiers may range from 0.01 mass % to 5 mass %, or about 001 mass % to about 2.5 mass %, or about 0.05 mass % to about 1.5 mass %, or about 0.051 mass % to about 1 mass %. Concentrations of molybdenum-containing materials are often described in terms of Mo metal concentration. Advantageous concentrations of Mo may range from 25 ppm to 700 ppm or more, and often with a preferred range of 50-200 ppm. Friction modifiers of all types may be used alone or in mixtures with the materials of this disclosure. Often mixtures of two or more friction modifiers, or mixtures of friction modifier(s) with alternate surface-active material(s), are also desirable. For example, combinations of Mo-containing compounds with polyol fatty acid esters, such as glycerol mono-oleate are useful herein.

E. Antioxidants

Antioxidants retard the oxidative degradation of base oils during service. Such degradation may result in deposits on metal surfaces, the presence of sludge, a viscosity increase in a lubricant, and the like. A wide variety of oxidation inhibitors that are useful in lubricating oil compositions. See Lubricants and Related Products, Klamann, Wiley VCH, 1984; U.S. Pat. Nos. 4,798,684 and 5,084,197, for example.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics, which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{6+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include, for example, hindered 2,6-di-alkyl-phenolic proprionic ester derivatives. Bis-phenolic antioxidants may also be advantageously used herein. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include, for example, 4,4'-bis (2,6-di-t-butyl-phenol) and 4,4'-methylene-bis(2,6-di-t-butyl-phenol).

Effective amounts of one or more catalytic antioxidants may also be used. The catalytic antioxidants comprise an effective amount of a) one or more oil soluble polymetal organic compounds; and, effective amounts of b) one or more substituted diphenyl amine (such as N,N'-diaryl-o-phenylenediamine) compounds or c) one or more hindered phenol compounds; or a combination of both b) and c). Catalytic antioxidants useful herein are more fully described in U.S. Pat. No. 8,048,833.

Non-phenolic oxidation inhibitors, which may be used include aromatic amine antioxidants and these may be used either as such or in combination with phenolics. Typical examples of non-phenolic antioxidants include: alkylated and non-alkylated aromatic amines such as aromatic monoamines of the formula $R_8R_9R_{10}N$, where $R_8$ is an aliphatic, aromatic or substituted aromatic group, $R_9$ is an aromatic or a substituted aromatic group, and $R_{10}$ is H, alkyl, aryl or $R_{11}S(O)XR_{12}$ where $R_{11}$ is an alkylene, alkenylene, or aralkylene group, $R_{12}$ is an alkyl group, or an alkenyl, aryl, or alkaryl group, and x is 0, 1, or 2. The aliphatic group $R_8$ may contain from 1 to about 20 carbon atoms, and preferably contains from about 6 to 12 carbon atoms. The aliphatic group is typically a saturated aliphatic group. Preferably, both $R_8$ and $R_9$ are aromatic or substituted aromatic groups, and the aromatic group may be a fused ring aromatic group such as naphthyl. Aromatic groups $R_8$ and $R_9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines (such as di($C_{8-14}$-alkyl substituted diphenyl)amine, such as di(nonylphenyl)amine), phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present disclosure include: p,p'-dioctyldiphenylamine; t-octylphenyl-alpha-naphthylamine; phenyl-alpha-naphthylamine; and p-octylphenyl-alpha-naphthylamine.

Sulfur-containing antioxidants are also useful herein. In particular, one or more oil-soluble or oil-dispersible sulfur-containing antioxidant(s) can be used as an antioxidant additive. For example, sulfurized alkyl phenols and alkali or alkaline earth metal salts thereof also are useful antioxidants herein. Suitably, the lubricating oil composition(s) of the present disclosure may include the one or more sulfur-containing antioxidant(s) in an amount to provide the lubricating oil composition with from 0.02 to 0.2, preferably from 0.02 to 0.15, even more preferably 0.02 to 0.1, even more preferably 0.04 to 0.1, mass % sulfur based on the total mass of the lubricating oil composition. Optionally the oil-soluble or oil-dispersible sulfur-containing antioxidant (s) are selected from sulfurized $C_4$ to $C_{25}$ olefin(s), sulfurized aliphatic ($C_7$ to $C_{29}$) hydrocarbyl fatty acid ester(s), ashless sulfurized phenolic antioxidant(s), sulfur-containing organo-molybdenum compound(s), and combinations thereof. For further information, on sulfurized materials useful as antioxidants herein, please see U.S. Pat. No. 10,731,101 (col 15, ln 55 to col 22, ln 12).

Antioxidants useful herein include hindered phenols and/or arylamines. These antioxidants may be used individually by type or in combination with one another.

Typical antioxidants include: Irganox™ L67, Irganox™ L135, Ethanox™ 4702, Lanxess Additin™ RC 7110; Ethanox™ 4782J; Irganox™ 1135, Irganox™ 5057, sulfurized lard oil and palm oil fatty acid methyl ester.

Antioxidant additives may be used in an amount of about 0.01 to 10 (alternately 0.01 to 5, alternately 0.01 to 3) mass %, alternately about 0.03 to 5 mass %, alternately 0.05 to less than 3 mass %, based upon the weight of the lubricating composition.

Compositions according to the present disclosure may contain an additive having a different enumerated function that also has secondary effects as an antioxidant (for example, phosphorus-containing anti-wear agents (such as ZDDP) may also have antioxidant effects). These additives are not included as antioxidants for purposes of determining the amount of antioxidant in a lubricating oil composition or concentrate herein.

F. Pour Point Depressants

Conventional pour point depressants (also known as lube oil flow improvers or LOFI's) may be added to the compositions of the present disclosure if desired. These pour point depressants may be added to lubricating compositions disclosed herein to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748; 2,191,498; 2,387,501; 2,655,479; 2,666,746; 2,721,877; 2,721,878; and 3,250,715 describe useful pour point depressants and/or the preparation thereof. Such additives may be used in an amount of about 0.01 to 5 mass %, preferably about 0.01 to 1.5 mass %, based upon the weight of the lubricating composition.

G. Anti-Foam Agents

Anti-foam agents may advantageously be added to lubricant compositions described herein. These agents prevent or retard the formation of stable foams. Silicones and/organic polymers are typical anti-foam agents. For example, polysiloxanes, such as silicon oil or polydimethyl siloxane, provide anti-foam properties.

Anti-foam agents are commercially available and may be used in minor amounts such as 5 mass % or less, 3 mass % or less, 1 mass % or less, 0.1 mass % or less, such as from 5 to mass % to 0.1 ppm such as from 3 mass % to 0.5 ppm, such as from 1 mass % to 10 ppm.

For example, it may be that the lubricating oil composition comprises an anti-foam agent comprising polyalkyl siloxane, such as a polydialkyl siloxane, for example, wherein the alkyl is a $C_1$-$C_{10}$ alkyl group, e.g., a polydimethylsiloxane (PDMS), also known as a silicone oil. Alternately, the siloxane is a poly($R^3$)siloxane, wherein $R^3$ is one or more same or different linear branched or cyclic hydrocarbyls, such as alkyls or aryls, typically having 1 to 20 carbon atoms. It may be that, for example, the lubricating oil composition comprises a polymeric siloxane compound according to Formula 1 below wherein $R^1$ and $R^2$ are independently methyl, ethyl, propyl, butyl, pentyl, hexyl, heptyl, octyl, nonyl or decyl, phenyl, naphthyl, alkyl substituted phenyl, or isomers thereof (such as methyl, phenyl) and n is from 2 to 1000, such as 50 to 450, alternately such as 40 to 100.

Additionally, or alternatively, it may be that the lubricating oil composition comprises an organo-modified siloxane (OMS), such as a siloxane modified with an organo group such as a polyether (e.g., ethylene-propyleneoxide copolymer), long chain hydrocarbyl (e.g., $C_{11}$-$C_{100}$ alkyl), or aryl (e.g., $C_6$-$C_{14}$ aryl). It may be that, for example, the lubricating oil composition comprises an organo-modified siloxane compound according to Formula 1, wherein n is from 2 to 2000, such as 50 to 450 (alternately such as 40 to 100), and wherein $R^1$ and $R^2$ are the same or different, optionally wherein each of $R^1$ and $R^2$ is, independently an organo group, such as an organo group selected from polyether (e.g., ethylene-propyleneoxide copolymer), long chain hydrocarbyl (e.g., $C_{11}$-$C_{100}$ alkyl), or aryl (e.g., $C_6$-$C_{14}$ aryl). Preferably, one of $R^1$ and $R^2$ is $CH_3$.

Formula 1

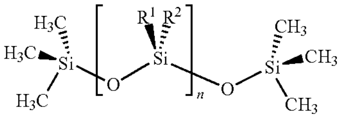

Based on the total weight of the lubricant composition, the siloxane according to Formula 1 is incorporated so as to provide about 0.1 to less than about 30 ppm Si, or about 0.1 to about 25 ppm Si, or about 0.1 to about 20 ppm Si, or about 0.1 to about 15 ppm Si, or about 0.1 to about 10 ppm Si. More preferably, it is in the range of about 3-10 ppm Si.

In embodiments, silicone anti-foam agents useful herein are available from Dow Corning Corporation and Union Carbide Corporation, such as Dow Corning FS-1265 (1000 centistokes), Dow Corning DC-200, and Union Carbide UC-L45. Silicone anti-foamants useful herein include polydimethylsiloxane, fluoro-silicone materials, phenyl-methyl polysiloxane, linear, cyclic or branched siloxanes, silicone polymers and copolymers, and/organo-silicone copolymers. Also, a siloxane polyether copolymer Anti-foamant available from OSI Specialties, Inc. of Farmington Hills, Michigan and may be substituted or included. One such material is sold as SILWET-L-7220. Additional useful silicon containing agents include those disclosed in EP 3 366 755 A1.

Acrylate polymer anti-foam agent can also be used herein. Typical acrylate anti-foamants include polyacrylate anti-foamant available from Monsanto Polymer Products Co. known as PC-1244. A preferred acrylate polymer anti-foam agent useful herein is PX™ 3841 (i.e., an alkyl acrylate polymer), commercially available from Dorf Ketl, also referred to as Mobilad™ C402.

In embodiments, a combination of silicone anti-foamant and acrylate anti-foamant can be used, such as at a weight ratio of the silicone anti-foamant to the acrylate anti-foamant of from about 5:1 to about 1:5, see, for example, US Patent Application Publication No. 2021/0189283.

H. Viscosity Modifiers

Viscosity modifiers (also referred to as viscosity index improvers or viscosity improvers) can be included in the lubricating compositions described herein. Viscosity modifiers provide lubricants with high and low temperature operability. These additives impart shear stability at elevated temperatures and acceptable viscosity at low temperatures. Suitable viscosity modifiers include high molecular weight hydrocarbons, polyesters, and viscosity modifier dispersants (also referred to as a dispersant viscosity modifiers or DVM's) that can function as both a viscosity modifier and a dispersant. Typical molecular weights of these polymers are between about 10,000 to 1,500,000 g/mol, more typically about 20,000 to 1,200,000 g/mol, and even more typically between about 50,000 and 1,000,000 g/mol.

Examples of suitable viscosity modifiers are linear or radial (star-shaped) polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 g/mol molecular weight.

Copolymers useful as viscosity modifiers include those commercially available from Chevron Oronite Company LLC under the trade designation "PARATONE™" (such as "PARATONE™ 8921," "PARATONE™ 68231," and "PARATONE™ 8941"); from Afton Chemical Corporation under the trade designation "HiTEC™" (such as HiTEC™ 5850B, and HiTEC™ 5777); and from The Lubrizol Corporation under the trade designation "Lubrizol™ 7067C". Hydrogenated polyisoprene radial (star) polymers useful as viscosity modifiers herein include those commercially available from Infineum International Limited, e.g., under the trade designation "SV200™" and "SV600™". Hydrogenated diene-styrene block copolymers useful as viscosity modifiers herein are commercially available from Infineum International Limited, e.g., under the trade designation "SV150™".

Polymers useful as viscosity modifiers herein include polymethacrylate or polyacrylate polymers, such as linear polymethacrylate or polyacrylate polymers, such as those available from Evnoik Industries under the trade designation "Viscoplex™" (e.g., Viscoplex™ 6-954) or star polymers which are available from Lubrizol Corporation under the trade designation Asteric™ (e.g., Lubrizol™ 87708 and Lubrizol™ 87725).

Vinyl aromatic-containing polymers useful as viscosity modifiers herein may be derived from vinyl aromatic hydrocarbon monomers, such as styrenic monomers, such as styrene. Illustrative vinyl aromatic-containing copolymers useful herein may be represented by the following general formula: A-B wherein A is a polymeric block derived predominantly from vinyl aromatic hydrocarbon monomer (such as styrene), and B is a polymeric block derived predominantly from conjugated diene monomer (such as isoprene).

Vinyl aromatic-containing polymers useful as viscosity modifiers may have a Kinematic viscosity at 100° C. of 20 cSt or less, such as 15 cSt or less, such as 12 cSt or less, but may be diluted (such as in Group I, II, and/or III basestock) to higher Kinematic viscosities at 100° C., such as to 40 cSt or more, such as 100 cSt or more, such as 1000 cSt or more, such as 1000 to 2000 cSt.).

Dispersant viscosity modifiers useful herein include the amide, imide, and/or ester functionalized partially or fully saturated polymers comprising $C_{4-5}$ olefins as described in U.S. Ser. No. 18/480,571, filed Oct. 4, 2023, which is herein incorporated by reference in its entirety. Preferred DVM's include polymers referred to as "functionalized polymers" described in U.S. Ser. No. 18/480,571, and preferably are a functionalized hydrogenated polyisoprene family of polymers for use in lubricating oil compositions. In an advantageous form, the lubricating oil composition described herein further optionally includes one or more functionalized polymers described in Ser. No. 18/480,571 as dispersant viscosity modifiers's at from 0.2 to 2.0 mass %, or 0.4 to 1.8 mass %, or 0.6 to 1.6 mass %, or 0.8 to 1.4 mass %, or 1.0 to 1.2 mass % of the lubricating oil composition, where the functionalized polymers comprises an amide, imide, and/or ester functionalized partially or fully saturated polymer comprising $C_{4-5}$ olefins having: i) an Mw/Mn of less than 2, or less than 1.8, or less than 1.6, ii) a Functionality Distribution (Fd) value of 3.5 or less, or 3.2 or less, or 3.0 or less, or 2.5 or less, and iii) an Mn of 10,000 g/mol or more, or 15,000 g/mol or more, or 20,000 g/mol or more, or 25,000 g/mol or more (GPC-PS) of the polymer prior to functionalization, optionally provided that, if the polymer prior to functionalization is a copolymer of isoprene and butadiene, then the Mn of the copolymer is greater than 25,000 g/mol, or 30,000 g/mol or more, or 35,000 g/mol or more, or 40,000 g/mol or more (GPC-PS). (GPC-PS is performed as set out in U.S. Ser. No. 18/480,571, filed Oct. 4, 2023). For the functionalized polymer described in Ser. No. 18/480,571 useful herein, Average Functionality [also referred to as Average Functionality Value (Fv)] and Functionality Distribution (Fd) value are determined by Gel Permeation Chromatography using polystyrene standards as described in the Experimental section of U.S. Ser. No. 18/480,571, filed Oct. 4, 2023. The functionalized polymers described in Ser. No. 18/480,571 useful herein may include at least 50%, or at least 60%, or at least 70% of 1,4-insertions of monomer, such as isoprene monomer. Furthermore, the functionalized polymers described in Ser. No. 18/480,571 useful herein may include a partially or fully saturated homopolyisoprene containing one or more pendant amine groups and having an Mn of 25,000 to 100,000 g/mol, or 35,000 to 90,000 g/mol, or 45,000 to 80,000 g/mol, or 55,000 to 75,000 g/mol (GPC-PS) and at least 50%, or at least 60%, or at least 70% of 1,4-insertions prior to functionalization. The functionalized polymers described in Ser. No. 18/480,571 useful herein may be absent of styrene repeat units, or absent of butadiene repeat units, or is not a homo-polyisobutylene, or is not a copolymer of isoprene and butadiene.

Other useful DVM's include functionalized olefin copolymers (such as amine functionalized ethylene propylene copolymers). See U.S. Pat. Nos. 5,663,126, 6,187,721, 5,874,389; WO 97/47709; U.S. Pat. Nos. 6,300,289; 6,686,321; WO 99/21902; US 2002/0183456; US 2004/0043909; WO 03/099890; US 2008/0139423; US2008/0293600; WO 2006/116663; US 2004/0043909; and US 2010/0162981 for other useful DVM's.

Vinyl aromatic-containing polymer concentrates prepared in base oil (such as in Group I, II, and/or III basestock) useful as viscosity modifiers may have a Kinematic viscosity at 100° C. of 40 cSt or more, such as 100 cSt or more, such as 1000 cSt or more, such as 1000 to 2000 cSt. Further dilution in base oil (such as in Group I, II, and/or III basestock) may lower the viscosities at 100° C., such as to 20 cSt or less, such as 15 cSt or less, such as 12 cSt or less.

Typically, the viscosity modifiers may be used in an amount of about 0.01 to about 10 mass %, such as about 0.1 to about 7 mass %, such as 0.1 to about 4 mass %, such as about 0.2 to about 2 mass %, such as about 0.2 to about 1 mass %, and such as about 0.2 to about 0.5 mass %, based on the total weight of the formulated lubricant composition.

Viscosity modifiers are typically added as concentrates, in large amounts of diluent oil. The "as delivered" viscosity modifier typically contains from 20 mass % to 75 mass % of an active polymer for polymethacrylate or polyacrylate polymers, or from 8 mass % to 20 mass % of an active polymer for olefin copolymers, hydrogenated polyisoprene star polymers, or hydrogenated diene-styrene block copolymers, in the "as delivered" polymer concentrate.

I. Dispersants

During engine operation, oil-insoluble oxidation byproducts are produced. Dispersants help keep these byproducts in solution, thus diminishing their deposition on metal surfaces. Dispersants used in the formulation of the lubricating compositions herein may be ashless or ash-forming in nature. Preferably, the dispersant is ashless. So called ashless dispersants are organic materials that form substantially no ash upon combustion. For example, non-metal-containing or borated metal-free dispersants are considered ashless. In contrast, metal-containing detergents tend to form ash upon combustion.

Dispersants useful herein typically contain a polar group attached to a relatively high molecular weight hydrocarbon chain. The polar group typically contains at least one element of nitrogen, oxygen, or phosphorus. Typical hydrocarbon chains contain 40 to 500, such as 50 to 400 carbon atoms. When used in context of functionalized polymers operating as dispersants, the molecular weights are typically reported in terms of the base polymer prior to modification. For example PIBSA-PAM dispersant molecular weights are typically reported for the base polymer prior to functionalization with the acylating agent (maleic acid or anhydride) and functional group (such as polyamine). Hence, herein dispersant molecular weights are typically assigned the molecular weight of the base polymer the dispersant is derived from.

Dispersants of (Poly)alkenylsuccinic Derivatives

A particularly useful class of dispersants includes the (poly)alkenylsuccinic derivatives, typically produced by the reaction of a long chain hydrocarbyl-substituted succinic compound, usually a hydrocarbyl-substituted succinic anhydride, with a polyhydroxy or polyamino compound. The long chain hydrocarbyl group constituting the oleophilic portion of the molecule which confers solubility in the oil, is often a polyisobutylene group (typically the long chain hydrocarbyl group, such as a polyisobutylene group, has an Mn of 400 to 3000 g/mol, such as 450 to 2500 g/mol). Many examples of this type of dispersant are well known commercially and in the literature. Exemplary US patents describing such dispersants include U.S. Pat. Nos. 3,172,892; 3,2145,707; 3,219,666; 3,316,177; 3,341,542; 3,444,170; 3,454,607; 3,541,012; 3,630,904; 3,632,511; 3,787,374 and 4,234,435. Other types of dispersants are described in U.S. Pat. Nos. 3,036,003; 3,200,107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants useful herein may be found, for example, in European Patent Applications Nos. 0 471 071 and 0 451 380, to which reference is made for this purpose.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid or anhydride compound (typically having at least 25 carbon atoms, such as 28 to 400 carbon atoms, in the hydrocarbon substituent), with at least one equivalent of a polyhydroxy or polyamino compound (such as an alkylene amine) are particularly useful herein. Hydrocarbyl-substituted succinic acid and hydrocarbyl-substituted succinic anhydride derivatives may have a number average molecular weight of at least 400 g/mol, such as at least 900 g/mol, such as at least 1500 g/mol, such as from 400 to 4000 g/mol, such as from 800 to 3000, such as from 2000 to 2800 g/mol, such from about 2100 to 2500 g/mol, and such as from about 2200 to about 2400 g/mol.

Succinimides, which are particularly useful herein, are formed by the condensation reaction between: 1) hydrocarbyl-substituted succinic anhydrides, such as polyisobutylene succinic anhydride (PIBSA); and 2) polyamine (PAM). Examples of suitable polyamines include: polyhydrocarbyl polyamines, polyalkylene polyamines, hydroxy-substituted polyamines, polyoxyalkylene polyamines, and combinations thereof. Examples of polyamines include tetraethylene pentamine, pentaethylene hexamine, tetraethylenepentamine (TEPA), pentaethylenehaxamine (PEHA), N-phenyl-p-phenylenediamine (ADPA), and other polyamines having an average of 5, 6, 7, 8, or 9 nitrogen atoms per molecule. Mixtures where the average number of nitrogen atoms per polyamine molecule is greater than 7 are commonly called heavy polyamines or H-PAMs and may be commercially available under trade names such as HPA™ and HPA-X™ from DowChemical, E-100™ from Huntsman Chemical, et al. Examples of hydroxy-substituted polyamines include N-hydroxyalkyl-alkylene polyamines such as N-(2-hydroxyethyl)ethylene diamine, N-(2-hydroxyethyl)piperazine, and/or N-hydroxyalkylated alkylene diamines of the type described, for example, in U.S. Pat. No. 4,873,009. Examples of polyoxyalkylene polyamines include polyoxyethylene and/or polyoxypropylene diamines and triamines (as well as co-oligomers thereof) having an average Mn from about 200 to about 5000 g/mol. Products of this type are commercially available under the tradename Jeffamine™. Representative examples of useful succinimides are shown in U.S. Pat. Nos. 3,087,936; 3,172,892; 3,219,666; 3,272,746; 3,322,670; 3,652,616; 3,948,800; and 6,821,307; and CA Patent No. 1,094,044.

The dispersants may comprise one or more, optionally borated, higher molecular weight (Mn 1600 g/mol or more, such as 1800 to 3000 g/mol) succinimides and one or more, optionally borated, lower molecular weight (Mn less than 1600 g/mol) succinimides, where the higher molecular weight may be 1600 to 3000 g/mol, such as 1700 to 2800 g/mol, such as 1800 to 2500 g/mol, such as 1850 to 2300 g/mol; and the lower molecular weight may be 600 to less than 1600 g/mol, such as 650 to 1500 g/mol, such as 700 to 1400 g/mol, such as 800 to 1300 g/mol, such as 850 to 1200 g/mol such as 900 to 1150 g/mol, such as 900 to 1000 g/mol. The higher molecular weight succinimide dispersant may be present in the lubricating composition in an amount of from 0.5 to 10 mass %, or from 0.8 to 6 mass %, or from 1.0 to 5 mass %, or from 1.5 to 5 mass %, or from 1.5 to 4.0 mass %; and the lower molecular weight succinimides dispersant may be present in the lubricating composition in an amount of from 1 to 5 mass %, or from 1.5 to 4.8 mass %, or from 1.8 to 4.6 mass %, or from 1.9 to 4.6 mass %, or at 2 mass % or more, such as 2 to 5 mass %. The lower molecular weight succinimides may differ from the higher molecular weight succinimides, by 500 g/mol or more, such as by 750 g/mol or more, such as by 1000 g/mol or more, such as by 1200 g/mol or more, such as by 500 to 3000 g/mol, such as by 750 to 2000 g/mol, such as by 1000 to 1500 g/mol.

Succinate esters useful as dispersants include those formed by the condensation reaction between hydrocarbyl-substituted succinic anhydrides and alcohols or polyols. For example, the condensation product of a hydrocarbyl-substituted succinic anhydride and pentaerythritol is a useful dispersant.

Succinate ester amides useful herein are formed by a condensation reaction between hydrocarbyl-substituted succinic anhydrides and alkanol amines. Suitable alkanol amines include ethoxylated polyalkylpolyamines, propoxylated polyalkylpolyamines, and polyalkenylpolyamines such as polyethylene polyamines and/or propoxylated hexamethylenediamine. Representative examples are shown in U.S. Pat. No. 4,426,305.

Hydrocarbyl-substituted succinic anhydrides (such as PIBSA) esters of hydrocarbyl bridged aryloxy alcohols are also useful as dispersants herein. For information on such dispersants, please see U.S. Pat. No. 7,485,603, particularly, col 2, ln 65 to col 6, ln 22 and col 23, ln 40 to col 26, ln 46. In particular, PIBSA esters of methylene-bridged naphthyloxy ethanol (i.e., 2-hydroxyethyl-1-naphthol ether (or hydroxy-terminated ethylene oxide oligomer ether of naphthol) are useful herein.

The molecular weight of the hydrocarbyl-substituted succinic anhydrides used in the preceding paragraphs will typically range from 350 to 4000 g/mol, such as 400 to 3000 g/mol, such as 450 to 2800 g/mol, such as 800 to 2500 g/mol. The above (poly)alkenylsuccinic derivatives can be post-reacted with various reagents such as sulfur, oxygen, formaldehyde, carboxylic acids such as oleic acid.

The dispersants may be present in the lubricant in an amount 0.1 mass % to 20 mass % of the composition, such as 0.2 to 15 mass %, such as 0.25 to 10 mass %, such as 0.3 to 5 mass %, such as 1.0 mass % to 3.0 mass %, of the lubricating oil composition.

The above (poly)alkenylsuccinic derivatives, can also be post reacted with boron compounds such as boric acid, borate esters or highly borated dispersants, to form borated dispersants generally having from about 0.1 to about 5 moles of boron per mole of dispersant reaction product.

Dispersants useful herein include borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having an Mn of from about 300 to about 5000 g/mol, or from about 500 to about 3000 g/mol, or about 1000 to about 2000 g/mol, or a mixture of such hydrocarbylene groups, often with high terminal vinylic groups.

The boron-containing dispersant may be present at 0.01 mass % to 20 mass %, or 0.1 mass % to 15 mass %, or 0.1 mass % to 10 mass %, or 0.5 mass % to 8 mass %, or 1.0 mass % to 6.5 mass %, or 0.5 mass % to 2.2 mass % of the lubricating composition.

The boron-containing dispersant may be present in an amount to deliver boron to the composition at 15 ppm to 2000 ppm, or 25 ppm to 1000 ppm, or 40 ppm to 600 ppm, or 80 ppm to 350 ppm.

The borated dispersant may be used in combination with non-borated dispersant and may be the same or different compound as the non-borated dispersant. In one embodiment, the lubricating composition may include one or more boron-containing dispersants and one or more non-borated dispersants, wherein the total amount of dispersant may be 0.01 mass % to 20 mass %, or 0.1 mass % to 15 mass %, or 0.1 mass % to 10 mass %, or 0.5 mass % to 8 mass %, or 1.0 mass % to 6.5 mass %, or 0.5 mass % to 2.2 mass % of the lubricating composition and wherein the ratio of borated dispersant to non-boroated dispersant may be 1:10 to 10:1 (weight:weight) or 1:5 to 3:1 or 1:3 to 2:1.

The dispersant may comprise one or more borated or unborated poly(alkenyl)succinimides, where the polyalkyenyl is derived from polyisobutylene and the imide is derived from a polyamine ("PIBSA-PAM").

The dispersant may comprise one or more PIBSA-PAMs, where the PIB is derived from polyisobutylene having an Mn of from 600 to 5000, such as from 700 to 4000, such as from 800 to 3000, such as from 900 to 2500 g/mol and the polyamine is derived from hydrocarbyl-substituted polyamines, such as tetraethylene pentamine, pentaethylene hexamine, tetraethylenepentamine (TEPA), pentaethylene-haxamine (PEHA), N-phenyl-p-phenylenediamine (ADPA), and other polyamines having an average of 5, 6, 7, 8, or 9 nitrogen atoms per molecule). The dispersant may be borated, typically at levels of up to 4 mass % such as from 1 to 3 mass %. The dispersant may comprise one or more borated and one or more non-borated PIBSA-PAM's. The dispersant may comprise one or more borated PIBSA-PAM's derived from a PIB having an Mn of 700 to 1800 g/mol (such as 800 to 1500 g/mol) and one or more non-borated PIBSA-PAM's derived from a PIB having an Mn of more than 1800 to 5000 g/mol (such as 2000 to 3000 g/mol). The dispersant may comprise one or more non-borated PIBSA-PAM's derived from a PIB having an Mn of 700 to 1800 g/mol (such as 800 to 1500 g/mol) and one or more borated PIBSA-PAM's derived from a PIB having an Mn of more than 1800 to 5000 g/mol (such as 2000 to 3000 g/mol).

The dispersant may comprise PIBSA derived from a PIB having an Mn of 700 to 5000 g/mol (such as 800 to 3000 g/mol) and one or more borated or non-borated PIBSA-PAM's derived from a PIB having an Mn of 700 to 5000 g/mol.

The dispersant may comprise PIBSA derived from a PIB having an Mn of 700 to 5000 g/mol (such as 800 to 3000 g/mol) and one or more borated PIBSA-PAM's derived from a PIB having an Mn of 700 to 1800 g/mol (such as 800 to 1500 g/mol) and one or more non-borated PIBSA-PAM's derived from a PIB having an Mn of more than 1800 to 5000 g/mol (such as 2000 to 3000 g/mol). The dispersant may comprise PIBSA derived from a PIB having an Mn of 700 to 5000 g/mol (such as 800 to 3000 g/mol) one or more non-borated PIBSA-PAM's derived from a PIB having an Mn of 700 to 1800 g/mol (such as 800 to 1500 g/mol) and one or more borated PIBSA-PAM's derived from a PIB having an Mn of more than 1800 to 5000 g/mol (such as 2000 to 3000 g/mol).

The dispersant may comprise one or more borated or non-borated PIBSA-PAM's and one or more PIBSA-esters of hydrocarbyl bridged aryloxy alcohols.

The dispersant may comprise one or more borated and one or more non-borated PIBSA-PAM's.

The dispersant may comprise one or more, optionally borated, higher molecular weight (Mn 1600 g/mol or more, such as 1800 to 3000 g/mol) PIBSA-PAM's and one or more, optionally borated, lower molecular weight (Mn less than 1600 g/mol) PIBSA-PAM's, where the higher molecular weight may be 1600 to 3000 g/mol, such as 1700 to 2800 g/mol, such as 1800 to 2500 g/mol, such as 1850 to 2300 g/mol; and the lower molecular weight may be 600 to less than 1600 g/mol, such as 650 to 1500 g/mol, such as 700 to 1400 g/mol, such as 800 to 1300 g/mol, such as 850 to 1200 g/mol, such as 900 to 11500 g/mol, such as 900 to 100 g/mol. The higher molecular weight PIBSA-PAM dispersant may be present in the lubricating composition in an amount of from 0.5 to 10 mass %, or from 0.8 to 6 mass %, or from 1.0 to 5 mass %, or from 1.5 to 5 mass % or from 1.5 to 4.0 mass %; and the lower molecular weight PIBSA-PAM dispersant may be present in the lubricating composition in an amount of from 1 to 5 mass %, or from 1.5 to 4.8 mass %, or from 1.8 to 4.6 mass %, or from 1.9 to 4.6 mass %, or at 2 mass % or more, such as 2 to 5 mass %.

Dispersants of Mannich Bases

Mannich base dispersants useful herein are typically made from the reaction of an amine component, a hydroxy aromatic compound (substituted or unsubstituted, such as alkyl substituted), such as alkylphenols, and an aldehyde, such as formaldehyde. See U.S. Pat. Nos. 4,767,551 and 10,899,986. Process aids and catalysts, such as oleic acid and sulfonic acids, can also be part of the reaction mixture. Representative examples are shown in U.S. Pat. Nos. 3,697,574; 3,703,536; 3,704,308; 3,751,365; 3,756,953; 3,798,165; 3,803,039; 4,231,759; 9,938,479; 7,491,248; and 10,899,986, and PCT Publication No. WO 01/42399.

Dispersants of Polymethacrylate or Polyacrylate Derivatives

Polymethacrylate or polyacrylate derivatives are another class of dispersants useful herein. These dispersants are typically prepared by reacting a nitrogen-containing monomer and a methacrylic or acrylic acid esters containing 5-25 carbon atoms in the ester group. Representative examples are shown in U.S. Pat. Nos. 2,100,993, and 6,323,164. Polymethacrylate and polyacrylate dispersants are typically lower molecular weights.

The lubricating composition of the disclosure typically comprises dispersant at 0.1 mass % to 20 mass % of the composition, such as 0.2 to 15 mass %, such as 0.25 to 10 mass %, such as 0.3 to 5 mass %, such as 2.0 mass % to 4.0 mass % of the lubricating oil composition. Alternately the dispersant may be present at 0.1 mass % to 5 mass %, or 0.01 mass % to 4 mass % of the lubricating composition.

For further information on dispersants useful herein, please see U.S. Pat. No. 10,829,712, col 13, ln 36 to col 16, ln 67 and U.S. Pat. No. 7,485,603, col 2, ln 65 to col 6, ln 22, col 8, ln 25 to col 14, in 53, and col 23, ln 40 to col 26, ln 46.

Compositions according to the present disclosure may contain an additive having a different enumerated function that also has secondary effects as a dispersant (for example, viscosity modifiers described above, may also have dispersant effects). These additives are not included as dispersants for purposes of determining the amount of dispersant in a lubricating oil composition or concentrate herein.

J. Corrosion Inhibitors/Anti-Rust Agents

Corrosion inhibitors, also referred to as rust inhibitors or anti-rust agents, may be used to reduce the corrosion of metals and are often alternatively referred to as metal deactivators or metal passivators. Some corrosion inhibitors may alternatively be characterized as antioxidants.

Suitable corrosion inhibitors may include nitrogen and/or sulfur-containing heterocyclic compounds such as triazoles (e.g., benzotriazoles), substituted thiadiazoles, imidazoles, thiazoles, tetrazoles, hydroxyquinolines, oxazolines, imidazolines, thiophenes, indoles, indazoles, quinolines, benzoxazines, dithiols, oxazoles, oxatriazoles, pyridines, piperazines, triazines and derivatives of any one or more thereof. A particular corrosion inhibitor is a benzotriazole represented by the structure:

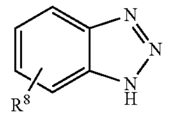

wherein $R^8$ is absent (hydrogen) or is a $C_1$ to $C_{20}$ hydrocarbyl or substituted hydrocarbyl group which may be linear or branched, saturated or unsaturated. It may contain ring structures that are alkyl or aromatic in nature and/or contain heteroatoms such as N, O, or S. Examples of suitable compounds may include benzotriazole, alkyl-substituted benzotriazoles (e.g., tolyltriazole, ethylbenzotriazole, hexylbenzotriazole, octylbenzotriazole, etc.), aryl substituted benzotriazole, alkylaryl- or arylalkyl-substituted benzotriazoles, and the like, as well as combinations thereof. For instance, the triazole may comprise or be a benzotriazole and/or an alkylbenzotriazole in which the alkyl group contains from 1 to about 20 carbon atoms or from 1 to about 8 carbon atoms. Non-limiting examples of such corrosion inhibitors may comprise or be benzotriazole, tirazoles such as tolyltriazole, and/or optionally, substituted benzotriazoles such as Irgamet™ and Irgamet™ 39, which are commercially available from BASF of Ludwigshafen, Germany.

A preferred corrosion inhibitor may comprise or be benzotriazole and/or tolyltriazole.

Additionally, or alternatively, the corrosion inhibitor may include one or more substituted thiadiazoles represented by the structure:

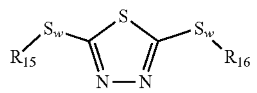

wherein $R_{15}$ and $R_{16}$ are independently hydrogen or a hydrocarbon group, which group may be aliphatic or aromatic, including cyclic, alicyclic, aralkyl, aryl and alkaryl, and wherein each w is independently 1, 2, 3, 4, 5, or 6 (preferably 2, 3, or 4, such as 2). These substituted thiadiazoles are derived from the 2,5-dimercapto-1,3,4-thiadiazole (DMTD) molecule. Many derivatives of DMTD have been described in the art, and any such compounds may be included in the fluid used in the present disclosure. For example, U.S. Pat. Nos. 2,719,125; 2,719,126; and 3,087,937; describe the preparation of various 2, 5-bis-(hydrocarbon dithio)-1,3,4-thiadiazoles.

Further, additionally or alternatively, the corrosion inhibitor may include one or more other derivatives of DMTD, such as a carboxylic ester in which $R_{15}$ and $R_{16}$ may be joined to the sulfide sulfur atom through a carbonyl group. Preparation of these thioester-containing DMTD derivatives is described, for example, in U.S. Pat. No. 2,760,933. DMTD derivatives produced by condensation of DMTD with alpha-halogenated aliphatic carboxylic acids having at least 10 carbon atoms are described, for example, in U.S. Pat. No. 2,836,564. This process produces DMTD derivatives wherein $R_{15}$ and $R_{16}$ are HOOC—CH($R_{19}$)—($R_{19}$ being a hydrocarbyl group). DMTD derivatives further produced by amidation or esterification of these terminal carboxylic acid groups may also be useful.

The preparation of 2-hydrocarbyldithio-5-mercapto-1,3,4-thiadiazoles is described, for example, in U.S. Pat. No. 3,663,561.

A class of DMTD derivatives may include mixtures of a 2-hydrocarbyldithio-5-mercapto-1,3,4-thiadiazole and a 2,5-bis-hydrocarbyldithio-1,3,4-thiadiazole. Such mixtures may be sold under the tradename HiTEC™ 4313 and are commercially available from Afton Chemical Company.

The preparation of 2-hydrocarbyldithio-5-mercapto-1,3,4-thiadiazoles is described, for example, in U.S. Pat. No. 3,663,561.

Still further, additionally or alternatively, the corrosion inhibitor may include a trifunctional borate having the structure, $B(OR_{46})_3$, in which each $R_{46}$ may be the same or different. As the borate may typically be desirably compatible with the non-aqueous medium of the composition, each $R_{46}$ may, in particular, comprise or be a hydrocarbyl $C_1$-$C_8$ moiety. For compositions in which the non-aqueous medium comprises or is a lubricating oil basestock, for example, better compatibility can typically be achieved when the hydrocarbyl moieties are each at least $C_4$. Non-limiting examples of such corrosion inhibitors thus include, but are not limited to, triethylborate, tripropylborates such as triisopropylborate, tributylborates such as tri-tert-butylborate, tripentylborates, trihexylborates, trioctylborates such as tri-(2-ethylhexyl)borate, monohexyl dibutylborate, and the like, as well as combinations thereof.

When used, a corrosion inhibitor may comprise a substituted thiadiazole, a substituted benzotriazole, a substituted triazole, a trisubstituted borate, or a combination thereof.

Additional corrosion inhibitors useful for ameliorating water damage, may be fatty alkyl ethers derived from alkyl alcohols, including those that have carbon numbers from $C_3$ to $C_{50}$, that have been ethoxylated, propoxylated, or butoxylated to form the corresponding fatty alkyl ethers. The underlying alcohol portion can preferably be stearyl, myristyl, $C_{11}$-$C_{13}$ hydrocarbyl, oleyl, isostearyl, and the like. Useful ethoxylated alcohols include ethoxylated lauryl alcohol (such as Berol™ 1214), nonylphenol ethoxylate, $C_6$ to $C_{20}$ ethoxylated linear alcohol and/or Surfonic™ L24-4, Huntsman.

When desired, corrosion inhibitors can be used in any effective amount, but, when used, may typically be used in amounts from about 0.001 mass % to 5.0 mass %, based on the weight of the composition, e.g., from 0.005 mass % to 3.0 mass % or from 0.01 mass % to 1.0 mass %. Alternately, such additives may be used in an amount of about 0.01 to 5 mass %, preferably about 0.01 to 1.5 mass %, based upon the weight of the lubricating composition.

In some embodiments, 3,4-oxypyridinone-containing compositions may contain substantially no (e.g., 0, or less than 0.001 mass %, 0.0005 mass % or less, not intentionally added, and/or absolutely no)triazoles, benzotriazoles, substituted thiadiazoles, imidazoles, thiazoles, tetrazoles, hydroxyquinolines, oxazolines, imidazolines, thiophenes, indoles, indazoles, quinolines, benzoxazines, dithiols, oxazoles, oxatriazoles, pyridines, piperazines, triazines, derivatives thereof, combinations thereof, or all corrosion inhibitors.

Compositions according to the present disclosure may contain an additive having a different enumerated function that also has secondary effects as a corrosion inhibitor. These additives are not included as corrosion inhibitor for purposes of determining the amount of corrosion inhibitor in a lubricating oil composition or concentrate herein.

K. Anti-Wear Agents and Zinc Dihydrocarbyl Dithiophosphate Compounds

The lubricating oil composition of the present disclosure can contain one or more anti-wear agents that can reduce friction and excessive wear. Any anti-wear agent known by a person of ordinary skill in the art may be used in the lubricating oil composition. Non-limiting examples of suitable anti-wear agents include dithiophosphates and or dithiocarbamates (such as metal (e.g., Pb, Sb, Mo, and the like) salts of dithiophosphates, and or metal (e.g., Zn, Pb, Sb, Mo, and the like) salts of dithiocarbamates), metal (e.g., Zn, Pb, Sb, Mo, and the like) salts of fatty acids, boron compounds, phosphate esters, phosphite esters, amine salts of phosphoric acid esters or thiophosphoric acid esters, reaction products of dicyclopentadiene and thiophosphoric acids and combinations thereof.

In embodiments, the anti-wear agent is or comprises a dihydrocarbyl dithiophosphate metal salt. The metal of the dihydrocarbyl dithiophosphate metal salt may be an alkali or alkaline earth metal, or aluminum, lead, tin, manganese, nickel, or copper. In some embodiments, the hydrocarbyl group of the dihydrocarbyl dithiophosphate metal salt has from about 3 to about 22 carbon atoms, from about 3 to about 18 carbon atoms, from about 3 to about 12 carbon atoms, or from about 3 to about 8 carbon atoms and may be an alkyl, substituted alkyl, aryl or substituted aryl. In embodiments, the alkyl group is linear and/or branched.

Useful anti-wear agents also include substituted or unsubstituted thiophosphoric acids, and salts thereof include metal-containing compounds such as metal dithiophosphate compounds selected from metal dialkyl-, diaryl- and/or alkylaryl-dithiophosphates.

In embodiments, the anti-wear compound can be a zinc dithiocarbamate complex, such as the zinc dithiocarbamates represented by the formula:

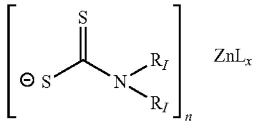

where each $R_I$ is independently a linear, cyclic, or branched, saturated or unsaturated, aliphatic hydrocarbon moiety having from 1 to about 10 carbon atoms, n is 0, 1, or 2, L is a ligand that saturates the coordination sphere of zinc, and x is 0, 1, 2, 3, or 4. In certain embodiments, the ligand, L, is selected from the group consisting of water, hydroxide, ammonia, amino, amido, alkylthiolate, halide, and combinations thereof.

Anti-wear additives useful herein also include boron-containing compounds, such as borate esters, borated fatty amines, borated epoxides, alkali metal (or mixed alkali metal or alkaline earth metal) borates and borated overbased metal salts.

The anti-wear additives are typically used in amounts of from about 0.01 mass % to about 5 mass %, from about 0.05 mass % to about 3 mass %, from about 0.4 mass % to about 1.2 mass %, from about 0.1 mass % to about 1 mass %, preferably from about 0.5 mass % to about 1.0 mass %, and more preferably from about 0.6 mass % to about 0.8 mass %, based on the total weight of the lubricating composition, although more or less can often be used advantageously.

Compositions according to the present disclosure may contain an additive having a different enumerated function that also has secondary effects as an anti-wear agent (for example, Component B zinc hydrocarbyl diphosphates compounds described above, may also have anti-wear effects). These additives are not included as anti-wear agents for purposes of determining the amount of anti-wear agents in a lubricating oil composition or concentrate herein.

In embodiments, the one or more zinc hydrocarbyl dithiophosphate compounds are zinc dihydrocarbyl dithiophosphate compounds (ZDDP's), such as zinc dialkyl dithiophosphate compounds. The hydrocarbyl groups of the zinc hydrocarbyl dithiophosphate compounds (such as the zinc dihydrocarbyl dithiophosphate compounds) may be the same or different hydrocarbyl groups. The alkyl groups of the zinc dialkyl dithiophosphate compounds may be the same or different alkyl groups.

Zinc dihydrocarbyl dithiophosphate compounds that may be used herein are generally represented by the formula $Zn[SP(S)(OR^1)(OR^2)]_2$ where $R^1$ and $R^2$ are, independently, $C_{1-30}$ hydrocarbyl groups, such as $C_{1-18}$ hydrocarbyl groups, such as $C_1$-$C_{18}$ alkyl groups and/or $C_1$-$C_{24}$ alkyl-aryl groups, and/or $C_{5-30}$ aryl groups, such as $C_2$-$C_{12}$ alkyl or aryl groups (such as $C_4$-$C_{12}$ alkyl groups) such as methyl, ethyl, propyl, butyl, pentyl, hexyl, heptyl, octyl, nonyl or decyl, phenyl, naphthyl, alkyl substituted phenyl, or isomers thereof. The hydrocarbyl groups (such as alkyl groups) may be straight chain (linear), cyclic and/or branched.

For ease of reference when a zinc hydrocarbyl dithiophosphate compounds (such as zinc dihydrocarbyl dithiophosphate compounds and zinc dialkyl dithiophosphate compounds) are referred to as being derived from one or more alcohols, it is understood that it is the hydrocarbyl groups (such as the alkyl groups) that are derived from the alcohols. The zinc dihydrocarbyl dithiophosphate compounds (such as zinc dialkyl dithiophosphate compounds) may be derived from primary alcohols, secondary alcohols or mixtures thereof. In embodiments, the hydrocarbyl group of the zinc dihydrocarbyl dithiophosphate is derived from one or more primary alcohols, one or more secondary alcohols and or a combination of primary and secondary alcohols. In particular, $C_1$-$C_{18}$ primary alcohols, mixtures of $C_1$-$C_{18}$ primary alcohols, $C_1$-$C_{18}$ secondary alcohols, mixtures of $C_1$-$C_{18}$ secondary alcohols, and or mixtures of $C_1$-$C_{18}$ primary and $C_1$-$C_{18}$ secondary alcohols can be used to prepare the zinc hydrocarbyl dithiophosphate compounds described herein.

Alcohols used to produce the hydrocarbyl groups of the zinc dihydrocarbyl dithiophosphate compounds include alcohols represented by the formula: $R^z$—OH, where $R^z$ is one or more of $C_{1-30}$ hydrocarbyl groups, such as $C_{1-18}$ hydrocarbyl groups, such as $C_1$-$C_{18}$ alkyl groups and/or $C_1$-$C_{24}$ alkyl-aryl groups, and/or $C_{5-30}$ aryl groups, such as $C_2$-$C_{12}$ alkyl or aryl groups (such as $C_4$-$C_{12}$ alkyl groups) such as methyl, ethyl, propyl, butyl, pentyl, hexyl, heptyl, octyl, nonyl or decyl, phenyl, naphthyl, alkyl substituted phenyl, or isomers thereof, where the hydrocarbyl groups (such as alkyl groups) may be straight chain (linear), cyclic and/or branched. In preferred embodiments, alcohols used to produce the zinc dihydrocarbyl dithiophosphate compounds include but are not limited to one or more of ethanol, 2-propanol, butanol, secondary butanol, pentanols, hexanols such as 4-methyl-2-pentanol, n-hexanol, n-octanol, 2-ethyl hexanol, alcohols of alkyl aryl groups (such as alkylated phenols), and the like.

Useful zinc dithiophosphates include zinc dithiophosphates such as those available from The Lubrizol Corporation under the trade designations "LZ™ 677A", "LZ™ 1095" and "LZ™ 1371", from Chevron Oronite under the trade designation "OLOA™ 262" and from Afton Chemical under the trade designation "HiTEC™ 7169".

The zinc dihydrocarbyl dithiophosphate compounds (such as zinc dihydrocarbyl dithiophosphate compounds, such as zinc dialkyl dithiophosphate compounds) are typically used in amounts of from about 0.01 mass % to about 5 mass %, from about 0.05 mass % to about 3 mass %, from about 0.4 mass % to about 1.2 mass %, from about 0.1 mass % to about 1.0 mass %, preferably from about 0.5 mass % to about 1.0 mass %, and more preferably from about 0.6 mass % to about 0.8 mass %, based on the total weight of the lubricating composition, although more or less can often be used advantageously.

In embodiments, the zinc dihydrocarbyl dithiophosphate compounds comprise secondary ZDDP's (i.e., derived from secondary alcohols), and are present in the lubricating oil composition at an amount of from 0.1 to 5.0 mass % of the total weight of the lubricating composition.

In embodiments, the zinc dihydrocarbyl dithiophosphate compounds comprise mixed primary and secondary ZDDP's (i.e., derived from a mixture of primary and secondary alcohols or are a mixture of a ZDDP derived from a primary alcohol and a ZDDP derived from a secondary alcohol), and are present in the lubricating oil composition at from about 0.1 to 5.0 mass % of the total weight of the lubricating composition.

Examples of zinc dialkyldithiophosphate compounds useful herein include one or more compounds represented by the following general formula:

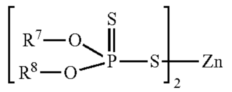

In the formula above, $R^7$ and $R^8$ each independently represent a primary or secondary alkyl group having 3 to 22 carbon atoms or an alkylaryl group substituted with an alkyl group having 3 to 18 carbon atoms. Examples of primary or secondary alkyl groups having 3 to 22 carbon atoms include a primary or secondary propyl group, a primary or secondary butyl group, a primary or secondary pentyl group, a primary or secondary hexyl group, a primary or secondary heptyl group, a primary or secondary octyl group, a primary or secondary nonyl group, a primary or secondary decyl group, a primary or secondary dodecyl group, a primary or secondary tetradecyl group, a primary or secondary hexadecyl group, a primary or secondary octadecyl group, a primary or secondary eicosyl group, and the like. Examples of the alkylaryl group substituted with an alkyl group having 3 to 18 carbon atoms include a propylphenyl group, a pentylphenyl group, an octylphenyl group, a nonylphenyl group, a dodecylphenyl group, and the like.

The lubricating composition according to the present disclosure may further comprise one or more additives such as detergents, friction modifiers, antioxidants, pour point depressants, anti-foam agents, viscosity modifiers, dispersants, corrosion inhibitors, anti-wear agents, extreme pressure additives, demulsifiers, seal compatibility agents, additive diluent base oils, etc. Specific examples of such additives are described in, for example, Kirk-Othmer Encyclopedia of Chemical Technology, third edition, volume 14, pp. 477-526, and several are discussed in further detail below.

L. Demulsifiers

Demulsifiers useful herein include trialkyl phosphates, and various polymers and copolymers of ethylene glycol, ethylene oxide, propylene oxide, and mixtures thereof. Additionally demulsifiers useful herein include those described in U.S. Pat. No. 10,829,712 (col 20, ln 34-40). Typically, a small amount of a demulsifying component may be used herein. A preferred demulsifying component is described in European Patent No. 330 522. It is obtained by reacting an alkylene oxide with an adduct obtained by reacting a bis-epoxide with a polyhydric alcohol. Such additives may be used in an amount of about 0.001 to 5 mass %, preferably about 0.01 to 2 mass %.

M. Seal Compatibility Agents

Other optional additives include seal compatibility agents such as organic phosphates, aromatic esters, aromatic hydrocarbons, esters (butylbenzyl phthalate, for example), and polybutenyl succinic anhydride. Such additives may be used in an amount of about 0.001 to 5 mass %, preferably about 0.01 to 2 mass %. In embodiments the seal compatibility agents are seal swell agents, such as PIBSA (polyisobutenyl succinic anhydride) or sulfolene derivatives such as ExxonMobil Necton-37™ (FN 1380) and ExxonMobil Mineral Seal Oil™ (FN 3200).

N. Extreme Pressure Agents

The lubricating oil composition of the present disclosure can contain one or more extreme pressure agents that can prevent sliding metal surfaces from seizing under conditions of extreme pressure. Any extreme pressure agent known by a person of ordinary skill in the art may be used in the lubricating oil composition. Generally, the extreme pressure agent is a compound that can combine chemically with a metal to form a surface film that prevents the welding of asperities in opposing metal surfaces under high loads. Non-limiting examples of suitable extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally substituted dihydrocarbyl polysulfides, thia-aldehydes, thia-ketones, epithio compounds, sulfur-containing acetal derivatives, co-sulfurized blends of terpene and acyclic olefins, and poly sulfide olefin products, amine salts of phosphoric acid esters or thiophosphoric acid esters, and combinations thereof. The amount of the extreme pressure agent may vary from about 0.01 mass % to about 5 mass %, from about 0.05 mass % to about 3 mass %, or from about 0.1 mass % to about 1 mass %, based on the total weight of the lubricating oil composition.

O. Non-Basestock Unsaturated Hydrocarbons

The lubricating oil composition of the present disclosure can contain one or more unsaturated hydrocarbons. These unsaturated hydrocarbons are distinct from any baseoils (lubricating oil basestocks of Group I, II, III, IV and/or V) and/or viscosity modifiers that may be present in the compositions and always have at least one (and typically only one, in the case of linear alpha-olefins, or LAOs) unsaturation per molecule. Without being bound by theory, it is believed that the unsaturation(s) may provide an antioxidation functionality and/or a sulfur-trapping functionality that may supplement and/or replace one or more antioxidant additives and/or one or more corrosion inhibitor additives, but unsaturated hydrocarbons (LAOs) will typically not provide the only antioxidant nor the only corrosion inhibition functionality in lubrication oil compositions. Non-limiting examples of unsaturated hydrocarbons can include one or more unsaturated $C_{12}$-$C_{60}$ hydrocarbons (such as $C_{12}$-$C_{48}$ hydrocarbons, $C_{12}$-$C_{36}$ hydrocarbons, $C_{12}$-$C_{30}$ hydrocarbons, or $C_{12}$-$C_{24}$ hydrocarbons). Other non-limiting examples of unsaturated hydrocarbons can include oligomers/polymers of polyisobutylenes that have retained (or been post-polymerization modified to exhibit) a (near-) terminal unsaturation, and/or blends thereof. When present, unsaturated hydrocarbons may be present from 0.01 to 5 mass % (in particular, 0.1 to 3 mass %, alternately 0.1 to 1.5 mass %), based on total weight of the lubricating oil composition.

In embodiments, the LOC comprises one or more alpha-olefins, such as linear alpha-olefins (LAO), having 8 to 36 carbon atoms, such as 8 to 24 carbon atoms, more preferably 10 to 20 carbon atoms, more preferably 12 to 20 carbon atoms, more preferably 14 to 18 carbon atoms. In embodiments, the LOC comprises mixtures of linear alpha-olefins, having 8 to 24 carbon atoms, more preferably 10 to 20 carbon atoms, more preferably 12 to 20 carbon atoms, more preferably 14 to 18 carbon atoms. In embodiments, the LOC comprises mixtures of linear alpha-olefins, having 14 or more carbon atoms. In embodiments, the LOC may comprise from 0.001 to 15 mass %, (in particular 0.15 to 10 mass %, alternately 0.20 mass % to 5 mass %, alternately 0.25 to 2 mass %) based upon the weight of the lubricating composition, of one or more $C_8$ to $C_{36}$ alpha olefins. In embodiments, the LOC may comprise from 0.001 to 15 mass %, (in particular 0.15 to 10 mass %, alternately 0.20 mass % to 5 mass %, alternately 0.25 to 2 mass %) based upon the weight of the lubricating composition, of one, two, three, four, five or more $C_8$ to $C_{36}$ alpha olefins, such linear alpha olefins having 8 to 24 carbon atoms, more preferably 10 to 20 carbon atoms, more preferably 12 to 20 carbon atoms, more preferably 14 to 18 carbon atoms.

When lubricating oil compositions contain one or more of the additives discussed above, the additive(s) are typically blended into the composition in an amount sufficient for it to perform its intended function. Typical amounts of such additives useful in the present disclosure, especially for use in crankcase lubricants, are shown in the Table below.

It is noted that many of the additives are shipped from the additive manufacturer as a concentrate, containing one or more additives together, with a certain amount of base oil or other diluents. Accordingly, the weight amounts in the table below, as well as other amounts mentioned herein, are directed to the amount of active ingredient (that is the non-diluent portion of the ingredient). The weight percent (mass %) indicated below is based on the total weight of the lubricating oil composition.

Typical Amounts of Lubricating Oil Components

| Additive Formulations | A (mass % a.i.) | B (mass % a.i.) | C (mass % a.i.) |
|---|---|---|---|
| Dispersant | 0.1-20 | 0.5-10 | 1-6 |
| Detergents | 0.1-20 | 0.2-10 | 0.3-9 |
| Corrosion Inhibitor Anti-rust/ extreme pressure agents | 0-7 | 0.05-5 | 0.1-1.5 |
| Overbased Ca detergent | 0.1-10 | 0.2-5 | 0.3-4.5 |
| Overbased Mg detergent | 0.1-10 | 0.2-5 | 0.4-4.5 |
| High MW PIBSA-PAM | 0-20 | 0-8 | 0 to 4 |
| Low MW PIBSA-PAM | 0.1-20 | 0.2-10 | 0.5-6 |
| Antioxidant | 0.01-10 | 0.1-5 | 0.1-4 |
| Pour Point Depressant | 0-8 | 0-5 | 0.01-1.5 |
| Anti-foaming Agent | 0-5 | 0-2 | 0.001-0.15 |
| Functionalized Polymer | 0.01-10 | 0.1-5 | 0.1-2 |
| Friction Modifier | 0-2 | 0.1-1 | 0.2-0.5 |
| Antiwear Agent | 0.01-10 | 0.1-5 | 0.1-3 |
| Viscosity Modifier | 0-15 | 00.1-10 | 00.25-3 |
| Seal Swell Agents | 0-10 | 0-5 | 0-2 |
| Extreme Pressure Agents | 0-10 | 0-5 | 0-3 |

-continued

Typical Amounts of Lubricating Oil Components

| Additive Formulations | A (mass % a.i.) | B (mass % a.i.) | C (mass % a.i.) |
|---|---|---|---|
| Unsaturated Hydrocarbons (LAOs) | 0-10 | 0-5 | 0-3 |
| Basestock | Balance (such as 50 to 95%) | Balance | Balance |

The foregoing additives are typically commercially available materials. These additives may be added independently, but are usually pre-combined in packages, which can be obtained from suppliers of lubricant oil additives. Additive packages with a variety of ingredients, proportions and characteristics are available and selection of the appropriate package will take the use of the ultimate composition into account.

Fuel Compositions

This disclosure also relates to a method of lubricating a passenger or commercial vehicle hydrogen fueled internal combustion engine during operation of the engine comprising: (i) providing to a crankcase of the vehicle hydrogen internal combustion engine a vehicle crankcase lubricating oil composition described herein; (ii) providing a hydrogen containing fuel in the vehicle hydrogen internal combustion engine; and (iii) combusting the fuel in the vehicle hydrogen internal combustion engine, such as a spark-ignited or compression-ignited two- or four-stroke reciprocating engines.

This disclosure also relates to a fuel composition comprising the lubricating oil compositions described herein and a hydrogen containing fuel, wherein the hydrogen fuel may include hydrogen selected from green hydrogen, blue hydrogen, grey hydrogen, brown hydrogen, or combinations thereof. The hydrogen containing fuel may optionally include other non-hydrogen containing fuels, including, but not limited to, natural gas, propane, mogas, renewable fuel, or combinations thereof. The renewable fuel component may be produced from vegetable oil (such as palm oil, rapeseed oil, soybean oil, jatropha oil), microbial oil (such as algae oil), animal fats (such as cooking oil, animal fat, and/or fish fat) and/or biogas. Renewable fuel refers to biofuel produced from biological resources formed through contemporary biological processes. In an embodiment, the renewable fuel component is produced by means of a hydrotreatment process. Hydrotreatment involves various reactions where molecular hydrogen reacts with other components, or the components undergo molecular conversions in the presence of molecular hydrogen and a solid catalyst. The reactions include, but are not limited to, hydrogenation, hydrodeoxygenation, hydrodesulfurization, hydrodenitrification, hydrodemetallization, hydrocracking, and isomerization. The renewable fuel component may have different distillation ranges, which provide the desired properties to the component, depending on the intended use.

Uses

The lubricating compositions disclosed herein may be used to lubricate mechanical engine components, particularly in hydrogen fueled internal combustion engines, e.g., spark-ignited or compression-ignited, two- or four-stroke reciprocating hydrogen fueled engines, by adding the lubricant thereto. Typically, they are crankcase lubricants, such as passenger car motor oils or heavy-duty engine lubricants.

In particular, the lubricating compositions disclosed herein are suitably used in the lubrication of the crankcase of a compression-ignited, hydrogen fueled internal combustion engine, such as a heavy-duty engine.

In particular, the lubricating compositions disclosed herein are suitably used in the lubrication of the crankcase of a spark-ignited turbo charged hydrogen fueled internal combustion engine.

In embodiments, the lubricating oils disclosed herein are used in spark-assisted high compression hydrogen fueled internal combustion engines.

In embodiments, the lubricating compositions disclosed herein are suitably used in the lubrication of the crankcase of an hydrogen fueled engine for a heavy-duty vehicle (i.e., a heavy-duty vehicle having a gross vehicle weight rating of 10,000 pounds or more.)

In particular, lubricating oil formulations of this disclosure are particularly useful in compression-ignited hydrogen fueled internal combustion engines, i.e., heavy-duty engines, employing low viscosity oils, such as API FA-4 and future oil categories, in which wear protection of the valve train becomes challenging.

Also, the lubricating compositions described herein may be useful as lubricants for natural gas engines [e.g., natural gas is the fuel the engines run on, commonly called GEOs or (natural) gas engine oils].

The lubricating compositions described herein may be used to lubricate mechanical engine components, particularly in hydrogen fueled internal combustion engines, e.g., spark-ignited or compression-ignited two- or four-stroke reciprocating engines, by adding the lubricant thereto.

The lubricating compositions described herein are particularly suitable for hydrogen fueled internal combustion engines that are prone to piston-liner wear from a long duration of operation, hence the invention might extend engine lifetime.

Also, the lubricating compositions described herein are useful as lubricants for ammonia fueled engines and the like [e.g., ammonia fuel (or hydrogen combined with ammonia fuel) or ammonia combined with hydrocarbon fuel, such as gasoline or diesel fuel) is the fuel the combusted in the internal combustion engine].

This disclosure further relates to the following additional embodiments:

Additional Embodiments/Clauses

1. A method of reducing abnormal combustion events in a hydrogen fueled internal combustion engine (HICE) during operation of the engine comprising: a) providing to the hydrogen fueled internal combustion engine a lubricating oil composition comprising or resulting from the admixing of: i) a base oil having a viscosity KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 900 ppm by weight of total silicon to the composition; and iv) the lubricating oil composition having a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; and b) providing a fuel comprising hydrogen to the hydrogen fueled internal combustion engine; and c) combusting the fuel in the hydrogen fueled internal combustion engine.

2. The method of clause 1, further comprising: d) measuring a number of abnormal pre-ignition events during combustion (1000 rpm, 12 bar BMEP and 1.85 air:fuel ratio (AFR)) and wherein the number of pre-ignition events per 1,000 engine cycles is less than 1.

3. The method of clauses 1-2, further comprising: d) measuring a number of abnormal pre-ignition events during combustion (1200 rpm, 18 bar BMEP and 2.05 air:fuel ratio (AFR)) and wherein the number of pre-ignition events per 1,000 engine cycles is less than 2.

4. The method of clauses 1-3, wherein a frequency of abnormal pre-ignition events in the hydrogen fueled internal combustion engines (HICE) operating at 100% load during combustion is decreased by at least 20% compared to a comparable lubricating oil composition not including the at least one silicon containing compound.

5. The method of clauses 1-4, wherein the at least one silicon containing compound delivers between 75 to 600 ppm by weight of total silicon to the lubricating oil composition.

6. The method of clauses 1-5, wherein the at least one silicon containing compound is selected from the group consisting of siloxane compounds, organo modified siloxane compounds, small molecule silicon compounds, and silazane compounds.

7. The method of clause 6, wherein the at least one silicon containing compound is a siloxane compound according to Formula 1, Formula 1

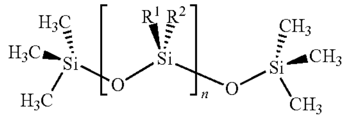

wherein n is from 50 to 450, and wherein $R^1$ and $R^2$ are independently $C_1$-$C_{10}$ alkyl.

8. The method of clause 6, wherein the silicon-containing compound is an organo modified siloxane compound according to Formula 1, Formula 1

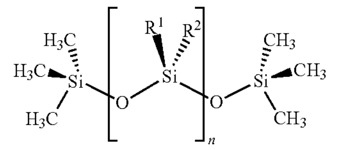

wherein, n is from 50 to 450, and wherein $R^1$ and $R^2$ are independently a polyether group, a $C_{11}$-$C_{100}$ alkyl group, or a $C_6$-$C_{14}$ aryl group.

9. The method of clause 6, wherein the silicon-containing compound is a small molecule silicon compound having a molecular weight of no more than 600 g/mol.

10. The method of clause 6, wherein the silicon-containing compound is a small molecule silicon compound according to Formula 2, Formula 2

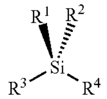

wherein, each of $R^1$, $R^2$, $R^3$ and $R^4$ is, independently, a $C_1$-$C_{10}$ hydrocarbyl group or a $C_1$-$C_{10}$ heterocarbyl group.

11. The method of clause 10 comprising one or more silicon-containing compounds selected from the group consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$).

12. The method of clause 6, wherein the silicon-containing compound is a silazane compound according to Formula 3, Formula 3

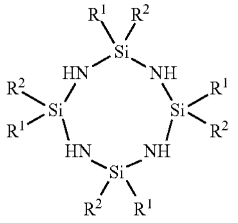

wherein, each of $R^1$ and $R^2$ is, independently, a $C_1$-$C_3$ hydrocarbyl group.

13. The method of clauses 1-12, wherein the at least one overbased metal containing detergent is a sulfonate, a salicylate, a phenate or combinations thereof.

14. The method of clauses 1-13, wherein the metal of the at least one overbased metal detergent is selected from the group consisting of sodium, potassium, lithium, calcium, and magnesium and combinations thereof.

15. The method of clauses 1-14, wherein the base oil comprises a Group I base oil, a Group II base oil, or combinations thereof and is included at greater than 80 wt. % of the composition.

16. The method of clause 15, wherein the base oil is substantially free of Group IV base oil.

17. The method of clause 16, wherein the base oil is substantially free of Group III base oil.

18. The method of clauses 1-17, wherein the lubricating oil composition further comprises a dispersant, dispersant viscosity modifier or combinations thereof.

19. The method of clause 18, wherein the dispersant or dispersant viscosity modifier comprises an amide, imide, and/or ester functionalized partially or fully saturated polymer comprising $C_{4-5}$ olefins having: i) an Mw/Mn of less than 2, ii) a Functionality Distribution (Fd) value of 3.5 or less, and iii) an Mn of 10,000 g/mol or more of the polymer prior to functionalization.

20. The method of clause 18, wherein the dispersant comprises one or more, optionally borated, higher molecular weight polyisobutylene succinimide (PIBSA-PAM) dispersant (Mn 1600 g/mol or more), one or more, optionally borated, lower molecular weight polyisobutylene succinimide (PIBSA-PAM) dispersant (Mn less than 1600 g/mol), or combinations thereof, and wherein the treat level of the dispersant is from 1.0 to 15.0 wt. % of the lubricating oil composition.

21. The method of clause 20, wherein the higher molecular weight PIBSA-PAM is borated, the lower molecular weight PIBSA-PAM is borated or a combination thereof, and is/are included at a treat level to deliver from 20 ppm to 700 ppm by weight of boron to the lubricating oil composition.

22. The method of clauses 1-21, wherein the lubricating oil composition further comprises a corrosion inhibitor selected from the group consisting of a substituted thiadiazole, a substituted benzotriazole, a substituted triazole, a trisubstituted borate, an ethoxylated lauryl alcohol, a nonylphenol ethoxylate, a $C_6$ to $C_{20}$ ethoxylated linear alcohol, or a combination thereof, and is/are includes at a treat level of 0.001 wt. % to 5.0 wt. % of the lubricating oil composition.

23. The method of clauses 1-22, wherein the lubricating oil composition further comprises one or more zinc dialkyl dithiophosphate (ZDDP) compounds; and wherein the treat level of the one or more ZDDP compounds is from about 0.4 wt. % to about 1.5 wt. % of the lubricating oil composition.

24. The method of clause 23, wherein the hydrocarbyl group of the zinc hydrocarbyl dithiophosphate is derived from one or more primary alcohols, one or more secondary alcohols or a combination of primary and secondary alcohols.

25. The method of clauses 1-24, wherein the lubricating oil composition further comprises one or more of the following components: one or more functional polymers, one or more friction modifiers; one or more antioxidants; one or more pour point depressants; one or more anti-foaming agents; one or more viscosity modifiers; one or more other dispersants; one or more corrosion inhibitors; one or more antirust agents; one or more seal swell agents; and/or one or more anti-wear agents.

26. The method of clauses 1-25, wherein the hydrogen comprises green hydrogen, blue hydrogen, grey hydrogen, brown hydrogen, or combinations thereof.

27. The method of clauses 1-26, wherein the fuel further includes natural gas, propane, mogas, renewable fuel, or combinations thereof.

28. The method of clauses 1-27, wherein the fuel supplied to the engine comprises at least 25 mass % hydrogen, based upon the mass of the fuel.

29. The method of clauses 1-28, wherein the fuel supplied to the engine comprises at least 50 mass % hydrogen, based upon the mass of the fuel.

30. The method of clauses 1-29, wherein the fuel supplied to the engine comprises substantially 100 mass % hydrogen, based upon the mass of the fuel.

31. The method of clauses 1-30, wherein the fuel comprising hydrogen and the lubricating oil composition are combined in a combustion chamber of the hydrogen fueled internal combustion engine to form a fuel composition.

32. The method of clauses 1-31, wherein the fuel comprising hydrogen and the lubricating oil composition are combined prior to injection into a combustion chamber of the hydrogen fueled internal combustion engine (HICE) to form a fuel composition.

33. The method of clauses 1-32, wherein the hydrogen fueled internal combustion engine (HICE) is spark ignited or compression ignited.

34. The method of clauses 1-33, wherein the hydrogen fueled internal combustion engine is a heavy duty or light duty internal combustion engine.

35. The method of clauses 1-34, wherein the hydrogen fueled internal combustion engine is a stationary internal combustion engine.

36. The method of clauses 1-35, further including providing a turbocharger or a supercharger prior to the hydrogen fueled internal combustion engine.

37. The method of clauses 1-36, wherein the hydrogen fueled internal combustion engine (HICE) operates at a BMEP ranging from 12 bar to 18 bar and at an air:fuel ratio (AFR) from 1:1 to 3:1.

38. The method of clauses 1-37, wherein the lubricating oil composition is used as a passenger vehicle lubricant (PVL), a commercial vehicle lubricant (CVL), or a marine engine lubricant.

39. A lubricating oil composition for hydrogen fueled internal combustion engines (HICE) comprising or resulting from the admixing of: i) a base oil having a KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 9000 ppm by weight of total silicon to the composition; and wherein the lubricating oil composition has a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60.

40. The composition of clause 39, wherein the composition decreases the number of abnormal pre-ignition events in the hydrogen fueled internal combustion engines (HICE) during combustion as measured at 1000 rpm, 12 bar BMEP and 1.85 air:fuel ratio (AFR) to less than 1 event per 1,000 engine cycles.

41. The composition of clauses 39-40, wherein the composition decreases the number of abnormal pre-ignition events in the hydrogen fueled internal combustion engines (HICE) during combustion as measured at 1200 rpm, 18 bar BMEP and 2.05 air:fuel ratio (AFR) to less than 2 events per 1,000 engine cycles.

42. The composition of clauses 39-41, wherein the composition decreases the number of abnormal pre-ignition events in the hydrogen fueled internal combustion engines (HICE) operating at 100% load during combustion by at least 20% compared to a comparable lubricating oil composition not including the at least one silicon containing compound.

43. The composition of clauses 39-42, wherein the at least one silicon containing compound delivers between 75 to 600 ppm by weight of total silicon to the lubricating oil composition.

44. The composition of clauses 39-43, wherein the at least one silicon containing compound is selected from the group consisting of siloxane compounds, organo modified siloxane compounds, small molecule silicon compounds, and silazane compounds.

45. The composition of clause 44, wherein the at least one silicon containing compound is a siloxane compound according to Formula 1, Formula 1

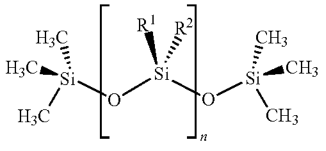

wherein n is from 50 to 450, and wherein $R^1$ and $R^2$ are independently $C_1$-$C_{10}$ alkyl.

46. The composition of clause 44, wherein the silicon-containing compound is an organo modified siloxane compound according to Formula 1, Formula 1

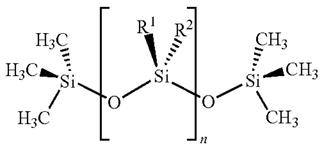

wherein, n is from 50 to 450, and wherein $R^1$ and $R^2$ are independently a polyether group, a $C_{11}$-$C_{100}$ alkyl group, or a $C_6$-$C_{14}$ aryl group.

47. The composition of clause 44, wherein the silicon-containing compound is a small molecule silicon compound having a molecular weight of no more than 600 g/mol.

48. The composition of clause 44, wherein the silicon-containing compound is a small molecule silicon compound according to Formula 2, Formula 2

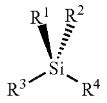

wherein, each of $R^1$, $R^2$, $R^3$ and $R^4$ is, independently, a $C_1$-$C_{10}$ hydrocarbyl group or a $C_1$-$C_{10}$ heterocarbyl group.

49. The composition of clause 48 comprising one or more silicon-containing compounds selected from the group consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$).

50. The composition of clause 44, wherein the silicon-containing compound is a silazane compound according to Formula 3, Formula 3

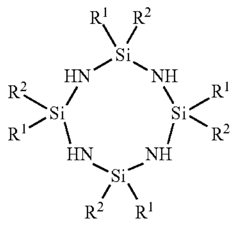

wherein, each of $R^1$ and $R^2$ is, independently, a $C_1$-$C_3$ hydrocarbyl group.

51. The composition of clauses 39-50, wherein the at least one overbased metal containing detergent is a sulfonate, a salicylate, a phenate or combinations thereof.

52. The composition of clauses 39-51, wherein the metal of the at least one overbased metal detergent is selected from the group consisting of sodium, potassium, lithium, calcium, and magnesium and combinations thereof.

53. The composition of clauses 39-52, wherein the base oil comprises a Group I base oil, a Group II base oil, or combinations thereof and is included at greater than 80 wt. % of the composition.

54. The composition of clause 53, wherein the base oil is substantially free of Group IV base oil.

55. The composition of clause 54, wherein the base oil is substantially free of Group III base oil.

56. The composition of clauses 39-55, wherein the lubricating oil composition further comprises a dispersant, dispersant viscosity modifier or combinations thereof.

57. The composition of clause 56, wherein the dispersant or dispersant viscosity modifier comprises an amide, imide, and/or ester functionalized partially or fully saturated polymer comprising $C_{4-5}$ olefins having: i) an Mw/Mn of less than 2, ii) a Functionality Distribution (Fd) value of 3.5 or less, and iii) an Mn of 10,000 g/mol or more of the polymer prior to functionalization.

58. The composition of clause 56, wherein the dispersant comprises one or more, optionally borated, higher molecular weight polyisobutylene succinimide (PIBSA-PAM) dispersant (Mn 1600 g/mol or more), one or more, optionally borated, lower molecular weight polyisobutylene succinimide (PIBSA-PAM) dispersant (Mn less than 1600 g/mol), or combinations thereof, and wherein the treat level of the dispersant is from 1.0 to 15.0 wt. % of the lubricating oil composition.

59. The composition of clause 58, wherein the higher molecular weight PIBSA-PAM is borated, the lower molecular weight PIBSA-PAM is borated or a combination thereof, and is/are included at a treat level to deliver from 20 ppm to 700 ppm by weight of boron to the lubricating oil composition.

60. The composition of clauses 39-59, wherein the lubricating oil composition further comprises a corrosion inhibitor selected from the group consisting of a substituted thiadiazole, a substituted benzotriazole, a substituted triazole, a trisubstituted borate, an ethoxylated lauryl alcohol, a nonylphenol ethoxylate, a $C_6$ to $C_{20}$ ethoxylated linear alcohol, or a combination thereof, and is/are includes at a treat level of 0.001 wt. % to 5.0 wt. % of the lubricating oil composition.

61. The composition of clauses 39-60, wherein the lubricating oil composition further comprises one or more zinc dialkyl dithiophosphate (ZDDP) compounds; and wherein the treat level of the one or more ZDDP compounds is from about 0.4 wt. % to about 1.5 wt. % of the lubricating oil composition.

62. The composition of clause 61, wherein the hydrocarbyl group of the zinc hydrocarbyl dithiophosphate is derived from one or more primary alcohols, one or more secondary alcohols or a combination of primary and secondary alcohols.

63. The composition of clauses 39-62, wherein the lubricating oil composition further comprises one or more of the following components: one or more functional polymers, one or more other friction modifiers; one or more antioxidants; one or more pour point depressants; one or more anti-foaming agents; one or more viscosity modifiers; one or more other dispersants; one or more corrosion inhibitors; one or more antirust agents; one or more seal swell agents; and/or one or more anti-wear agents.

64. The composition of clauses 39-63, wherein the lubricating oil composition is used as a passenger vehicle lubricant (PVL), a commercial vehicle lubricant (CVL), or a marine engine oil.

65. The composition of clauses 39-64, wherein the hydrogen fueled internal combustion engine is a heavy duty internal combustion engine, a light duty internal combustion engine or a stationary internal combustion engine.

66. A method of lubricating a hydrogen fueled internal combustion engine comprising supplying to the engine a lubricating oil composition according to any one of clauses 39 to 65.

67. A concentrate comprising or resulting from the admixing of: from 5 wt. % to less than or equal to 30 wt. % of one or more base oils having a KV100 of less than or equal to 12 cSt and comprising a Group I base oil, a Group II base oil, a Group III base oil, a Group IV base oil, or combinations thereof; and from 1 to 95 wt. %, based upon the weight of the concentrate, of at least one overbased metal containing detergent with a Total Base Number (KOH/g) greater than or equal to 9 and less than or equal to 500; and from 0.1 to 94 wt. %, based upon the weight of the concentrate, of at least one silicon containing compound.

68. The concentrate of clause 67, further comprising combining the concentrate with a base oil to form a lubricating oil composition comprising: i) a base oil having a KV100 of less than or equal to 12 cSt and included at greater than 50 wt. % of the composition and comprising a Group I base oil, a Group II base oil, a Group III base oil, a Group IV base oil, or combinations thereof; ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition; iii) at least one silicon containing compound included at a treat level to deliver between 50 to 900 ppm by weight of total silicon to the composition; and wherein the lubricating oil composition has a total sulfated ash of less than or equal to 2.0 wt. %, a total phosphorous level of less than or equal to 0.120 wt. %, and a SAE viscosity grade of 25W-X, 20W-X, 15W-X, 10W-X, 5W-X or 0W-X, where X represents any one of 8, 12, 16, 20, 30, 40, 50 or 60; and wherein the composition decreases the number of abnormal pre-ignition events in the hydrogen fueled internal combustion engines (HICE) during combustion as measured at 1000 rpm, 12 bar BMEP and 1.85 air:fuel ratio (AFR) to less than 1 event per 1,000 engine cycles; and wherein the composition decreases the number of abnormal pre-ignition events in the hydrogen fueled internal combustion engines (HICE) during combustion as measured at 1200 rpm, 18 bar BMEP and 2.05 air:fuel ratio (AFR) to less than 2 events per 1,000 engine cycles.

69. The concentrate of clauses 67-68, wherein the composition decreases the number of abnormal pre-ignition events in the hydrogen fueled internal combustion engines (HICE) operating at 100% load during combustion by at least 20% compared to a comparable lubricating oil composition not including the at least one silicon containing compound.

The following non-limiting examples are provided to illustrate the disclosure.

EXAMPLES

Testing Procedures

Sulfated ash ("SASH") content is measured by ASTM D874.

Phosphorus, Calcium, Zinc, and Silicon content are measured by ASTM D5185.

Pre-Ignition testing of lubricating oil compositions for Abnormal Combustion Events was measured using the following method for Example 1 below. Abnormal combustion events (pre-ignition) were determined as follows: data regarding pre-ignition occurrences was generated using a turbocharged, port fueled Daimler OM936 7.7 liter, 6 cylinder engine, modified to run on hydrogen fuel with a reduction in compression ratio to 10-12:1, upscaling of fuel injectors and turbocharger system, adaption of the blowby system to prevent high concentrations of hydrogen in the crankcase, and adaption of a CNG-based engine control system modified for lean burn operation. The engine was operated under conditions between 12 to 18 bar brake mean effective pressure, between engine speeds of about 1000 to 1200 rpm and at air to fuel ratio (AFR) between 1.85 and 2.05. For each cycle (a cycle being 2 piston cycles (up/down, up/down), data was collected on peak pressure and mass faction burned over the duration of each cycle. Post processing of the data included calculation of combustion metrics, verification of operating parameters being within target limits, and detection of pre-ignition events (statistical procedure outlined below). From the above data, outliers, which are potential occurrences of pre-ignition were collected. For each pre-ignition cycle, data recorded included peak pressure (PP), MFB03.5 (crank angle at 3.5% mass fraction burned), cycle number and engine cylinder. A cycle was identified as having a pre-ignition event if both of the crank angle corresponding to MFB03.5 of the fuel and the cylinder PP are outliers. Outliers were determined relative to the distribution of a particular cylinder and test segment in which it occurs. Determination of "outliers" was an iterative process involving calculation of the mean and standard deviation of PP and MFB03.5 for each segment and cylinder; and cycles with parameters that exceed n standard deviations from the mean. The number of standard deviations n, used as a limit for determining outliers, is a function of the number of cycles in the test and was calculated using the Grubbs' test for outliers. Outliers were identified in the severe tail of each distribution. That is, if n is the number of standard deviations obtained from Grubbs' test for outliers, an outlier for PP is identified as one exceeding the mean plus n standard deviations of peak pressure. Likewise, an outlier for MFB03.5 was identified as one being lower than the mean less n standard deviations of MFB03.5. Data was further examined to ensure that the outliers indicated an occurrence of pre-ignition, rather than some other abnormal combustion event or an electrical sensor error.

Pre-Ignition testing of lubricating oil compositions for Abnormal Combustion Events was measured using the following method for Examples 2 and 3. Abnormal combustion events (pre-ignition) were determined as follows: Pre-ignition was measured using a turbocharged, direct injection Mercedes M274, 2.0 litre, 4-cylinder engine, modified to run on hydrogen fuel with HDEV4 series gasoline injectors and modified ignition coil. A 3 mm diameter side mounted dosing lance was integrated into the intake port of cylinder 4. Test oils were metered into the intake port through means of a peristaltic pump. The engine was operated at speeds of around 1550 rpm with 14 bar brake mean effective pressure, air to fuel ratio (AFR) of 1.7 and air intake temperature of 75° C. The test procedure consists of a 10-minute pre-conditioning phase in the absence of oil dosing, followed by a 10-minute period in which oil is dosed at a rate of approximately 0.3 g/kWh and a final 10-minute post-conditioning phase without oil dosing. Data collected over the duration of this test was analysed to determine the frequency of pre-ignition occurrences. Data analysis of the frequency of pre-ignition occurrences was done as follows: For each cycle (a cycle being 2 piston cycles (up/down, up/down), data was collected on peak pressure and mass faction burned over the duration of each cycle. Post processing of the data included calculation of combustion metrics, verification of operating parameters being within target limits, and detection of pre-ignition events (statistical procedure outlined below). From the above data, outliers, which are potential occurrences of pre-ignition were collected. Data from cylinder 4 was analysed to identify pre-ignition events resulting from the test oil. For each pre-ignition cycle, data recorded included peak pressure (PP), MFB05 (crank angle at 5% mass fraction burned), cycle number and engine cylinder. A cycle was identified as having a pre-ignition event if both the crank angle corresponding to MFB05 of the fuel and the cylinder PP are outliers. Outliers were determined relative to the distribution of a particular cylinder during the pre-conditioning phase. An outlier for PP is identified as one exceeding the mean plus three standard deviations of peak pressure. Likewise, an outlier for MFB05 was identified as one being lower than the mean less three standard deviations of MFB05. Data was further examined to ensure that the outliers indicated an occurrence of pre-ignition, rather than some other abnormal combustion event or an electrical sensor error.

As used herein, Brake Mean Effective Pressure (BMEP) is the mean effective pressure calculated from measured brake torque. The word "brake" denotes the actual torque or power available at the engine flywheel, as measured on a dynamometer. Thus. BMEP is a measure of the useful power output of the engine. BMEP is defined as the work accomplished during an engine cycle, divided by the engine swept volume; the engine torque normalized by engine displacement and can be calculated using the following formula: BMEP=(2πTn)/(Vd), where T is torque (Nm), n is the number of revolutions per cycle, Vd is displacement ($m^3$). For a 4 stroke engine n is 2, for a 2 stroke engine n is 1. Its unit are bars.

As used herein, Pressure Differential Scanning Calorimetry (PDSC) is a test used to measure the impact in terms of either a credit, a debit or neutral for a lubricating oil composition on pre-ignition propensity of a hydrogen containing fuel. The test method used for measuring the oxidation onset time at 200 deg. C. in minutes of the lubricating oil composition is ASTM Test Method D6186. The longer the PDSC oxidation onset time of the lubricating oil composition correlates generally with improved pre-ignition performance (credit) when used in a hydrogen fueled internal combustion engine. See in particular, *STLE* 2019*, Fuel Economy Low Viscosity Engine Oil Compatible with Low Speed Pre-Ignition Performance* in support of the proposition that higher PDSC oxidation time correlates with lower propensity for abnormal pre-ignition events.

Example 1

Comparative 1 and Inventive 1 oils were prepared to form the lubricating oil compositions included in Table 1 below and were evaluated for pre-ignition testing according to the procedure described above. Pre-ignition testing was performed at: 1) condition 1—75,000 cycles at 1000 rpm, 1.85 AFR and 12 bar BMEP; or 2) condition 2—40,000 cycles at 1200 rpm, 2.05 AFR and 18 bar BMEP. Data collected over the duration of this test was analyzed to determine the frequency of pre-ignition occurrences. The data is reported in Table 1 below.

TABLE 1

| Component or Property | Lubricant Oil with Low Level of Si Comparative 1 | Lubricant Oil with High Level of Si Inventive 1 |
|---|---|---|
| Polyoctylmethylsiloxane (POMS) | | 0.301 |
| Group II basestock 4 cSt | 35.000 | 35.000 |
| Group II basestock 6 cSt | 45.100 | 45.100 |
| Remainder of Additives (wt. %) | 19.9 | 19.6 |
| Oil Total (wt. %) | 100.000 | 100.000 |
| ppm Si | 8 | 498 |
| Basestock Kv100 cSt | 10.17 | 9.83 |
| Lubricating oil Kv100 cSt | 5.37 | 5.37 |
| Pre-ignition @ 1000 rpm, 12 bar BMEP, 1.85 AFR (PI events per 1000 cycles) | 1.07 | 0.62 |
| Pre-ignition @ 1200 rpm, 2.05 AFR and 16 bar BMEP (PI events per 1000 cycles) | 1.08 | 0.51 |
| Pre-ignition @ 1200 rpm, 2.05 AFR and 17 bar BMEP (PI events per 1000 cycles) | 0.88 | 0.78 |
| Pre-ignition @ 1200 rpm, 2.05 AFR and 18 bar BMEP (PI events per 1000 cycles) | 2.11 | 1.24 |

* Comparative 1 and Inventive 1 oils contained the same components in the same amounts of PIBSA-PAM (borated and nonborated) dispersant, dispersant ester, calcium sulfonate/phenate detergent, magnesium sulfonate/salicylate detergents, diphenyl amine antioxidant, hindered phenol antioxidant, PDMS anti-foamant, ZDDP, diluent, moly trimer, OCP viscosity modifier.

FIG. 1 is a graph for the inventive and comparative lubricating oil compositions of Example 1 of the number of pre-ignition events per 1000 cycles (measured at 1000 rpm, 12 bar BMEP and 1.85 air:fuel ratio (AFR)) as a function of lubricating oil composition silicon content in a hydrogen fueled internal combustion engines (HICE) showing a clear credit for a silicon content in the lubricating oil of 498 ppm of the total composition compared to comparative lubricating oil example with a silicon content of only 8 ppm. FIG. 2 is a graph for the inventive and comparative lubricating oil compositions of Example 1 of the number of pre-ignition events per 1000 cycles (measured at 1200 rpm, 18 bar BMEP and 2.05 air:fuel ratio (AFR)) as a function of lubricating oil composition silicon content in the lubricating oil of 498 ppm of the total composition compared to a comparative lubricating oil example with a silicon content of only 8 ppm again showing a clear credit for higher silicon content in the lubricating oil in lowering the number of pre-ignition events. As can be seen in the pre-ignition test results in Table 1 above and FIGS. 1 and 2, the inventive lubricating oil compositions including the silicon compound at a high loading (498 ppm) displayed a surprising and unexpected reduction in the number of pre-ignition events per 1000 cycles compared to the comparative lubricating oil composition tested (low level of silicon (8 ppm) in the composition). The effect of increasing silicon content in the lubricating oil composition in decreasing the propensity of abnormal combustion events in hydrogen fueled internal combustion engines (HICE) is surprising and unexpected.

Example 2

Two comparative oils 1 and 2 and two inventive oils 1 and 2 were prepared to form the lubricating oil compositions included in Table 2 below and were evaluated for pre-ignition testing according to the procedure described above. All four of the oils were of equivalent composition differing only in the amount of polyoctylmethylsiloxane (organo modified siloxane additive) weight % included in the oil. All four oils also included low levels (0.003 wt. %) of PDMS anti-foamant that contributed less than 15 ppm of silicon to the lubricating oil. Inventive oils 1 and 2 included polyoctylmethylsiloxane at a treat level to provide 100 ppm and 501 ppm respectively of silicon to the lubricating oil. Comparative oil 1 did not include any polyoctylmethylsiloxane (12 ppm of silicon in the oil from PDMS antifoamant) while comparative oil 2 included a high treat level of polyoctylmethylsiloxane to deliver 1000 ppm of silicon to the lubricating oil.

Pre-ignition testing was performed on the inventive and comparative lubricating oils at the following conditions: 1550 rpm, 14 bar BMEP, 1.70 air:fuel ratio (AFR), air intake temperature of 75° C. Data collected over the duration of this test was analyzed using the data analysis procedure described above to determine the frequency of pre-ignition occurrences. The data is reported in Table 2 below for the comparative and inventive lubricating oils.

Based on the data in Table 2 below, it was surprisingly and unexpectedly discovered that the two inventive lubricating including 100 ppm and 501 ppm of silicon enabled a dramatic reduction in abnormal combustion events, such as pre-ignition with respect to a comparable lubricating oil including a very low level of silicon (12 ppm) or a high level of silicon (1000 ppm). As can be seen in Table 2, the addition of polyoctylmethylsiloxane to a lubricant composition results in reduced pre-ignition prevalence in a hydrogen-fueled internal combustion engine. Surprisingly and unexpectedly, the benefit is most pronounced at relatively low levels of silicon (100 to 501 ppm) in the lubricating oil. It is also clear from the data that typical loadings of PDMS antifoamant included in lubricating oils does not provide sufficient silicon to significantly decrease the abnormal combustion events, such as pre-ignition based on comparative oil 1. The data in Table 2 shows that a beneficial level of silicon in the lubricating oil to significantly decrease abnormal combustion events is from 100 ppm to 500 ppm.

TABLE 2

| | Comparative Oil 1 | Inventive Oil 1 | Inventive Oil 2 | Comparative Oil 2 |
|---|---|---|---|---|
| PIBSA-PAM dispersant | 6.0 | 6.0 | 6.0 | 6.0 |
| Calcium Sulfonate detergent | 5.4 | 5.4 | 5.4 | 5.4 |

TABLE 2-continued

| | Comparative Oil 1 | Inventive Oil 1 | Inventive Oil 2 | Comparative Oil 2 |
|---|---|---|---|---|
| ZDDP (derived from combination of primary and secondary alcohols) | 0.2 | 0.2 | 0.2 | 0.2 |
| Polyoctylmethylsiloxane | | 0.054 | 0.300 | 0.606 |
| Group III basestock (4 to 6 cSt) | 78.300 | 78.246 | 78.000 | 77.694 |
| remainder of additives | 10.1 | 10.1 | 10.1 | 10.1 |
| Oil Total | 100 | 100 | 100 | 100 |
| Properties | | | | |
| Si content (ppm) | 12 | 100 | 501 | 1000 |
| Count of Pre-ignition @ 1550 rpm, 14 bar BMEP, 1.70 AFR, air intake temperature 75° C. | 27.3 ** | 3 * | 12 * | 34 * |

* Average of 2 tests
** Average of 12 tests

Example 3

One comparative oil C1 and one inventive oil C5 were prepared to form the lubricating oil compositions included in Table 3 below and were evaluated for pre-ignition testing according to the procedure described above. The two oils were of equivalent composition differing only in the amount of organosiloxane weight % included in the oil. Both oils also included low levels of PDMS anti-foamant that contributed less than 10 ppm of silicon to the lubricating oil. Inventive oil C5 included organosiloxane at a treat rate of 0.3 wt. % to provide 498 ppm of silicon to the lubricating oil. Comparative oil C1 did not include any organosiloxane (8 ppm of silicon in the oil from PDMS antifoamant).

Pre-ignition testing was performed on the inventive and comparative lubricating oils at the following conditions: 1550 rpm, 14 bar BMEP, 1.70 air:fuel ratio (AFR), air intake temperature of 75*C. Data collected over the duration of this test was analyzed using the data analysis procedure described above to determine the frequency of pre-ignition occurrences. The data is reported in Table 3 below for the comparative and inventive lubricating oils.

Based on the data in Table 3 below, it was surprisingly and unexpectedly discovered that the the inventive lubricating including 0.3 wt. % of organosiloxane additive enabled a dramatic reduction in abnormal combustion events, such as pre-ignition with respect to the comparable lubricating oil not including the organosiloxane additive. As can be seen in Table 3, the addition of organosiloxane additive to a lubricant composition results in reduced pre-ignition prevalence in a hydrogen-fueled internal combustion engine. It is also clear from the data in Table 3 that typical loadings of PDMS antifoamant included in lubricating oils (as exemplified by comparative oil C1) does not provide sufficient silicon to significantly decrease the abnormal combustion events, such as pre-ignition.

TABLE 3

| | Comparative Oil C1 | Inventive Oil C5 |
|---|---|---|
| Component | | |
| PIBSA-PAM dispersant (borated, LMW, HMW) | 9.4 | 9.4 |
| Overbased detergent (Ca sulphonate, | 2.1 | 2.1 |

TABLE 3-continued

| | Comparative Oil C1 | Inventive Oil C5 |
|---|---|---|
| Ca sulphonate/salicylate hybrid, Mg sulphonate, Ca phenate) | | |
| ZDDP (derived from combination of primary and secondary alcohols) | 1 | 1 |
| Organosiloxane | | 0.3 |
| Olefin copolymer viscosity modifier | 1.7 | 1.7 |
| Group III basestock (GTL) | 80.4 | 80.1 |
| Remainder of additives | 5.4 | 5.4 |
| Total Oil | 100 | 100 |
| Properties | | |
| Pre-ignition @ 1550 rpm, 14 bar BMEP, 1.70 AFR, air intake temperature 75° C. (PI events per 1000 cycles - average of 2 tests) | 104.5 | 47.5 |
| % Ash | 0.9 | 0.9 |
| mmol Soap | 6.5 | 6.5 |
| ppm B | 46 | 45 |
| ppm Si | 8 | 498 |
| % N | 0.14 | 0.15 |
| % P | 0.08 | 0.08 |
| % S | 0.21 | 0.21 |

* Oils C1 and C5 contained the same components in the same amounts of diphenyl amine antioxidant, hindered phenolic antioxidant, molybdenum-containing additive, PDMS anti-foamant, PIBSA, pour point depressant and diluent oil.

All documents described herein are incorporated by reference herein, including any priority documents and/or testing procedures, to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. The term "comprising" is considered synonymous with the term "including." The term "comprising" or any cognate word specifies the presence of stated features, steps, or integers or components, but does not preclude the presence or addition of one or more other features, steps, integers, components or groups thereof. Likewise, whenever a composition, an element, or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa, wherein "consists essentially of" permits inclusion of substances not materially affecting the characteristics of the composition to which it applies.

What is claimed is:

1. A method of reducing abnormal combustion events in a hydrogen fueled internal combustion engine (HICE) during operation of the engine comprising:

a) providing to the hydrogen fueled internal combustion engine a lubricating oil composition comprising or resulting from the admixing of:

i) a base oil having a viscosity KV100 of less than or equal to 12 cSt and included at greater than 50 wt. % of the composition and comprising a Group I base oil, a Group II base oil, a Group III base oil, a Group IV base oil, or combinations thereof;

ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition;

iii) at least one silicon containing compound included at a treat level to deliver between 50 to 900 ppm by weight of total silicon to the composition; and iv) the lubricating oil composition having a total sulfated ash of less than or equal to 2.0 wt. %, a total phosphorus level of less than or equal to 0.120 wt. %, and a SAE viscosity grade of 25W-X, 20W-X, 15W-X, 10W-X, 5W-X or OW-X, where X represents any one of 8, 12, 16, 20, 30, 40, 50 or 60; and b) providing a fuel comprising hydrogen to the hydrogen fueled internal combustion engine; and c) combusting the fuel in the hydrogen fueled internal combustion engine; and wherein the hydrogen fueled internal combustion engine (HICE) operates at a BMEP ranging from 12 bar to 18 bar and at an air: fuel ratio (AFR) from 1:1 to 3:1.

2. The method of claim 1, further comprising: d) measuring a number of abnormal pre-ignition events during combustion (1000 rpm, 12 bar BMEP and 1.85 air: fuel ratio (AFR)) and wherein the number of pre-ignition events per 1,000 engine cycles is less than 1.

3. The method of claim 1, further comprising: d) measuring a number of abnormal pre-ignition events during combustion (1200 rpm, 18 bar BMEP and 2.05 air: fuel ratio (AFR)) and wherein the number of pre-ignition events per 1,000 engine cycles is less than 2.

4. The method of claim 1, wherein a frequency of abnormal pre-ignition events in the hydrogen fueled internal combustion engines (HICE) operating at 100% load during combustion is decreased by at least 20% compared to a comparable lubricating oil composition not including the at least one silicon containing compound.

5. The method of claim 1, wherein the at least one silicon containing compound delivers between 75 to 600 ppm by weight of total silicon to the lubricating oil composition.

6. The method of claim 1, wherein the at least one silicon containing compound is selected from the group consisting of siloxane compounds, organo modified siloxane compounds, silicon compounds having a molecular weight of from 78 to 600 g/mol, and silazane compounds.

7. The method of claim 6, wherein the at least one silicon containing compound is a siloxane compound according to Formula 1, Formula 1

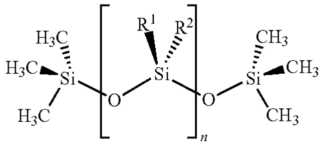

wherein n is from 50 to 450, and wherein $R^1$ and $R^2$ are independently $C_1$-$C_{10}$ alkyl.

8. The method of claim 6, wherein the silicon-containing compound is an organo modified siloxane compound according to Formula 1, Formula 1

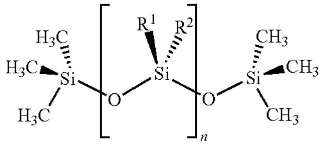

wherein, n is from 50 to 450, and wherein $R^1$ and $R^2$ are independently a polyether group, a $C_{11}$-$C_{100}$ alkyl group, or a $C_6$-$C_{14}$ aryl group.

9. The method of claim 6, wherein the silicon-containing compound is a small molecule silicon compound having a molecular weight of no more than 600 g/mol.

10. The method of claim 6, wherein the silicon-containing compound is a small molecule silicon compound according to Formula 2, Formula 2

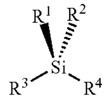

wherein, each of $R^1$, $R^2$, $R^3$ and $R^4$ is, independently, a $C_1$-$C_{10}$ hydrocarbyl group or a C-$C_{10}$ heterocarbyl group.

11. The method of claim 10 comprising one or more silicon-containing compounds selected from the group consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$).

12. The method of claim 6, wherein the silicon-containing compound is a silazane compound according to Formula 3, Formula 3

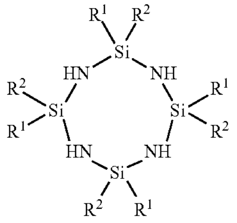

wherein, each of $R^1$ and $R^2$ is, independently, a $C_1$-$C_3$ hydrocarbyl group.

13. The method of claim 1, wherein the at least one overbased metal containing detergent is a sulfonate, a salicylate, a phenate or combinations thereof.

14. The method of claim 1, wherein the metal of the at least one overbased metal detergent is selected from the group consisting of sodium, potassium, lithium, calcium, and magnesium and combinations thereof.

15. The method of claim 1, wherein the base oil comprises a Group I base oil, a Group II base oil, or combinations thereof and is included at greater than 80 wt. % of the composition.

16. The method of claim 1, wherein the lubricating oil composition further comprises a dispersant, dispersant viscosity modifier or combinations thereof.

17. The method of claim 16, wherein the dispersant or dispersant viscosity modifier comprises an amide, imide, and/or ester functionalized partially or fully saturated polymer comprising $C_{4-5}$ olefins having: i) an Mw/Mn of less than 2, ii) a Functionality Distribution (Fd) value of 3.5 or less, and iii) an Mn of 10,000 g/mol or more of the polymer prior to functionalization.

18. The method of claim 16, wherein the dispersant comprises one or more, optionally borated, higher molecular weight polyisobutylene succinimide (PIBSA-PAM) dispersant (Mn 1600 g/mol or more), one or more, optionally borated, lower molecular weight polyisobutylene succinimide (PIBSA-PAM) dispersant (Mn less than 1600 g/mol), or combinations thereof, and wherein the treat level of the dispersant is from 1.0 to 15.0 wt. % of the lubricating oil composition.

19. The method of claim 1, wherein the lubricating oil composition further comprises a corrosion inhibitor selected from the group consisting of a substituted thiadiazole, a substituted benzotriazole, a substituted triazole, a trisubstituted borate, an ethoxylated lauryl alcohol, a nonylphenol ethoxylate, a $C_6$ to $C_{20}$ ethoxylated linear alcohol, or a combination thereof, and is/are includes at a treat level of 0.001 wt. % to 5.0 wt. % of the lubricating oil composition.

20. The method of claim 1, wherein the lubricating oil composition further comprises one or more zinc dialkyl dithiophosphate (ZDDP) compounds; and wherein the treat level of the one or more ZDDP compounds is from about 0.4 wt. % to about 1.5 wt. % of the lubricating oil composition.

21. The method of claim 1, wherein the lubricating oil composition further comprises one or more of the following components: one or more functional polymers, one or more friction modifiers; one or more antioxidants; one or more pour point depressants; one or more anti-foaming agents; one or more viscosity modifiers; one or more other dispersants; one or more corrosion inhibitors; one or more antirust agents; one or more seal swell agents; and/or one or more anti-wear agents.

22. The method of claim 1, wherein the fuel supplied to the engine comprises at least 50 mass % hydrogen, based upon the mass of the fuel.

23. The method of claim 1, wherein the lubricating oil composition is used as a passenger vehicle lubricant (PVL), a commercial vehicle lubricant (CVL), or a marine engine lubricant.

24. A lubricating oil composition for hydrogen fueled internal combustion engines (HICE) comprising or resulting from the admixing of:

i) a base oil having a KV100 of less than or equal to 12 cSt and included at greater than 50 wt. % of the composition and comprising a Group I base oil, a Group II base oil, a Group III base oil, a Group IV base oil, or combinations thereof;

ii) at least one overbased metal containing detergent with a Total Base Number (KOH/g) greater than or equal to 9 and less than or equal to 500 and included at a treat level to deliver between 100 to 5000 ppm by weight of total metal and between 0.15 wt. % to 8.0 wt. % of total soap to the composition;

iii) at least one silicon containing compound included at a treat level to deliver between 50 to 900 ppm by weight of total silicon to the composition; and wherein the lubricating oil composition has a total sulfated ash of less than or equal to 2.0 wt. %, a total phosphorus level of less than or equal to 0.120 wt. %, and a SAE viscosity grade of 25W-X, 20W-X, 15W-X, 10W-X, 5W-X or OW-X, where X represents any one of 8, 12, 16, 20, 30, 40, 50 or 60;

wherein the lubricating oil composition further comprises a dispersant, dispersant viscosity modifier or combinations thereof, and wherein the dispersant or dispersant viscosity modifier comprises an amide, imide, and/or ester functionalized partially or fully saturated polymer comprising $C_{4-5}$ olefins having: i) an Mw/Mn of less than 2, ii) a Functionality Distribution (Fd) value of 3.5 or less, and iii) an Mn of 10,000 g/mol or more of the polymer prior to functionalization.

25. The composition of claim 24, wherein the composition decreases the number of abnormal pre-ignition events in the hydrogen fueled internal combustion engines (HICE) during combustion as measured at 1000 rpm, 12 bar BMEP and 1.85 air: fuel ratio (AFR) to less than 1 event per 1,000 engine cycles.

26. The composition of claim 24, wherein the composition decreases the number of abnormal pre-ignition events in the hydrogen fueled internal combustion engines (HICE) during combustion as measured at 1200 rpm, 18 bar BMEP and 2.05 air: fuel ratio (AFR) to less than 2 events per 1,000 engine cycles.

27. The composition of claim 24, wherein the composition decreases the number of abnormal pre-ignition events in the hydrogen fueled internal combustion engines (HICE) operating at 100% load during combustion by at least 20% compared to a comparable lubricating oil composition not including the at least one silicon containing compound.

28. The composition of claim 24, wherein the at least one silicon containing compound delivers between 75 to 600 ppm by weight of total silicon to the lubricating oil composition.

29. The composition of claim 24, wherein the at least one silicon containing compound is selected from the group consisting of siloxane compounds, organo modified siloxane compounds, silicon compounds having a molecular weight of from 78 to 600 g/mol, and silazane compounds.

30. The composition of claim 29, wherein the at least one silicon containing compound is a siloxane compound according to Formula 1, Formula 1

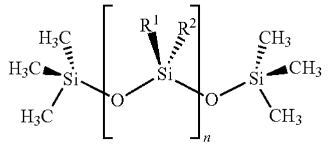

wherein n is from 50 to 450, and wherein $R^1$ and $R^2$ are independently $C_1$-$C_{10}$ alkyl.

31. The composition of claim 29, wherein the silicon-containing compound is an organo modified siloxane compound according to Formula 1, Formula 1

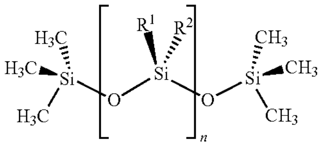

wherein, n is from 50 to 450, and wherein $R^1$ and $R^2$ are independently a polyether group, a $C_{11}$-$C_{100}$ alkyl group, or a $C_6$-$C_{14}$ aryl group.

32. The composition of claim 29, wherein the silicon-containing compound is a small molecule silicon compound having a molecular weight of no more than 600 g/mol.

33. The composition of claim 29, wherein the silicon-containing compound is a small molecule silicon compound according to Formula 2, Formula 2

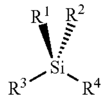

wherein, each of $R^1$, $R^2$, $R^3$ and $R^4$ is, independently, a $C_1$-$C_{10}$ hydrocarbyl group or a C-$C_{10}$ heterocarbyl group.

34. The composition of claim 33 comprising one or more silicon-containing compounds selected from the group consisting of tetraethylsilane ($Si(C_2H_5)_4$), tetraethyl orthosilicate ($Si(OC_2H_5)_4$), triethoxymethylsilane ($CH_3Si(OC_2H_5)_3$) and tetrabutyl orthosilicate ($Si(OC_4H_9)_4$).

35. The composition of claim 29, wherein the silicon-containing compound is a silazane compound according to Formula 3, Formula 3

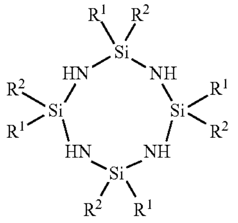

wherein, each of $R^1$ and $R^2$ is, independently, a $C_1$-$C_3$ hydrocarbyl group.

36. The composition of claim 24, wherein the at least one overbased metal containing detergent is a sulfonate, a salicylate, a phenate or combinations thereof.

37. The composition of claim 24, wherein the metal of the at least one overbased metal detergent is selected from the group consisting of sodium, potassium, lithium, calcium, and magnesium and combinations thereof.

38. The composition of claim 24, wherein the base oil comprises a Group I base oil, a Group II base oil, or combinations thereof and is included at greater than 80 wt. % of the composition.

39. The composition of claim 24, wherein the dispersant comprises one or more, optionally borated, higher molecular weight polyisobutylene succinimide (PIBSA-PAM) dispersant (Mn 1600 g/mol or more), one or more, optionally borated, lower molecular weight polyisobutylene succinimide (PIBSA-PAM) dispersant (Mn less than 1600 g/mol), or combinations thereof, and wherein the treat level of the dispersant is from 1.0 to 15.0 wt. % of the lubricating oil composition.

40. The composition of claim 24, wherein the lubricating oil composition further comprises a corrosion inhibitor selected from the group consisting of a substituted thiadiazole, a substituted benzotriazole, a substituted triazole, a trisubstituted borate, an ethoxylated lauryl alcohol, a nonylphenol ethoxylate, a $C_6$ to $C_{20}$ ethoxylated linear alcohol, or a combination thereof, and is/are includes at a treat level of 0.001 wt. % to 5.0 wt. % of the lubricating oil composition.

41. The composition of claim 24, wherein the lubricating oil composition further comprises one or more zinc dialkyl dithiophosphate (ZDDP) compounds; and wherein the treat level of the one or more ZDDP compounds is from about 0.4 wt. % to about 1.5 wt. % of the lubricating oil composition.

42. The composition of claim 24, wherein the lubricating oil composition further comprises one or more of the following components: one or more functional polymers, one or more other friction modifiers; one or more antioxidants; one or more pour point depressants; one or more anti-foaming agents; one or more viscosity modifiers; one or more other dispersants; one or more corrosion inhibitors; one or more antirust agents; one or more seal swell agents; and/or one or more anti-wear agents.

* * * * *